United States Patent
Priest

(10) Patent No.: US 10,227,134 B2
(45) Date of Patent: Mar. 12, 2019

(54) USING DRONES TO LIFT PERSONNEL UP CELL TOWERS

(71) Applicant: Lee Priest, Charlotte, NC (US)

(72) Inventor: Lee Priest, Charlotte, NC (US)

(73) Assignee: ETAK Systems, LLC, Huntersville, NC (US)

( * ) Notice: Subject to any disclaimer, the term of this patent is extended or adjusted under 35 U.S.C. 154(b) by 236 days.

(21) Appl. No.: 15/248,634

(22) Filed: Aug. 26, 2016

(65) Prior Publication Data

US 2016/0362180 A1 Dec. 15, 2016

Related U.S. Application Data

(63) Continuation-in-part of application No. 15/241,239, filed on Aug. 19, 2016, and a continuation-in-part of application No. 15/211,483, filed on Jul. 15, 2016, now Pat. No. 9,947,135, and a continuation-in-part of application No. 15/205,313, filed on Jul. 8, 2016, and (Continued)

(51) Int. Cl.
  *B64C 39/02* (2006.01)
  *H04W 16/18* (2009.01)
  *B64C 27/06* (2006.01)
  *H04W 88/08* (2009.01)

(52) U.S. Cl.
  CPC .......... *B64C 39/024* (2013.01); *B64C 27/06* (2013.01); *B64C 39/022* (2013.01); *H04W 16/18* (2013.01); *B64C 2201/027* (2013.01); *B64C 2201/108* (2013.01); *B64C 2201/123* (2013.01); *B64C 2201/127* (2013.01); *B64C 2201/128* (2013.01); *B64C 2201/148* (2013.01); *H04W 88/08* (2013.01)

(58) Field of Classification Search
  CPC ... B64C 39/022; B64C 39/024; B64C 39/026; B64C 2201/027; B64C 2201/108; B64C 2201/128; B64C 2201/141
  See application file for complete search history.

(56) References Cited

U.S. PATENT DOCUMENTS 3,586,263 A * 6/1971 Payne ................ B64C 25/52
  244/17.17
4,818,990 A 4/1989 Fernandes
(Continued)

OTHER PUBLICATIONS

Knutson et al., "In Race for Better Cell Service, Men Who Climb Towers Pay With Their Lives," PBS.org, pp. 1-12.
(Continued)

*Primary Examiner* — Philip J Bonzell
(74) *Attorney, Agent, or Firm* — Clements Bernard Walker PLLC; Lawrence A. Baratta, Jr.

(57) ABSTRACT

A method for transporting maintenance personnel at a cell tower includes, responsive to a requirement for a tower climb for one or more of a site survey, a site audit, maintenance, and installation at the cell tower, securing a person in a drone, wherein the drone includes flight components at a substantial length from the person allowing the flight components to fly over a top of the cell tower and to place the person directly adjacent to a desired location on the cell tower; flying the drone up the cell tower to locate the person directly adjacent to the desired location; and performing the one or more of a site survey, a site audit, maintenance, and installation at the cell tower.

15 Claims, 45 Drawing Sheets

Related U.S. Application Data a continuation-in-part of application No. 15/190,450, filed on Jun. 23, 2016, now Pat. No. 9,654,984, and a continuation-in-part of application No. 15/175,314, filed on Jun. 7, 2016, and a continuation-in-part of application No. 15/168,503, filed on May 31, 2016, now Pat. No. 9,704,292, and a continuation-in-part of application No. 15/160,890, filed on May 20, 2016, and a continuation-in-part of application No. 15/131,460, filed on Apr. 18, 2016, now Pat. No. 9,764,838, and a continuation-in-part of application No. 14/736,925, filed on Jun. 11, 2015, now Pat. No. 9,669,945, and a continuation-in-part of application No. 14/685,720, filed on Apr. 14, 2015, now Pat. No. 9,596,617.

(56) References Cited

U.S. PATENT DOCUMENTS

| | | | |
|---|---|---|---|
| 6,868,314 | B1 | 3/2005 | Frink |
| 8,346,578 | B1 | 1/2013 | Hopkins et al. |
| 9,085,363 | B2 | 7/2015 | Tofte |
| 9,162,753 | B1 | 10/2015 | Panto |
| 9,513,635 | B1 * | 12/2016 | Bethke ................ G01C 21/20 |
| 9,759,200 | B2 * | 9/2017 | Craft ..................... F03D 80/00 |
| 9,932,110 | B2 * | 4/2018 | McNally ............ B64C 39/024 |
| 2002/0193914 | A1 | 12/2002 | Talbert |
| 2010/0215212 | A1 | 8/2010 | Flakes |
| 2010/0231687 | A1 | 9/2010 | Amory |
| 2011/0221692 | A1 | 9/2011 | Seydoux et al. |
| 2012/0250010 | A1 | 10/2012 | Hannay |
| 2012/0262708 | A1 | 10/2012 | Connolly |
| 2013/0173088 | A1 | 7/2013 | Parrot |
| 2013/0233964 | A1 | 9/2013 | Woodworth |
| 2013/0325217 | A1 | 12/2013 | Parrot |
| 2014/0018976 | A1 | 1/2014 | Goossen et al. |
| 2014/0131510 | A1 | 5/2014 | Wang |
| 2014/0277854 | A1 | 9/2014 | Jones |
| 2014/0298181 | A1 | 10/2014 | Rezvan |
| 2015/0304869 | A1 | 10/2015 | Johnson |
| 2016/0017866 | A1 * | 1/2016 | Craft ................. F03D 11/0091 348/46 |

OTHER PUBLICATIONS

Knutson et al., "Methodology: How We Calculated the Tower Industry Death Rate," ProPublica, pp. 1-2.

* cited by examiner

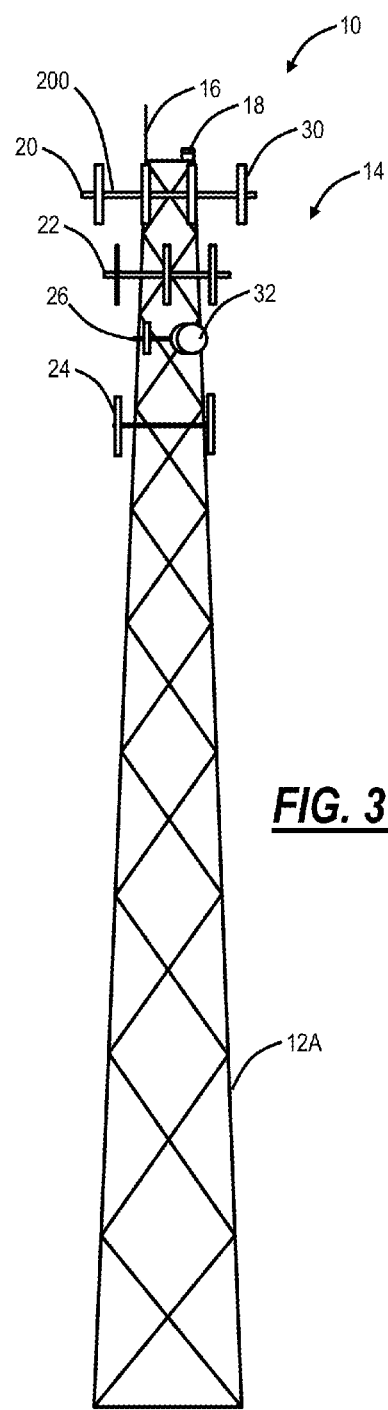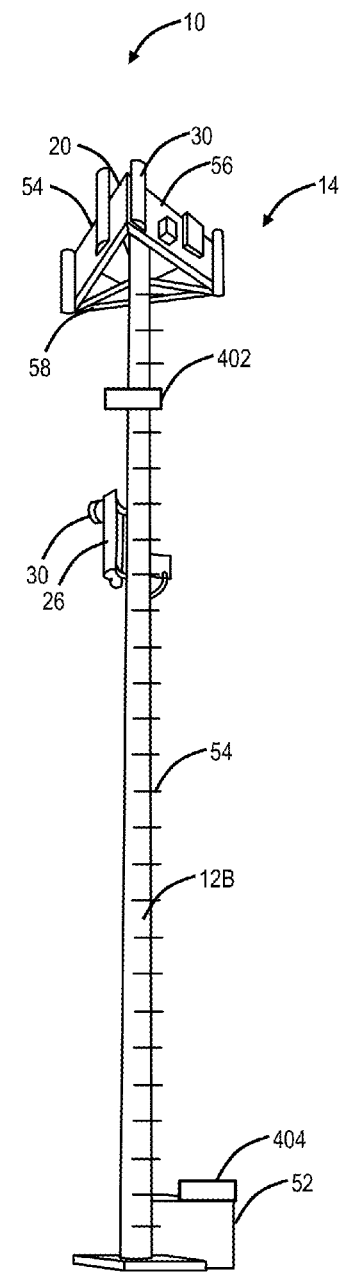
FIG. 37A
FIG. 37B

USING DRONES TO LIFT PERSONNEL UP CELL TOWERS

CROSS-REFERENCE TO RELATED APPLICATION(S)

The present patent/application is continuation-in-part of and the content of each are incorporated by reference herein:

| Filing Date | Serial No. | Title |
| --- | --- | --- |
| Aug. 19, 2016 | 15/241,239 | 3D MODELING OF CELL SITES TO DETECT CONFIGURATION AND SITE CHANGES |
| Jul. 15, 2016 | 15/211,483 | CLOSE-OUT AUDIT SYSTEMS AND METHODS FOR CELL SITE INSTALLATION AND MAINTENANCE |
| Jul. 8, 2016 | 15/205,313 | CELL TOWER INSTALLATION AND MAINTENANCE SYSTEMS AND METHODS USING ROBOTIC DEVICES |
| Jun. 23, 2016 | 15/190,450 | CELL TOWER INSTALLATION SYSTEMS AND METHODS WITH UNMANNED AERIAL VEHICLES |
| Jun. 7, 2016 | 15/175,314 | WIRELESS COVERAGE TESTING SYSTEMS AND METHODS WITH UNMANNED AERIAL VEHICLES |
| May 31, 2016 | 15/168,503 | VIRTUALIZED SITE SURVEY SYSTEMS AND METHODS FOR CELL SITES |
| May 20, 2016 | 15/160,890 | 3D MODELING OF CELL SITES AND CELL TOWERS WITH UNMANNED AERIAL VEHICLES |
| Apr. 18, 2016 | 15/131,460 | UNMANNED AERIAL VEHICLE-BASED SYSTEMS AND METHODS ASSOCIATED WITH CELL SITES AND CELL TOWERS WITH ROBOTIC ARMS FOR PERFORMING OPERATIONS |
| Jun. 11, 2015 | 14/736,925 | TETHERED UNMANNED AERIAL VEHICLE-BASED SYSTEMS AND METHODS ASSOCIATED WITH CELL SITES AND CELL TOWERS |
| Apr. 14, 2015 | 14/685,720 | UNMANNED AERIAL VEHICLE-BASED SYSTEMS AND METHODS ASSOCIATED WITH CELL SITES AND CELL TOWERS |

FIELD OF THE DISCLOSURE

The present disclosure relates generally to cell site maintenance systems and methods. More particularly, the present disclosure relates to using Unmanned Aerial Vehicles (UAVs) "drones" or the like to lift maintenance personnel up cell towers.

BACKGROUND OF THE DISCLOSURE

Due to the geographic coverage nature of wireless service, there are hundreds of thousands of cell towers in the United States. For example, in 2014, it was estimated that there were more than 310,000 cell towers in the United States. Cell towers can have heights up to 1,500 feet or more. There are various requirements for cell site workers (also referred to as tower climbers or transmission tower workers) to climb cell towers to perform maintenance, audit, and repair work for cellular phone and other wireless communications companies. This is both a dangerous and costly endeavor. For example, between 2003 and 2011, 50 tower climbers died working on cell sites (see, e.g., www.pbs.org/wgbh/pages/frontline/social-issues/cell-tower-deaths/in-race-for-better-cell-service-men-who-climb-towers-pay-with-their-lives/). Also, OSHA estimates that working on cell sites is 10 times more dangerous than construction work, generally (see, e.g., www.propulica.org/article/cell-tower-work-fatalities-methodology). Furthermore, the tower climbs also can lead to service disruptions caused by accidents. Thus, there is a strong desire, from both a cost and safety perspective, to reduce the number of tower climbs.

Concurrently, the use of unmanned aerial vehicles (UAV), referred to as drones, is evolving. There are limitations associated with UAVs, including emerging FAA rules and guidelines associated with their commercial use. It would be advantageous to leverage the use of UAVs to reduce tower climbs of cell towers. US 20140298181 to Rezvan describes methods and systems for performing a cell site audit remotely. However, Rezvan does not contemplate performing any activity locally at the cell site, nor various aspects of UAV use. US 20120250010 to Hannay describes aerial inspections of transmission lines using drones. However, Hannay does not contemplate performing any activity locally at the cell site, nor various aspects of constraining the UAV use. Specifically, Hannay contemplates a flight path in three dimensions along a transmission line.

Of course it would be advantageous to further utilize UAVs to actually perform operations on a cell tower. However, adding one or more robotic arms, carrying extra equipment, etc. presents a significantly complex problem in terms of UAV stabilization while in flight, i.e., counterbalancing the UAV to account for the weight and movement of the robotic arms. Research and development continues in this area, but current solutions are complex and costly, eliminating the drivers for using UAVs for performing cell tower work.

3D modeling is important for cell site operators, cell tower owners, engineers, etc. There exist current techniques to make 3D models of physical sites such as cell sites. One approach is to take hundreds or thousands of pictures and to use software techniques to combine these pictures to form a 3D model. Generally, conventional approaches for obtaining the pictures include fixed cameras at the ground with zoom capabilities or pictures via tower climbers. It would be advantageous to utilize a UAV to obtain the pictures, providing 360 degree photos from an aerial perspective. Use of aerial pictures is suggested in US 20100231687 to Armory. However, this approach generally assumes pictures taken from a fixed perspective relative to the cell site, such as via a fixed, mounted camera and a mounted camera in an aircraft. It has been determined that such an approach is moderately inaccurate during 3D modeling and combination with software due to slight variations in location tracking capabilities of systems such as Global Positioning Satellite (GPS). It would be advantageous to adapt a UAV to take pictures and provide systems and methods for accurate 3D modeling based thereon to again leverage the advantages of UAVs over tower climbers, i.e., safety, climbing speed and overall speed, cost, etc.

In the process of planning, installing, maintaining, and operating cell sites and cell towers, site surveys are performed for testing, auditing, planning, diagnosing, inventorying, etc. Conventional site surveys involve physical site access including access to the top of the cell tower, the interior of any buildings, cabinets, shelters, huts, hardened structures, etc. at the cell site, and the like. With over 200,000 cell sites in the U.S., geographically distributed everywhere, site surveys can be expensive, time-consuming, and complex. The various parent applications associated herewith describe techniques to utilize UAVs to optimize and provide safer site surveys. It would also be advantageous to further optimize site surveys by minimizing travel through virtualization of the entire process.

Wireless coverage testing is important for service providers and consumers—it is used for marketing purposes (who has the better network) and for engineering purposes (where do we need to augment or improve our coverage). Conventional approaches to wireless coverage testing utilize so-called drive tests where wireless coverage is tested by physically driving around a region with a test device and making measurements along the way. The conventional approaches are limited to ground coverage, not aerial coverage, as conventional drive tests are just that—driven by a vehicle on the ground. The Federal Aviation Administration (FAA) is investigating use of the wireless network in some manner for air traffic control of UAVs. Thus, there is a need to extend conventional drive tests to support wireless coverage testing above the ground.

As networks evolve, there is a continuous need to install equipment on cell towers, such as antennas, radios, and the like. Such equipment can weigh greater than 100 lbs, requiring construction equipment to raise it to the top of the cell tower or the like. Of course, the convention approach also requires tower climbs, is expensive, and inefficient. It would be advantageous to improve these approaches using UAVs, to reduce requirements for tower climbs, eliminate the need for construction equipment, lower cost, and improve installation time.

Again, with over 200,000 cell sites in the U.S., each time there is maintenance or installation activity at each cell site, operators and owners typically require a close-out audit which is done to document and verify the work performed. For example, the maintenance or installation activity can be performed by a third-party installation firm (separate from an operator or owner) and an objective of the close-out audit is to provide the operator or owner verification of the work as well as that the third-party installation firm did the work in a manner consistent with the operator or owner's expectations. Conventionally, close-out audits are performed by another firm, i.e., a third-party inspection firm, separate from the third-party installation firm, the owner, and the operator. Disadvantageously, this conventional approach with a separate third-party inspection firm is inefficient, expensive, etc.

Also, with over 200,000 cell sites, it is difficult to monitor activity, namely configurations, physical structure, surroundings, etc., and associated changes. The typical arrangement includes a cell site owner, which is typically a real estate company, leasing space to cell site operators, i.e., wireless service providers. It is incumbent that the cell site owners maintain accurate records of the cell sites, including the configuration (i.e., are the operators deploying more equipment than agreements state?), physical structure (i.e., are there mechanic issues with the cell site?), surroundings (i.e., are there safety issues?), and the like. Conventional approaches require physical site surveys to obtain such information which with over 200,000 cells sites is expensive, time consuming, slow, etc.

Of course, there are still requirements to perform tower climbs for some installation and maintenance activity at cell towers. In addition to the aforementioned safety issues, another large drawback of conventional tower climbs is the time and physical effort involved. To climb to the top, personnel must climb in increments and continually hook in to safety harnesses. Once at the top, the personnel must rest to recover from climbing several hundred feet. Conventional tower climbs can take well over an hour, lead the personnel to exhaustion, etc.

BRIEF SUMMARY OF THE DISCLOSURE

In an exemplary embodiment, a method for transporting maintenance personnel at a cell tower includes, responsive to a requirement for a tower climb for one or more of a site survey, a site audit, maintenance, and installation at the cell tower, securing a person in a drone, wherein the drone includes flight components at a substantial length from the person allowing the flight components to fly over a top of the cell tower and to place the person directly adjacent to a desired location on the cell tower; flying the drone up the cell tower to locate the person directly adjacent to the desired location; and performing the one or more of a site survey, a site audit, maintenance, and installation at the cell tower.

In an exemplary embodiment, a modeling method performed for a cell site to detect changes in or at the cell site includes obtaining first data regarding the cell site from a first audit performed using one or more data acquisition techniques and obtaining second data regarding the cell site from a second audit performed using the one or more data acquisition techniques, wherein the second audit is performed at a different time than the first audit, and wherein the first data and the second data each comprise one or more location identifiers associated therewith; processing the first data to define a first model of the cell site using the associated one or more location identifiers and processing the second data to define a second model of the cell site using the associated one or more location identifiers; comparing the first model with the second model to identify the changes in or at the cell site; and performing one or more actions based on the identified changes.

In an exemplary embodiment, a close-out audit method performed at a cell site subsequent to maintenance or installation work includes, subsequent to the maintenance or installation work, obtaining video capture of cell site components associated with the work; subsequent to the video capture, processing the video capture to obtain data for the close-out audit, wherein the processing comprises identifying the cell site components associated with the work; and creating a close-out audit package based on the processed video capture, wherein the close-out audit package provides verification of the maintenance or installation work and outlines that the maintenance or installation work was performed in a manner consistent with an operator or owner's guidelines.

In an exemplary embodiment, a method for installation and maintenance of cell site components on a cell tower with a robotic device includes causing the robotic device to traverse up the cell tower to a desired location proximate to the cell site components; once at the desired location and stabilized to the cell tower, causing manipulation components to perform one or more of installation and maintenance of the cell site components; and, subsequent to the one or more of installation and maintenance of the cell site components, causing the robotic device to traverse down the cell tower.

In an exemplary embodiment, an Unmanned Aerial Vehicle (UAV)-based installation method for equipment on cell towers includes flying the UAV with the equipment attached thereto upwards to a desired location on the cell tower, wherein the desired location includes one or more horizontal support structures; positioning the equipment to the desired location on the cell tower; connecting the equipment to the desired location; and disconnecting the equipment from the UAV.

In another exemplary embodiment, an Unmanned Aerial Vehicle (UAV) used in installation of equipment on cell towers includes one or more rotors disposed to a body; wireless interfaces; one or more arms adapted to connect and disconnect from the equipment; a processor coupled to the wireless interfaces, the one or more rotors, and the one or more arms; and memory storing instructions that, when executed, cause the processor to: fly with the equipment attached to the one or more arms upwards to a desired location on the cell tower, wherein the desired location includes one or more horizontal support structures; position the equipment to the desired location on the cell tower; connect the equipment to the desired location; and disconnect the equipment from the UAV.

In an exemplary embodiment, an Unmanned Aerial Vehicle (UAV)-based method of wireless coverage testing includes, with a UAV including a wireless coverage testing configuration, flying the UAV in a route in a wireless coverage area associated with a cell tower; collecting measurement data via the wireless coverage testing configuration during the flying and associating the collected measurement data with location identifiers; and, subsequent to the flying, processing the collected measurement data with the location identifiers to provide an output detailing wireless coverage in the wireless coverage area including wireless coverage at ground level and above ground level to a set elevation.

In an exemplary embodiment, a virtual site survey method at a cell site utilizing three-dimensional (3D) models for remote performance includes obtaining a plurality of photographs of a cell site including one or more of a cell tower and one or more buildings and interiors thereof; subsequent to the obtaining, processing the plurality of photographs to define a three dimensional (3D) model of the cell site based on one or more objects of interest in the plurality of photographs; and remotely performing a site survey of the cell site utilizing a Graphical User Interface (GUI) of the 3D model to collect and obtain information about the cell site, the cell tower, the one or more buildings, and the interiors thereof.

In an exemplary embodiment, a method for modeling a cell site with an Unmanned Aerial Vehicle (UAV) includes causing the UAV to fly a given flight path about a cell tower at the cell site, wherein a launch location and launch orientation is defined for the UAV to take off and land at the cell site such that each flight at the cell site has the same launch location and launch orientation; obtaining a plurality of photographs of the cell site during about the flight plane, wherein each of the plurality of photographs is associated with one or more location identifiers; and, subsequent to the obtaining, processing the plurality of photographs to define a three dimensional (3D) model of the cell site based on the associated with one or more location identifiers and one or more objects of interest in the plurality of photographs.

In an exemplary embodiment, a method with an Unmanned Aerial Vehicle (UAV) associated with a cell site includes causing the UAV to fly at or near the cell site, wherein the UAV includes one or more manipulable arms which are stationary during flight; physically connecting the UAV to a structure at the cell site and disengaging flight components associated with the UAV; and performing one or more functions via the one or more manipulable arms while the UAV is physically connected to the structure, wherein the one or more manipulable arms move while the UAV is physically connected to the structure.

In an exemplary embodiment, a method with a tethered Unmanned Aerial Vehicle (UAV) associated with a cell site includes causing the UAV to fly at or near the cell site while the UAV is tethered at or near the cell site via a connection, wherein flight of the UAV at or near the cell site is constrained based on the connection; and performing one or more functions via the UAV at or near the cell site while the UAV is flying tethered at or near the cell site.

In an exemplary embodiment, a method performed at a cell site with an Unmanned Aerial Vehicle (UAV) communicatively coupled to a controller to perform a cell site audit, without requiring a tower climb at the cell site, includes causing the UAV to fly substantially vertically up to cell site components using the controller, wherein flight of the UAV is constrained in a three-dimensional rectangle at the cell site; collecting data associated with the cell site components using the UAV; transmitting and/or storing the collected data; and processing the collected data to obtain information for the cell site audit.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a mobile device, which may be used for the cell site audit or the like;

FIGS. 37A-37C are diagrams of different types of cell towers, namely a self-support tower (FIG. 37A), a monopole tower (FIG. 37B), and a guyed tower (FIG. 37C);

FIG. 45 is a diagram of a cell tower with various platforms for receiving a person from a drone or the like.

DETAILED DESCRIPTION OF THE DISCLOSURE

Figure 1:
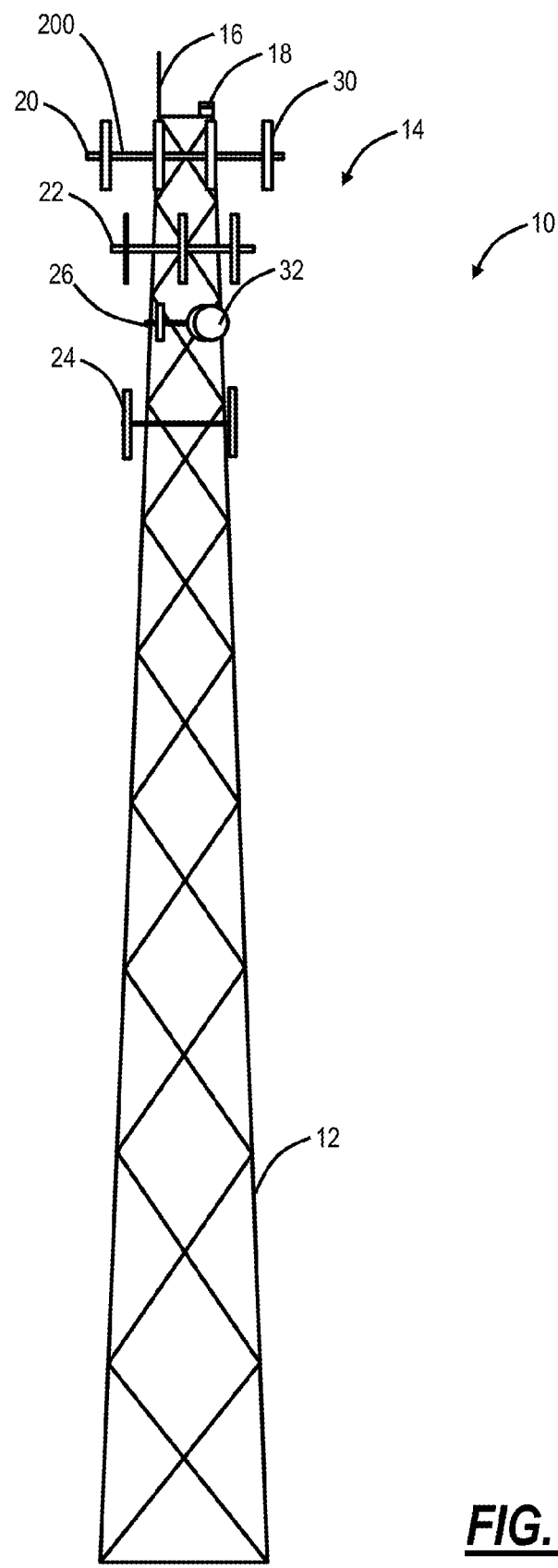
FIG. 1 is a diagram of a side view of an exemplary cell site.

In an exemplary embodiment, the present disclosure relates to using Unmanned Aerial Vehicles (UAVs) "drones" or the like to lift maintenance personnel up cell towers. Advantageously, drones allow maintenance personnel to be lifted quickly, safer relative to a tower climb, and without physical exertion. Such an approach significantly improves the efficiency, cost, and time associated with maintenance and installation at cell towers. In an exemplary embodiment, the cell towers include one or more platforms for receiving personnel, the drones are configured to fly personnel up to the platform, the personnel perform the maintenance and/or installation, and the personnel are flown down from the platform. In an exemplary embodiment, the drone is configured to connect to the platform while the personnel perform the maintenance and/or installation. In another exemplary embodiment, the drone is configured to automatically or under remote control fly back to the ground awaiting completion of the maintenance and/or installation. Various other approaches are contemplated.

Further, in an exemplary embodiment, the present disclosure relates to three-dimensional (3D) modeling of cell sites to detect configuration and site changes. Again, the challenge for cell site owners is to manage thousands of cell sites which are geographically distributed. The 3D modeling systems and methods utilize various techniques to obtain data, to create 3D models, and to detect changes in configurations and surroundings. The 3D models can be created at two or more different points in time, and with the different 3D models, a comparison can be made to detect the changes. Advantageously, the 3D modeling systems and methods allow cell site operators to efficiently manage the cell sites without repeated physical site surveys.

Further, in various exemplary embodiments, the present disclosure relates to close-out audit systems and methods for cell site installation and maintenance. Specifically, the systems and methods eliminate the separate third-party inspection firm for the close-out audit. The systems and methods include the installers (i.e., from the third-party installation firm, the owner, the operator, etc.) performing video capture subsequent to the installation and maintenance and using various techniques to obtain data from the video capture for the close-out audit. The close-out audit can be performed off-site with the data from the video capture thereby eliminating unnecessary tower climbs, site visits, and the like.

Further, in various exemplary embodiments, the present disclosure relates to cell tower installation systems and methods with robotic devices. Specifically, the systems and methods seek to reduce or avoid tower climbs for installation and maintenance on equipment on cell towers by using robotic devices. The robotic devices can crawl to the top of the cell tower, can be delivered by Unmanned Aerial Vehicles (UAV), can be delivered by guide wire, can be delivered by a crane, pulley, etc. or the like. While on the tower, the robotic devices can be used, either manually, autonomously, or a combination of both, to perform various tasks on cell tower equipment such as antennas or the like. In an exemplary embodiment, the robotic device can be used to bring cabling up the cell tower in conjunction with UAV-based systems and methods which install equipment such as antennas.

Further, in various exemplary embodiments, the present disclosure relates to cell tower installation systems and methods with unmanned aerial vehicles (UAVs). Specifically, the installation systems and methods describe use of the UAV to deliver and install equipment on cell towers, such as antennas, radios, and the like. To that end, the systems and methods include various attachment techniques to connect the equipment to horizontal support structures on the cell tower, such as, for example, magnets, mechanical attachments, and the like. The horizontal support structures can include directional aids to assist and/or automate the UAV placement of the equipment. In an exemplary embodiment, the UAV is configured to place the equipment with a temporary attachment such as magnet which holds the equipment in place while it is secured through other techniques. In another exemplary embodiment, the UAV is configured to automatically attach the equipment via fixed attachments such as automatic clamps or the like. With the directional aids, the UAV can be autonomous in the placement of the equipment on the cell tower.

Further, in various exemplary embodiments, the present disclosure relates to wireless coverage testing systems and methods with unmanned aerial vehicles (UAVs). Specifically, a UAV is equipment with equipment for performing a wireless coverage test, e.g., wireless scanners, location identification equipment, antennas, and processing and data storage equipment. The UAV is flown about a cell tower around a region, taking measurements along the way. Subsequently, processing on the measurements enables the assessment of wireless coverage not just near the ground, but in the aerial region about the cell tower in the region. It is expected such measurements and assessments can be used to ensure proper wireless coverage in the air, such as up to 100's of feet, enabling the cell tower to act as an air traffic control point for UAVs flying in the region as well as a central hub for managing and controlling UAVs. Additionally, the wireless coverage testing systems and methods provide a quicker and more efficient improvement over conventional drive tests solely on the ground.

Further, in various exemplary embodiments, the present disclosure relates to virtualized site survey systems and methods using three-dimensional (3D) modeling of cell sites and cell towers with and without unmanned aerial vehicles. The virtualized site survey systems and methods utilizing photo data capture along with location identifiers, points of interest, etc. to create three-dimensional (3D) modeling of all aspects of the cell sites, including interiors of buildings, cabinets, shelters, huts, hardened structures, etc. As described herein, a site survey can also include a site inspection, cell site audit, or anything performed based on the 3D model of the cell site including building interiors. With the data capture, 3D modeling can render a completely virtual representation of the cell sites. The data capture can be performed by on-site personnel, automatically with fixed, networked cameras, or a combination thereof. With the data capture and the associated 3D model, engineers and planners can perform site surveys, without visiting the sites leading to significant efficiency in cost and time. From the 3D model, any aspect of the site survey can be performed remotely including determinations of equipment location, accurate spatial rendering, planning through drag and drop placement of equipment, access to actual photos through a Graphical User Interface, indoor texture mapping, and equipment configuration visualization mapping the equipment in a 3D rack.

Further, in various exemplary embodiments, the present disclosure relates to three-dimensional (3D) modeling of cell sites and cell towers with unmanned aerial vehicles. The present disclosure includes UAV-based systems and methods for 3D modeling and representing of cell sites and cell towers. The systems and methods include obtaining various pictures via a UAV at the cell site, flying around the cell site to obtain various different angles of various locations, tracking the various pictures (i.e., enough pictures to produce an acceptable 3D model, usually hundreds, but could be more) with location identifiers, and processing the various pictures to develop a 3D model of the cell site and the cell tower. Additionally, the systems and methods focus on precision and accuracy ensuring the location identifiers are as accurate as possible for the processing by using multiple different location tracking techniques as well as ensuring the UAV is launched from a same location and/or orientation for each flight. The same location and/or orientation, as described herein, was shown to provide more accurate location identifiers versus arbitrary location launches and orientations for different flights. Additionally, once the 3D model is constructed, the systems and methods include an application which enables cell site owners and cell site operators to "click" on any location and obtain associated photos, something extremely useful in the ongoing maintenance and operation thereof. Also, once constructed, the 3D model is capable of various measurements including height, angles, thickness, elevation, even Radio Frequency (RF), and the like.

Still further, in various exemplary embodiments, the present disclosure relates to unmanned aerial vehicle (UAV)-based systems and methods associated with cell sites and cell towers, such as performing operations on cell towers via robotic arms on the UAV. To solve the issues of counterbalancing the UAV with additional weight due to carrying components and robotic arm movement, the systems and methods physically connect the UAV to the cell tower prior to deploying and operating the robotic arms. In this manner, the UAV can be flown up the cell tower with the robotic arms stationary and optionally with equipment carried therein, tethered to the cell tower, and the robotic arms can move without requiring counterbalancing of the UAV in flight. That is, the UAV is stationary and fixed to the cell tower while performing operations and maneuvers with the robotic arms. Accordingly, the systems and methods do not require complex counterbalancing techniques and provide superior stability since the UAV is not in flight while using the robotic arms. This approach allows use of commercial UAV devices without requiring complex control circuitry. Specifically, cell towers lend themselves to physical connections to the UAV. As described herein, various maintenance and installation tasks can be accomplished on a cell tower while eliminating tower climbs therefor.

Still further, in additional exemplary embodiments, UAV-based systems and methods are described associated with cell sites, such as for providing cell tower audits and the like, including a tethered configuration. Various aspects of UAVs are described herein to reduce tower climbs in conjunction with cell tower audits. Additional aspects are described utilizing UAVs for other functions, such as flying from cell tower to cell tower to provide audit services and the like. Advantageously, using UAVs for cell tower audits exponentially improves the safety of cell tower audits and has been shown by Applicants to reduce costs by over 40%, as well as drastically improving audit time. With the various aspects described herein, a UAV-based audit can provide superior information and quality of such information, including a 360 degree tower view. In one aspect, the systems and methods include a constrained flight zone for the UAV such as a three-dimensional rectangle (an "ice cube" shape) about the cell tower. This constrained flight zone allows the systems and methods to operate the UAV without extensive regulations such as including extra personnel for "spotting" and requiring private pilot's licenses.

The tethered configuration includes a connection between the UAV and one or more components at a cell site. The connection can include a cable, a rope, a power cable, a communications cable, a fiber optic cable, etc., i.e., any connection with strength to constrain the UAV to the cell site. One aspect of the tethered configuration is to constrain a flight path of the UAV at the cell site. Here, the UAV may be considered part of the cell site/cell tower and not a flying vehicle that is subject to airspace regulations. Another aspect of the tethered configuration is to provide power and/or communications to the UAV. Here, the UAV can maintain extended periods of flight to provide cell site audits, wireless service, visual air traffic surveillance, etc. With the connection providing power and/or communications, the UAV can fly extended time periods. The connection can be tethered to the cell tower or some associated component, to a stake, weight, fence, building structure, etc.

§ 1.0 Exemplary Cell Site

Referring to FIG. 1, in an exemplary embodiment, a diagram illustrates a side view of an exemplary cell site 10. The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lighting rod 16 and a warning light 18. Of course, there may various additional components associated with the cell tower 12 and the cell site 10 which are omitted for illustration purposes. In this exemplary embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g. there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

§ 2.0 Cell Site Audits Via UAV

Figure 2:
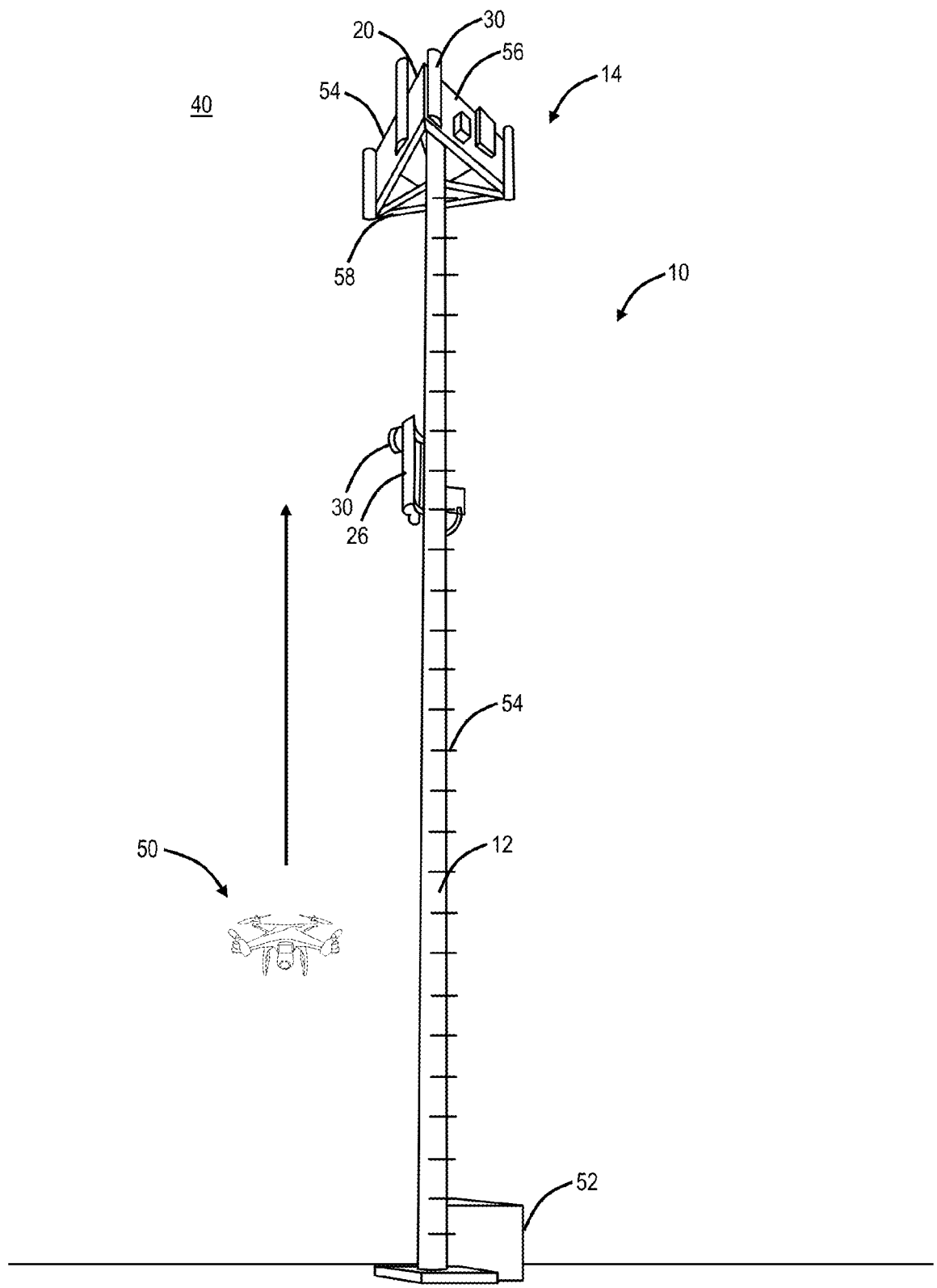
FIG. 2 is a diagram of a cell site audit performed with an unmanned aerial vehicle (UAV)

Referring to FIG. 2, in an exemplary embodiment, a diagram illustrates a cell site audit 40 performed with an unmanned aerial vehicle (UAV) 50. As described herein, the cell site audit 40 is used by service providers, third party engineering companies, tower operators, etc. to check and ensure proper installation, maintenance, and operation of the cell site components 14 and shelter or cabinet 52 equipment as well as the various interconnections between them. From a physical accessibility perspective, the cell tower 12 includes a climbing mechanism 54 for tower climbers to access the cell site components 14. FIG. 2 includes a perspective view of the cell site 10 with the sets 20, 26 of the cell site components 14. The cell site components 14 for the set 20 include three sectors—alpha sector 54, beta sector 56, and gamma sector 58.

In an exemplary embodiment, the UAV 50 is utilized to perform the cell site audit 40 in lieu of a tower climber access the cell site components 14 via the climbing mechanism 54. In the cell site audit 40, an engineer/technician is local to the cell site 10 to perform various tasks. The systems and methods described herein eliminate a need for the engineer/technician to climb the cell tower 12. Of note, it is still important for the engineer/technician to be local to the cell site 10 as various aspects of the cell site audit 40 cannot be done remotely as described herein. Furthermore, the systems and methods described herein provide an ability for a single engineer/technician to perform the cell site audit 40 without another person handling the UAV 50 or a person with a pilot's license operating the UAV 50 as described herein.

§ 2.1 Cell Site Audit

In general, the cell site audit 40 is performed to gather information and identify a state of the cell site 10. This is used to check the installation, maintenance, and/or operation of the cell site 10. Various aspects of the cell site audit 40 can include, without limitation:

---

Verify the cell site 10 is built according to a current revision
Verify Equipment Labeling
Verify Coax Cable ("Coax") Bend Radius
Verify Coax Color Coding/Tagging
Check for Coax External Kinks & Dents
Verify Coax Ground Kits
Verify Coax Hanger/Support
Verify Coax Jumpers
Verify Coax Size
Check for Connector Stress & Distortion
Check for Connector Weatherproofing
Verify Correct Duplexers/Diplexers Installed
Verify Duplexer/Diplexer Mounting
Verify Duplexers/Diplexers Installed Correctly
Verify Fiber Paper
Verify Lacing & Tie Wraps
Check for Loose or Cross-Threaded Coax Connectors
Verify Return ("Ret") Cables
Verify Ret Connectors
Verify Ret Grounding
Verify Ret Installation
Verify Ret Lightning Protection Unit (LPI)
Check for Shelter/Cabinet Penetrations
Verify Surge Arrestor Installation/Grounding
Verify Site Cleanliness
Verify LTE GPS Antenna Installation

---

Of note, the cell site audit 40 includes gathering information at and inside the shelter or cabinet 52, on the cell tower 12, and at the cell site components 14. Note, it is not possible to perform all of the above items solely with the UAV 50 or remotely.

§ 3.0 Piloting the UAV at the Cell Site

It is important to note that the Federal Aviation Administration (FAA) is in the process of regulating commercial UAV (drone) operation. It is expected that these regulations would not be complete until 2016 or 2017. In terms of these regulations, commercial operation of the UAV 50, which would include the cell site audit 40, requires at least two people, one acting as a spotter and one with a pilot's license. These regulations, in the context of the cell site audit 40, would make use of the UAV 50 impractical. To that end, the systems and methods described herein propose operation of the UAV 50 under FAA exemptions which allow the cell site audit 40 to occur without requiring two people and without requiring a pilot's license. Here, the UAV 50 is constrained to fly up and down at the cell site 10 and within a three-dimensional (3D) rectangle at the cell site components. These limitations on the flight path of the UAV 50 make the use of the UAV 50 feasible at the cell site 10.

Figure 3:
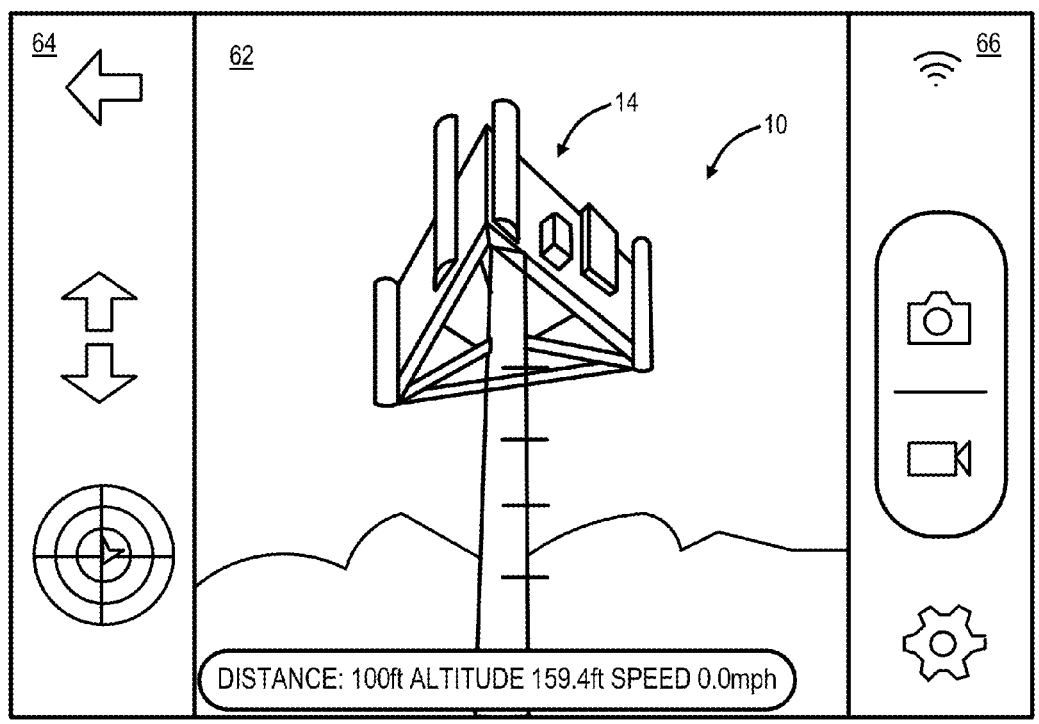
FIG. 3 is a screen diagram of a view of a graphical user interface (GUI) on a mobile device while piloting the UAV.

Referring to FIG. 3, in an exemplary embodiment, a screen diagram illustrates a view of a graphical user interface (GUI) 60 on a mobile device 100 while piloting the UAV 50. The GUI 60 provides a real-time view to the engineer/technician piloting the UAV 50. That is, a screen 62 provides a view from a camera on the UAV 50. As shown in FIG. 3, the cell site 10 is shown with the cell site components 14 in the view of the screen 62. Also, the GUI 60 have various controls 64, 66. The controls 64 are used to pilot the UAV 50 and the controls 66 are used to perform functions in the cell site audit 40 and the like.

§ 3.1 FAA Regulations

The FAA is overwhelmed with applications from companies interested in flying drones, but the FAA is intent on keeping the skies safe. Currently, approved exemptions for flying drones include tight rules. Once approved, there is some level of certification for drone operators along with specific rules such as, speed limit of 100 mph, height limitations such as 400 ft, no-fly zones, day only operation, documentation, and restrictions on aerial filming. Accordingly, flight at or around cell towers is constrained and the systems and methods described herein fully comply with the relevant restrictions associated with drone flights from the FAA.

§ 4.0 Exemplary Hardware

Figure 4:
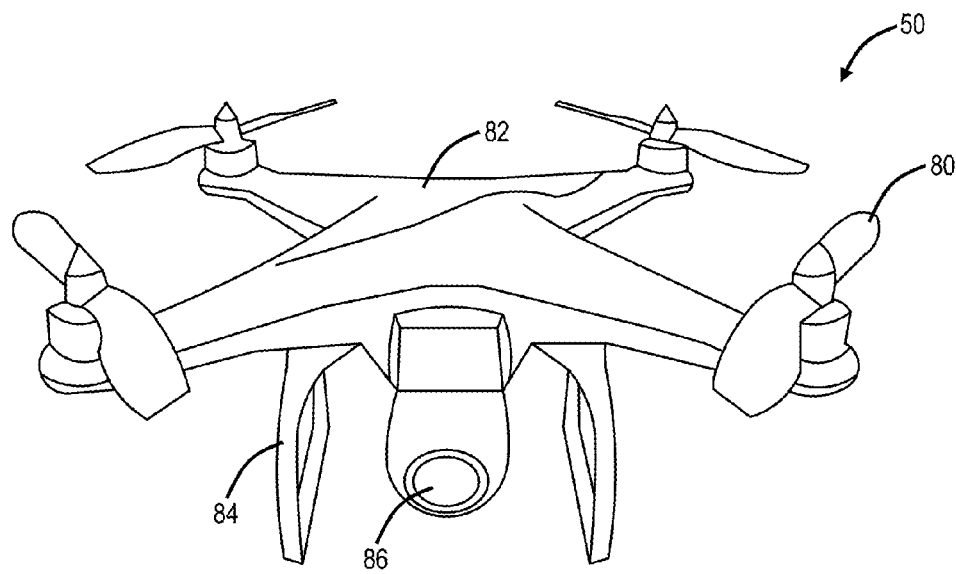
FIG. 4 is a perspective view of an exemplary UAV for use with the systems and methods described herein'

Referring to FIG. 4, in an exemplary embodiment, a perspective view illustrates an exemplary UAV 50 for use with the systems and methods described herein. Again, the UAV 50 may be referred to as a drone or the like. The UAV 50 may be a commercially available UAV platform that has been modified to carry specific electronic components as described herein to implement the various systems and methods. The UAV 50 includes rotors 80 attached to a body 82. A lower frame 84 is located on a bottom portion of the body 82, for landing the UAV 50 to rest on a flat surface and absorb impact during landing. The UAV 50 also includes a camera 86 which is used to take still photographs, video, and the like. Specifically, the camera 86 is used to provide the real-time display on the screen 62. The UAV 50 includes various electronic components inside the body 82 and/or the camera 86 such as, without limitation, a processor, a data store, memory, a wireless interface, and the like. Also, the UAV 50 can include additional hardware, such as robotic arms or the like that allow the UAV 50 to attach/detach components for the cell site components 14. Specifically, it is expected that the UAV 50 will get bigger and more advanced, capable of carrying significant loads, and not just a wireless camera. The present disclosure contemplates using the UAV 50 for various aspects at the cell site 10, including participating in construction or deconstruction of the cell tower 12, the cell site components 14, etc.

These various components are now described with reference to a mobile device 100. Those of ordinary skill in the art will recognize the UAV 50 can include similar components to the mobile device 100. Of note, the UAV 50 and the mobile device 100 can be used cooperatively to perform various aspects of the cell site audit 40 described herein. In other embodiments, the UAV 50 can be operated with a controller instead of the mobile device 100. The mobile device 100 may solely be used for real-time video from the camera 86 such as via a wireless connection (e.g., IEEE 802.11 or variants thereof). Some portions of the cell site audit 40 can be performed with the UAV 50, some with the mobile device 100, and others solely by the operator though visual inspection. In some embodiments, all of the aspects can be performed in the UAV 50. In other embodiments, the UAV 50 solely relays data to the mobile device 100 which performs all of the aspects. Other embodiments are also contemplated.

Figure 5:
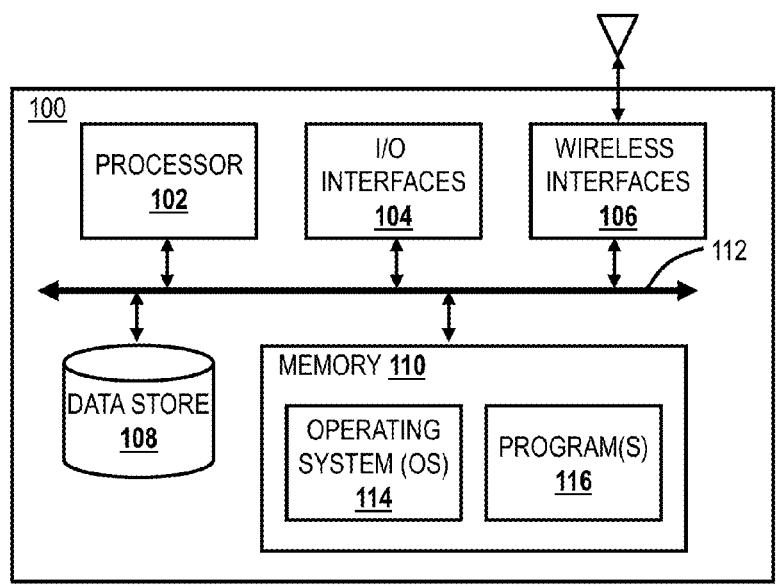

Referring to FIG. 5, in an exemplary embodiment, a block diagram illustrates a mobile device 100, which may be used for the cell site audit 40 or the like. The mobile device 100 can be a digital device that, in terms of hardware architecture, generally includes a processor 102, input/output (I/O) interfaces 104, wireless interfaces 106, a data store 108, and memory 110. It should be appreciated by those of ordinary skill in the art that FIG. 5 depicts the mobile device 100 in an oversimplified manner, and a practical embodiment may include additional components and suitably configured processing logic to support known or conventional operating features that are not described in detail herein. The components (102, 104, 106, 108, and 102) are communicatively coupled via a local interface 112. The local interface 112 can be, for example but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the mobile device 100, a semiconductor-based microprocessor (in the form of a microchip or chip set), or generally any device for executing software instructions. When the mobile device 100 is in operation, the processor 102 is configured to execute software stored within the memory 110, to communicate data to and from the memory 110, and to generally control operations of the mobile device 100 pursuant to the software instructions. In an exemplary embodiment, the processor 102 may include a mobile optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the mobile device 100. Additionally, the I/O interfaces 104 may further include an imaging device, i.e. camera, video camera, etc.

The wireless interfaces 106 enable wireless communication to an external access device or network. Any number of suitable wireless data communication protocols, techniques, or methodologies can be supported by the wireless interfaces 106, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 106 can be used to communicate with the UAV 50 for command and control as well as to relay data therebetween. The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 can include one or more software programs, each of which includes an ordered listing of executable instructions for implementing logical functions. In the example of FIG. 5, the software in the memory 110 includes a suitable operating system (O/S) 114 and programs 116. The operating system 114 essentially controls the execution of other computer programs, and provides scheduling, input-output control, file and data management, memory management, and communication control and related services. The programs 116 may include various applications, add-ons, etc. configured to provide end user functionality with the mobile device 100, including performing various aspects of the systems and methods described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

§ 4.1 RF Sensors in the UAV

In an exemplary embodiment, the UAV 50 can also include one or more RF sensors disposed therein. The RF sensors can be any device capable of making wireless measurements related to signals associated with the cell site components 14, i.e., the antennas. In an exemplary embodiment, the UAV 50 can be further configured to fly around a cell zone associated with the cell site 10 to identify wireless coverage through various measurements associated with the RF sensors.

§ 5.0 Cell Site Audit with UAV and/or Mobile Device

Figure 6:
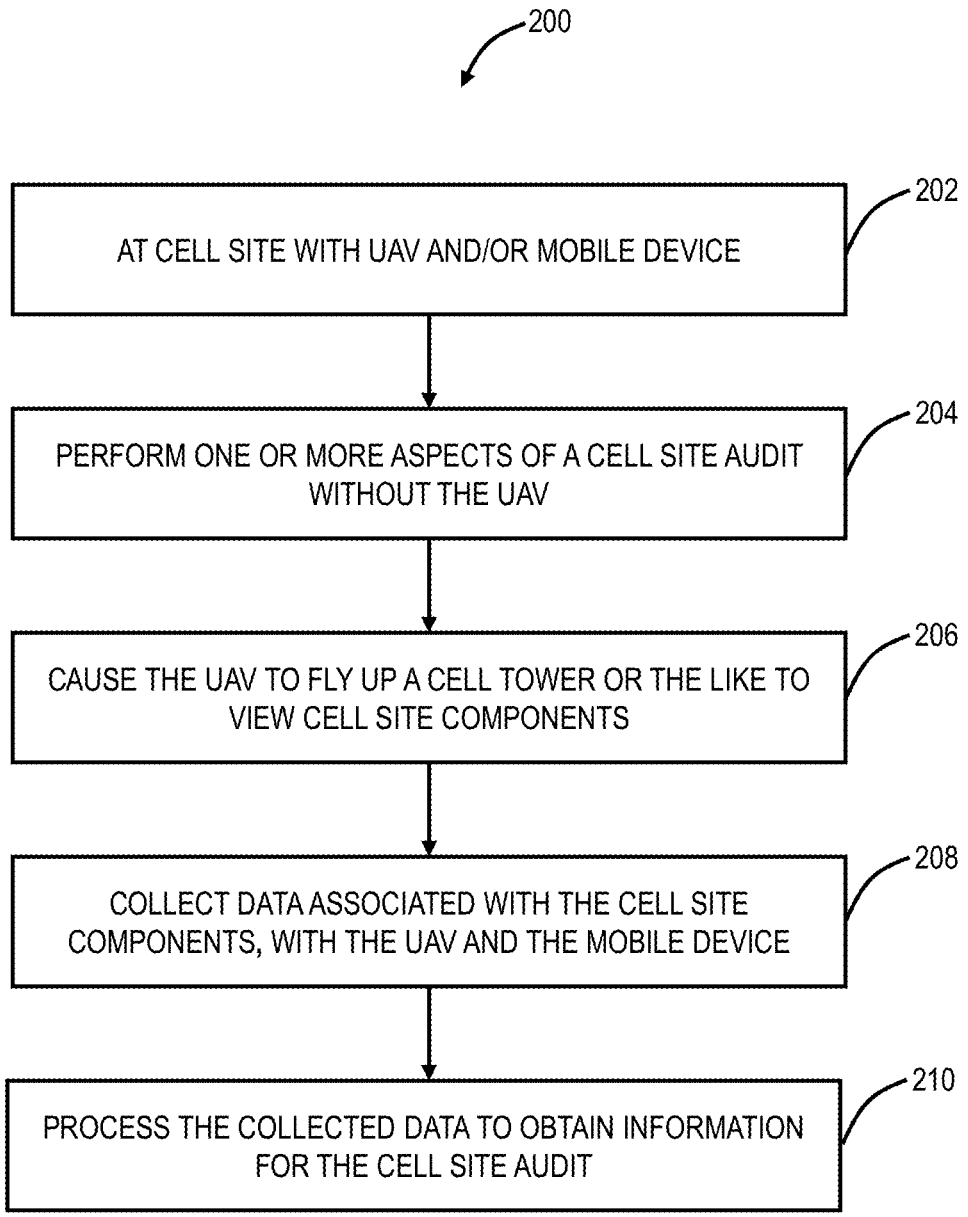
FIG. 6 is a flow chart of a cell site audit method utilizing the UAV and the mobile device.

Referring to FIG. 6, in an exemplary embodiment, a flow chart illustrates a cell site audit method 200 utilizing the UAV 50 and the mobile device 100. Again, in various exemplary embodiments, the cell site audit 40 can be performed with the UAV 50 and the mobile device 100. In other exemplary embodiments, the cell site audit 40 can be performed with the UAV 50 and an associated controller. In other embodiments, the mobile device 100 is solely used to relay real-time video from the camera 86. While the steps of the cell site audit method 200 are listed sequentially, those of ordinary skill in the art will recognize some or all of the steps may be performed in a different order. The cell site audit method 200 includes an engineer/technician at a cell site with the UAV 50 and the mobile device 100 (step 202). Again, one aspect of the systems and methods described herein is usage of the UAV 50, in a commercial setting, but with constraints such that only one operator is required and such that the operator does not have to hold a pilot's license. As described herein, the constraints can include flight of the UAV 50 at or near the cell site 10 only, a flight pattern up and down in a 3D rectangle at the cell tower 12, a maximum height restriction (e.g., 500 feet or the like), and the like. For example, the cell site audit 40 is performed by one of i) a single operator flying the UAV 50 without a license or ii) two operators including one with a license and one to spot the UAV 50.

The engineer/technician performs one or more aspects of the cell site audit 40 without the UAV 50 (step 204). Note, there are many aspects of the cell site audit 40 as described herein. It is not possible for the UAV 50 to perform all of these items such that the engineer/technician could be remote from the cell site 10. For example, access to the shelter or cabinet 52 for audit purposes requires the engineer/technician to be local. In this step, the engineer/technician can perform any audit functions as described herein that do not require climbing.

The engineer/technician can cause the UAV 50 to fly up the cell tower 12 or the like to view cell site components 14 (step 206). Again, this flight can be based on the constraints, and the flight can be through a controller and/or the mobile device 100. The UAV 50 and/or the mobile device 100 can collect data associated with the cell site components 14 (step 208), and process the collected data to obtain information for the cell site audit 40 (step 210). As described herein, the UAV 50 and the mobile device 100 can be configured to collect data via video and/or photographs. The engineer/technician can use this collected data to perform various aspects of the cell site audit 40 with the UAV 50 and the mobile device 100 and without a tower climb.

The foregoing descriptions detail specific aspects of the cell site audit 40 using the UAV 50 and the mobile device 100. In these aspects, data can be collected—generally, the data is video or photographs of the cell site components 14. The processing of the data can be automated through the UAV 50 and/or the mobile device 100 to compute certain items as described herein. Also, the processing of the data can be performed either at the cell site 10 or afterwards by the engineer/technician.

In an exemplary embodiment, the UAV 50 can be a commercial, "off-the-shelf" drone with a Wi-Fi enabled camera for the camera 86. Here, the UAV 50 is flown with a controller pad which can include a joystick or the like. Alternatively, the UAV 50 can be flown with the mobile device 100, such as with an app installed on the mobile device 100 configured to control the UAV 50. The Wi-Fi enable camera is configured to communicate with the mobile device 100—to both display real-time video and audio as well as to capture photos and/or video during the cell site audit 40 for immediate processing or for later processing to gather relevant information about the cell site components 14 for the cell site audit 40.

In another exemplary embodiment, the UAV 50 can be a so-called "drone in a box" which is preprogrammed/configured to fly a certain route, such as based on the flight constraints described herein. The "drone in a box" can be physically transported to the cell site 10 or actually located there. The "drone in a box" can be remotely controlled as well.

§ 5.1 Antenna Down Tilt Angle

In an exemplary aspect of the cell site audit 40, the UAV 50 and/or the mobile device 100 can be used to determine a down tilt angle of individual antennas 30 of the cell site components 14. The down tilt angle can be determined for all of the antennas 30 in all of the sectors 54, 56, 58. The down tilt angle is the mechanical (external) down tilt of the antennas 30 relative to a support bar 200. In the cell site audit 40, the down tilt angle is compared against an expected value, such as from a Radio Frequency (RF) data sheet, and the comparison may check to ensure the mechanical (external) down tilt is within ±1.0° of specification on the RF data sheet.

Using the UAV 50 and/or the mobile device 100, the down tilt angle is determined from a photo taken from the camera 86. In an exemplary embodiment, the UAV 50 and/or the mobile device 100 is configured to measure three points—two defined by the antenna 30 and one by the support bar 200 to determine the down tilt angle of the antenna 30. For example, the down tilt angle can be determined visually from the side of the antenna 30—measuring a triangle formed by a top of the antenna 30, a bottom of the antenna 30, and the support bar 200.

§ 5.2 Antenna Plumb

In an exemplary aspect of the cell site audit 40 and similar to determining the down tilt angle, the UAV 50 and/or the mobile device 100 can be used to visually inspect the antenna 30 including its mounting brackets and associated hardware. This can be done to verify appropriate hardware installation, to verify the hardware is not loose or missing, and to verify that antenna 30 is plumb relative to the support bar 200.

§ 5.3 Antenna Azimuth

In an exemplary aspect of the cell site audit 40, the UAV 50 and/or the mobile device 100 can be used to verify the antenna azimuth, such as verifying the antenna azimuth is oriented within ±5° as defined on the RF data sheet. The azimuth (AZ) angle is the compass bearing, relative to true (geographic) north, of a point on the horizon directly beneath an observed object. Here, the UAV 50 and/or the mobile device 100 can include a location determining device such as a Global Positioning Satellite (GPS) measurement device. The antenna azimuth can be determined with the UAV 50 and/or the mobile device 100 using an aerial photo or the GPS measurement device.

§ 5.4 Photo Collections

As part of the cell site audit 40 generally, the UAV 50 and/or the mobile device 100 can be used to document various aspects of the cell site 10 by taking photos or video. For example, the mobile device 100 can be used to take photos or video on the ground in or around the shelter or cabinet 52 and the UAV 500 can be used to take photos or video up the cell tower 12 and of the cell site components 14. The photos and video can be stored in any of the UAV 50, the mobile device 100, the cloud, etc.

In an exemplary embodiment, the UAV can also hover at the cell site 10 and provide real-time video footage back to the mobile device 100 or another location (for example, a Network Operations Center (NOC) or the like).

§ 5.5 Compound Length/Width

The UAV 50 can be used to fly over the cell site 10 to measure the overall length and width of the cell site 10 compound from overhead photos. In one aspect, the UAV 50 can use GPS positioning to detect the length and width by flying over the cell site 10. In another aspect, the UAV 50 can take overhead photos which can be processed to determine the associated length and width of the cell site 10.

§ 5.6 Data Capture—Cell Site Audit

The UAV 50 can be used to capture various pieces of data via the camera 86. That is, with the UAV 50 and the mobile device 100, the camera 86 is equivalent to the engineer/technician's own eyes, thereby eliminating the need for the engineer/technician to physically climb the tower. One important aspect of the cell site audit 40 is physically collecting various pieces of information—either to check records for consistency or to establish a record. For example, the data capture can include determining equipment module types, locations, connectivity, serial numbers, etc. from photos. The data capture can include determining physical dimensions from photos or from GPS such as the cell tower 12 height, width, depth, etc. The data capture can also include visual inspection of any aspect of the cell site 10, cell tower 12, cell site components 14, etc. including, but not limited to, physical characteristics, mechanical connectivity, cable connectivity, and the like.

The data capture can also include checking the lighting rod 16 and the warning light 18 on the cell tower 12. Also, with additional equipment on the UAV 50, the UAV 50 can be configured to perform maintenance such as replacing the warning light 18, etc. The data capture can also include checking maintenance status of the cell site components 14 visually as well as checking associated connection status. Another aspect of the cell site audit 40 can include checking structural integrity of the cell tower 12 and the cell site components 14 via photos from the UAV 50.

§ 5.7 Flying the UAV at the Cell Site

In an exemplary embodiment, the UAV 50 can be programmed to automatically fly to a location and remain there without requiring the operator to control the UAV 50 in real-time, at the cell site 10. In this scenario, the UAV 50 can be stationary at a location in the air at the cell site 10. Here, various functionality can be incorporated in the UAV 50 as described herein. Note, this aspect leverages the ability to fly the UAV 50 commercially based on the constraints described herein. That is, the UAV 50 can be used to fly around the cell tower 12, to gather data associated with the cell site components 14 for the various sectors 54, 56, 58. Also, the UAV 50 can be used to hover around the cell tower 12, to provide additional functionality described as follows.

§ 5.8 Video/Photo Capture—Cell Site

With the UAV 50 available to operate at the cell site 10, the UAV 50 can also be used to capture video/photos while hovering. This application uses the UAV 50 as a mobile video camera to capture activity at or around the cell site 10 from the air. It can be used to document work at the cell site 10 or to investigate the cell site 10 responsive to problems, e.g. tower collapse. It can be used to take surveillance video of surrounding locations such as service roads leading to the cell site 10, etc.

§ 5.9 Wireless Service Via the UAV

Again, with the ability to fly at the cell site 10, subject to the constraints, the UAV 50 can be used to provide temporary or even permanent wireless service at the cell site. This is performed with the addition of wireless service-related components to the UAV 50. In the temporary mode, the UAV 50 can be used to provide service over a short time period, such as responding to an outage or other disaster affecting the cell site 10. Here, an operator can cause the UAV 50 to fly where the cell site components 14 are and provide such service. The UAV 50 can be equipped with wireless antennas to provide cell service, Wireless Local Area Network (WLAN) service, or the like. The UAV 50 can effectively operate as a temporary tower or small cell as needed.

In the permanent mode, the UAV 50 (along with other UAVs 50) can constantly be in the air at the cell site 10 providing wireless service. This can be done similar to the temporary mode, but over a longer time period. The UAV 50 can be replaced over a predetermined time to refuel or the like. The replacement can be another UAV 50. The UAV 50 can effectively operate as a permanent tower or small cell as needed.

§ 6.0 Flying the UAV from Cell Site to Another Cell Site

Figure 7:
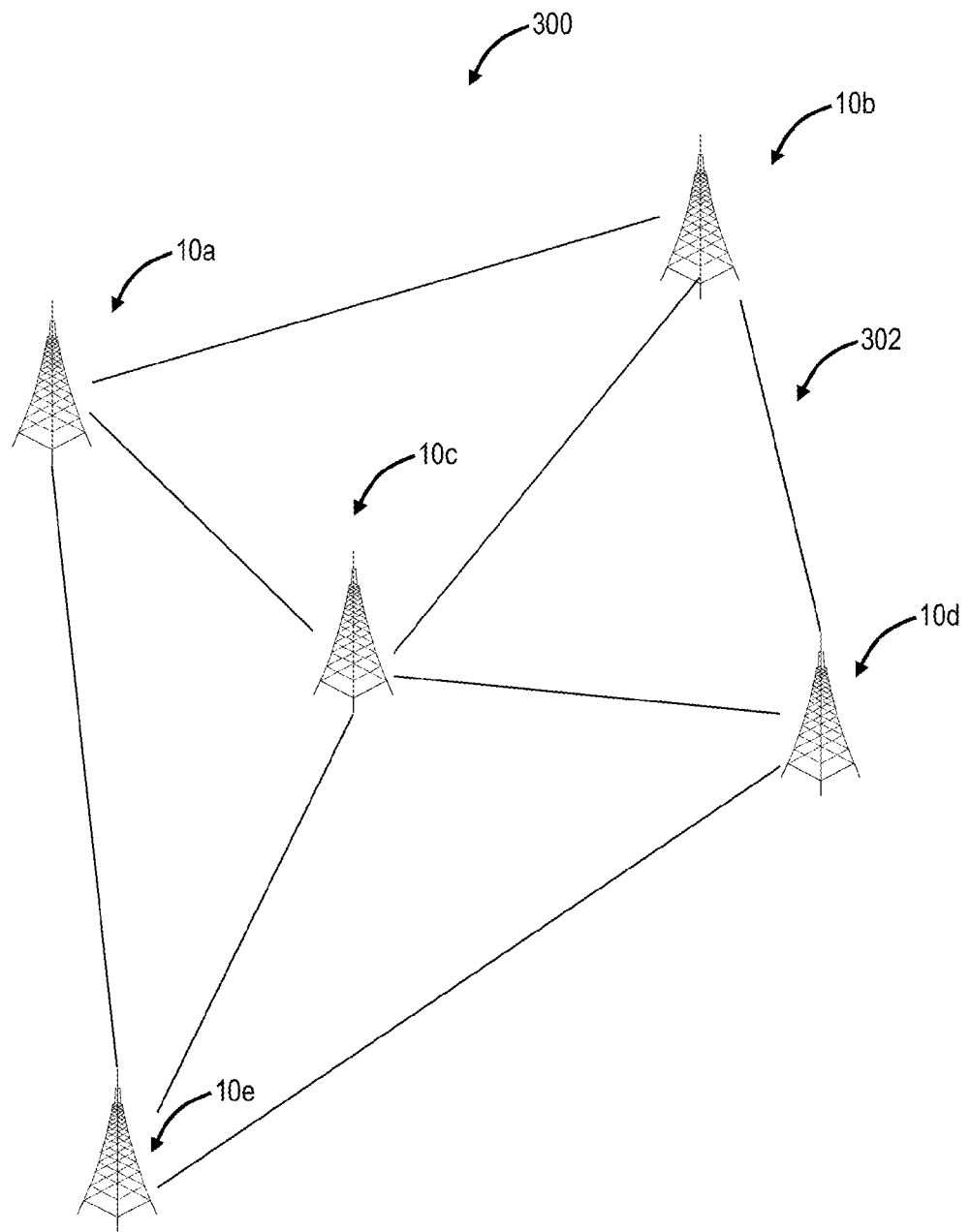
FIG. 7 is a network diagram of various cell sites deployed in a geographic region.

As described herein, the flight constraints include operating the UAV 50 vertically in a defined 3D rectangle at the cell site 10. In another exemplary embodiment, the flight constraints can be expanded to allow the 3D rectangle at the cell site 10 as well as horizontal operation between adjacent cell sites 10. Referring to FIG. 7, in an exemplary embodiment, a network diagram illustrates various cell sites 10a-10e deployed in a geographic region 300. In an exemplary embodiment, the UAV 50 is configured to operate as described herein, such as in FIG. 2, in the vertical 3D rectangular flight pattern, as well as in a horizontal flight pattern between adjacent cell sites 10. Here, the UAV 50 is cleared to fly, without the commercial regulations, between the adjacent cell sites 10.

In this manner, the UAV 50 can be used to perform the cell site audits 40 at multiple locations—note, the UAV 50 does not need to land and physically be transported to the adjacent cell sites 10. Additionally, the fact that the FAA will allow exemptions to fly the UAV 50 at the cell site 10 and between adjacent cell sites 10 can create an interconnected mesh network of allowable flight paths for the UAV 50. Here, the UAV 50 can be used for other purposes besides those related to the cell site 10. That is, the UAV 50 can be flown in any application, independent of the cell sites 10, but without requiring FAA regulation. The applications can include, without limitation, a drone delivery network, a drone surveillance network, and the like.

As shown in FIG. 7, the UAV 50, at the cell site 10a, can be flown to any of the other cell sites 10b-10e along flight paths 302. Due to the fact that cell sites 10 are numerous and diversely deployed in the geographic region 300, an ability to fly the UAV 50 at the cell sites 10 and between adjacent cell sites 10 creates an opportunity to fly the UAV 50 across the geographic region 300, for numerous applications.

§ 7.0 UAV and Cell Towers

Additionally, the systems and methods describe herein contemplate practically any activity at the cell site 10 using the UAV 50 in lieu of a tower climb. This can include, without limitation, any tower audit work with the UAV 50, any tower warranty work with the UAV 50, any tower operational ready work with the UAV 50, any tower construction with the UAV 50, any tower decommissioning/deconstruction with the UAV 50, any tower modifications with the UAV 50, and the like.

§ 8.0 Tethered UAV Systems and Methods

Figure 8:
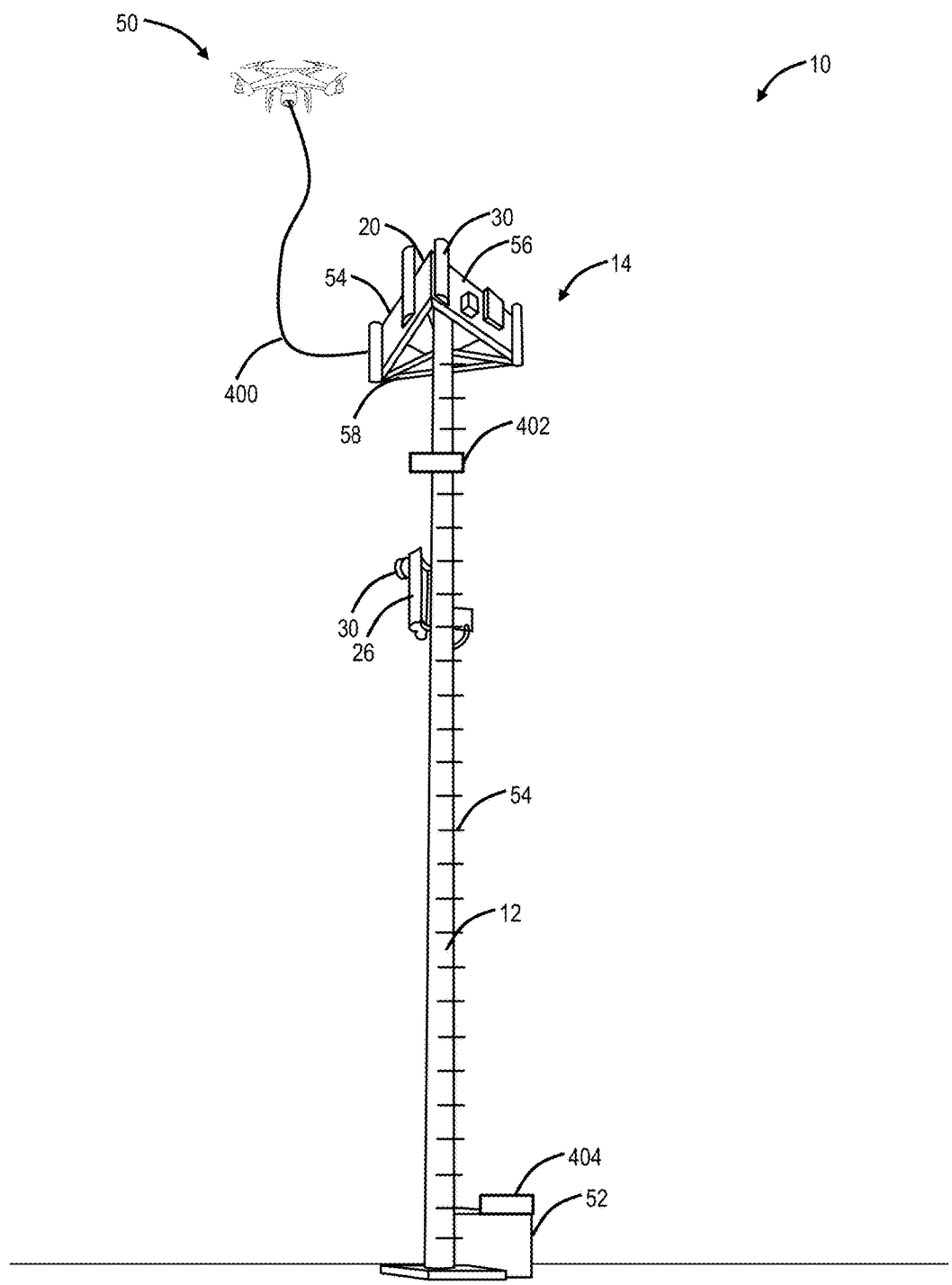
FIG. 8 is a diagram of a tethered configuration with a UAV at a cell site.
Figure 9:
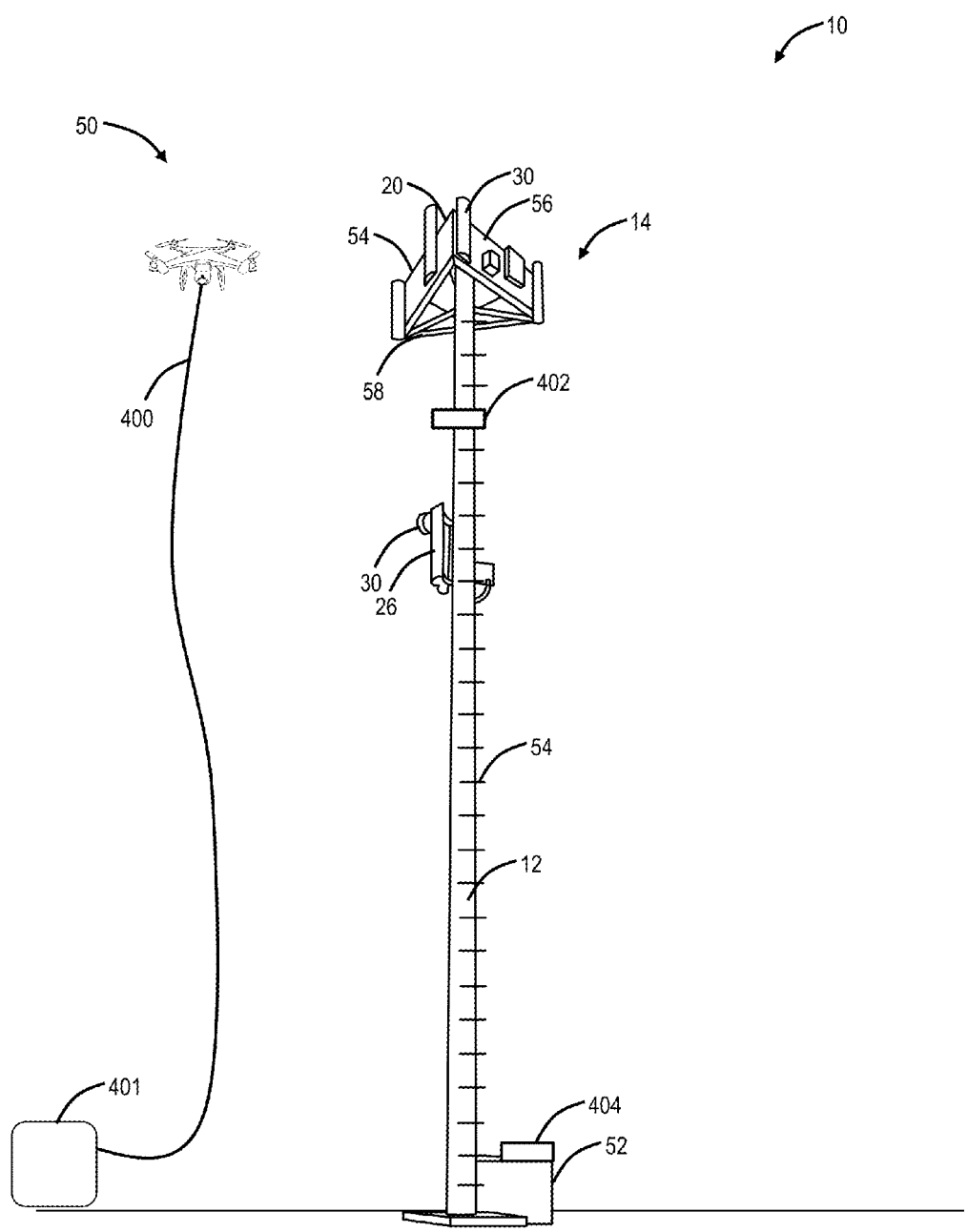
FIG. 9 is a diagram of another tethered configuration with a UAV at a cell site.
Figure 10:
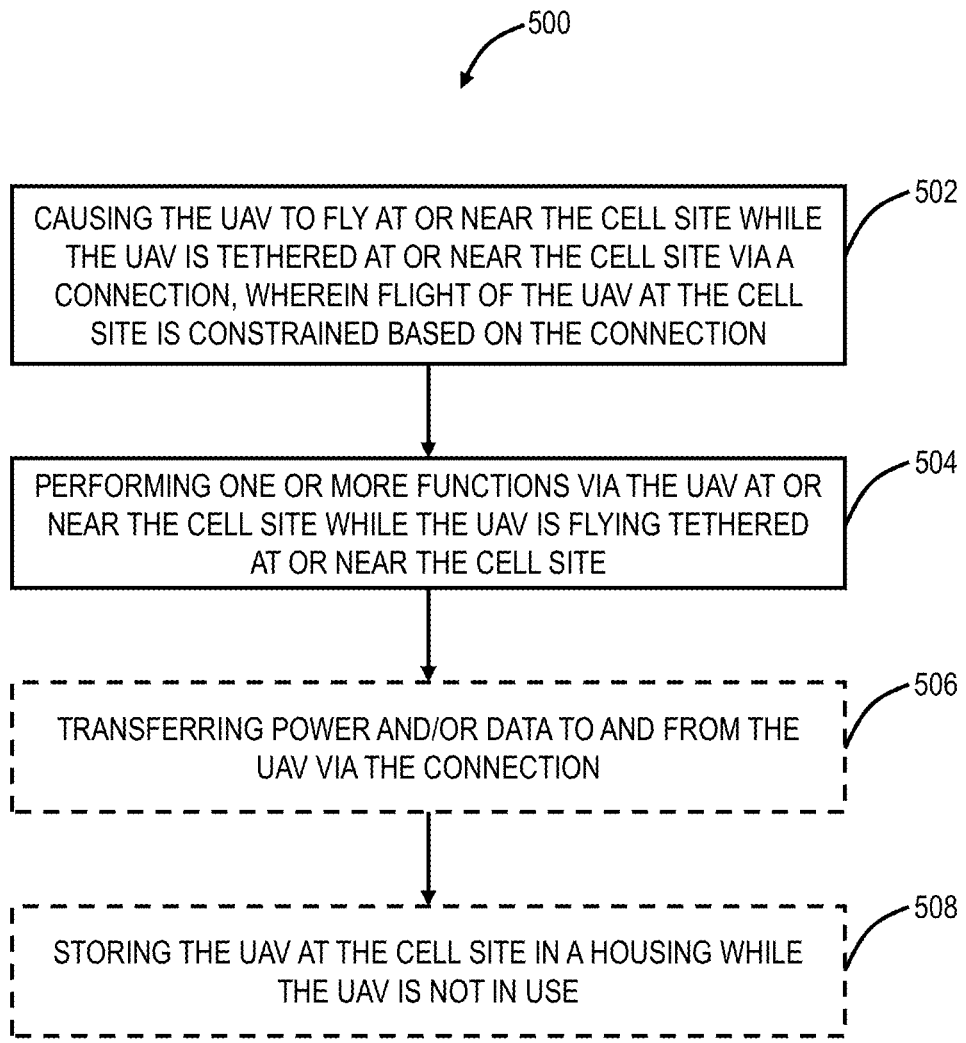
FIG. 10 is a flowchart of a method with a tethered UAV associated with a cell site.

Referring to FIGS. 8 and 9, in an exemplary embodiment, diagrams illustrate a cell site 10 for illustrating the UAV 50 and associated tethered UAV systems and methods. Specifically, FIGS. 8 and 9 is similar to FIG. 2, but here, the UAV 50 is tethered at or near the cell site 10 via a connection 400. The connection 400 can include a cable, a rope, a power cable, a communications cable, a fiber optic cable, etc., i.e., any connection with strength to constrain the UAV 50 to the cell site 10. In an exemplary embodiment in FIG. 8, the connection 400 is tethered to the top of the cell tower 12, such as at the cell site components 14 or at one of the alpha sector 54, beta sector 56, and gamma sector 58. In another exemplary embodiment in FIG. 8, the connection 400 is tethered to the cell tower 12 itself, such as at any point between the base and the top of the cell tower 12. In a further exemplary embodiment in FIG. 8, the connection 400 is tethered to the bottom of the cell site 10, such as at the shelter or cabinet 52 or a base of the cell tower 12. Specifically, in FIG. 8, the tethered configuration includes the connection 400 coupled to some part of the cell tower 12 or the like.

In FIG. 9, the tethered configuration includes the connection 400 coupled to something that is not part of the cell tower 12, such as a connection point 401, i.e., in FIG. 9, the UAV 50 is tethered at or near the cell site 10 and, in FIG. 8, the UAV 50 is tethered at the cell tower 12. In various exemplary embodiments, the connection point 401 can include, without limitation, a stake, a pole, a weight, a fence, a communications device, a wireless radio, a building or other structure, or any other device or object at or near the cell site 12. As described herein, the UAV 50 is in a tethered configuration where the UAV 50 is coupled at or near the cell site 10 via the connection 400.

In an exemplary embodiment, the UAV 50 can be housed or located at or near the cell site 10, connected via the connection 400, and stored in housings 402, 404, for example. The housings 402, 404 are shown for illustration purposes, and different locations are also contemplated. The housing 402 is on the cell tower 12, and the housing 404 is at or part of the shelter or cabinet 52. In operation, the UAV 50 is configured to selectively enter/exit the housing 402, 404. The connection 400 can be tethered to or near the housing 402, 404. The housing 402, 404 can include a door that selectively opens/closes. Alternatively, the housing 402, 404 includes an opening where the UAV 50 enters and exits. The housing 402, 404 can be used to store the UAV 50 while not in operation.

One unique aspect of the tethered configuration described herein, i.e., the UAV 50 with the connection 400, is that the UAV 50 can now be viewed as an attached device to the cell site 10, and not a free-flying drone. Advantageously, such a configuration can avoid airspace regulations or restrictions. Furthermore, with the connection 400 providing power and/or data connectivity, the UAV 50 contemplates extended periods of time for operation.

As costs decrease, it is feasible to deploy the UAV 50 with the connections 400 and optionally the housing 402, 404 at all cell sites 10. The UAV 50 with the connection 400 contemplates implementing all of the same functionality described herein with respect to FIGS. 1-6. Specifically, the UAV 50 with the connection 400 can be used to perform the cell site audit 40 and the like as well as other features. Also, the UAV 50 with the connection 400 is ideal to act as a wireless access point for wireless service. Here, the connection 400 can provide data and/or power, and be used for 1) additional capacity as needed or 2) a protection antenna to support active components in the cell site components 14 that fail. The UAV 50 with the connection 400 can be used to support overflow capacity as well as needed, providing LTE, WLAN, WiMAX, or any other wireless connectivity. Alternatively, the UAV 50 can be used as an alternative service provider to provide wireless access at the cell site 10 without requiring antennas on the cell tower 12.

Referring to FIG. 8, in an exemplary embodiment, a flowchart illustrates a method 500 with a tethered Unmanned Aerial Vehicle (UAV) associated with a cell site. The method 500 includes causing the UAV to fly at or near the cell site while the UAV is tethered at or near the cell site via a connection, wherein flight of the UAV at or near the cell site is constrained based on the connection (step 502); and performing one or more functions via the UAV at or near the cell site while the UAV is flying tethered at or near the cell site (step 504).

The method 500 can further include transferring power and/or data to and from the UAV via the connection (step 506). The connection can include one or more of a cable, a rope, a power cable, a communications cable, and a fiber optic cable. The one or more functions can include functions related to a cell site audit. The one or more functions can include functions related to providing wireless service via the UAV at the cell site, wherein data and/or power is transferred between the UAV and the cell site to perform the wireless service. The one or more functions can include providing visual air traffic control via one or more cameras on the UAV. The method 500 can further include storing the UAV at the cell site in a housing while the UAV is not in use. The UAV can be configured to fly extended periods at the cell site utilizing power from the connection, where the extended periods are longer than if the UAV did not have power from the connection. The connection can be configured to constrain a flight path of the UAV at the cell site.

In another exemplary embodiment, a tethered Unmanned Aerial Vehicle (UAV) associated with a cell site includes one or more rotors disposed to a body, wherein the body is tethered to the cell site via a connection; a camera associated with the body; wireless interfaces; a processor coupled to the wireless interfaces and the camera; and memory storing instructions that, when executed, cause the processor to: process commands to cause the one or more rotors to fly the UAV at the cell site while the UAV is tethered to the cell site via the connection, wherein flight of the UAV at the cell site is constrained based on the connection; and perform one or more functions via the UAV at the cell site while the UAV is flying tethered to the cell site, utilizing one or more of the camera and the wireless interfaces.

§ 8.1 Tethered UAV Systems and Methods—Visual Air Traffic Control

In an exemplary embodiment, the tethered UAV 50 can be configured to provide visual air traffic control such as for other UAVs or drones. Here, various tethered UAVs 50 can be deployed across a geographic region at various cell sites 10 and each UAV 50 can have one or more cameras that can provide a 360 degree view around the cell site 10. This configuration essentially creates a drone air traffic control system that could be monitored and controlled by Network Control Center (NOC). Specifically, the UAV 50 can be communicatively coupled to the NOC, such as via the connection 400. The NOC can provide the video feeds of other drones to third parties (e.g., Amazon) and other drone users to comply with current FAA regulations that require eyes on drones at all times.

§ 9.0 UAV Systems and Methods Using Robotic Arms or the Like

Figure 11:
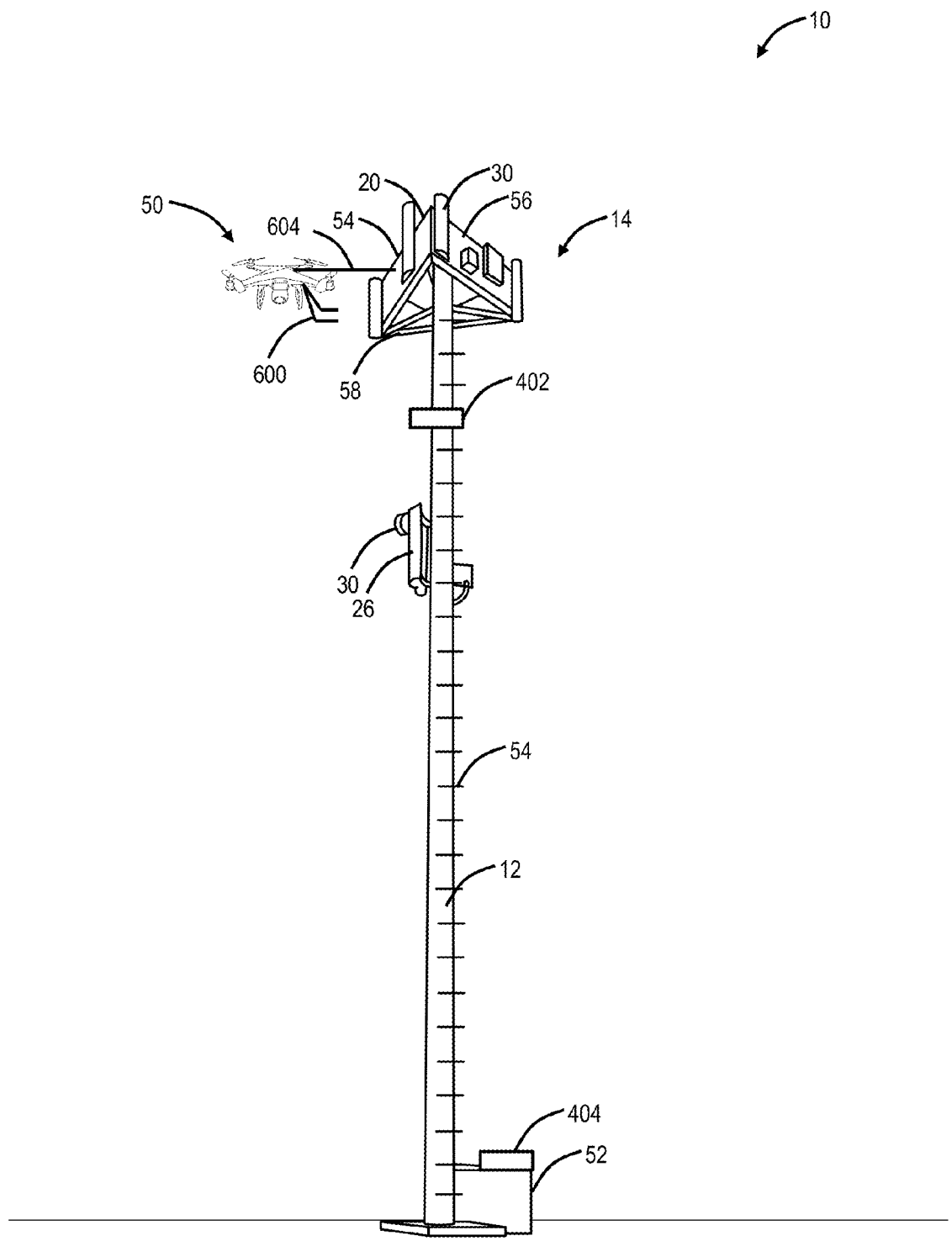
FIG. 11 is a diagram of a UAV with robotic arms at a cell site.
Figure 12:
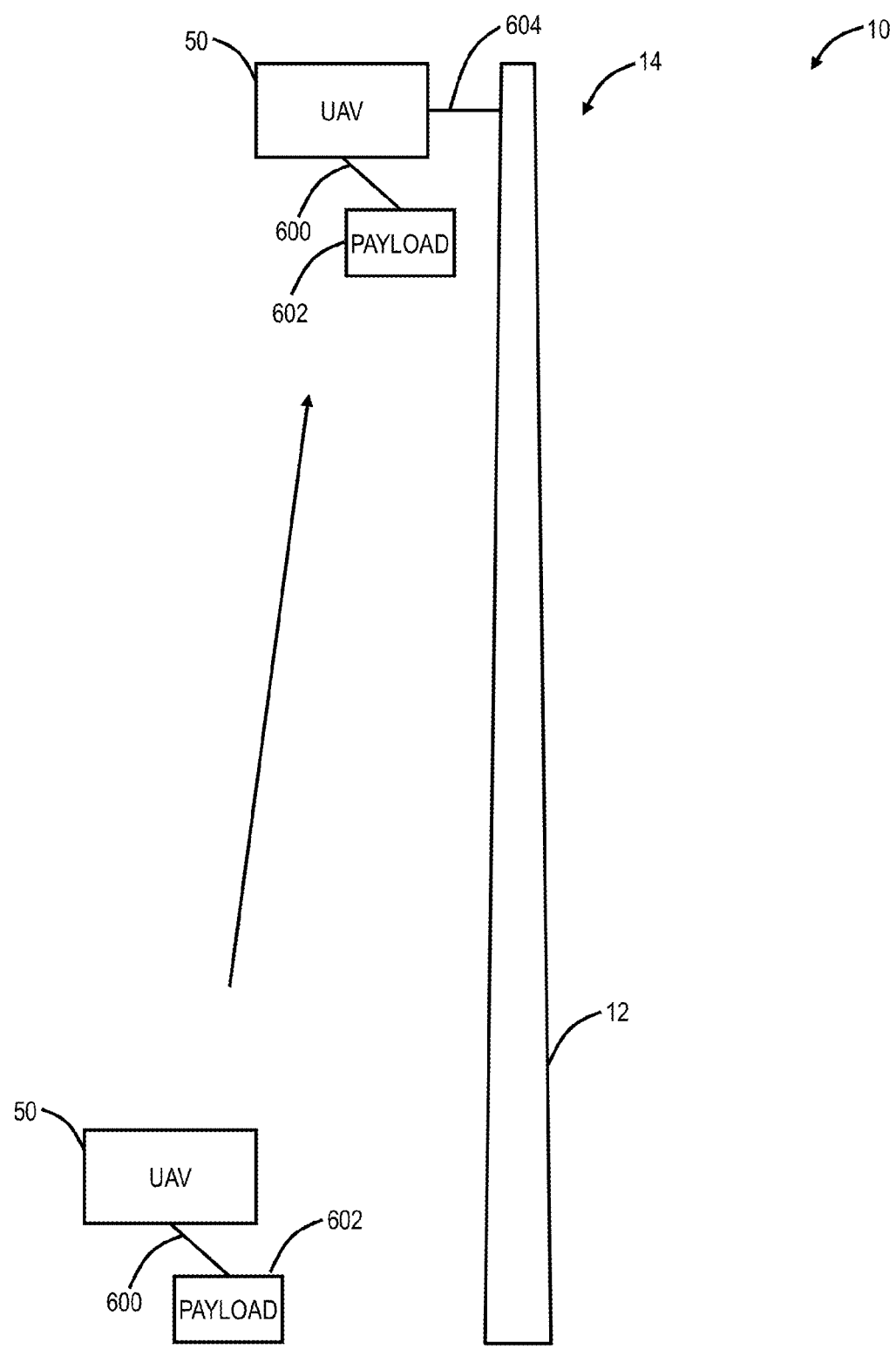
FIG. 12 is a block diagram of the UAV with robotic arms and a payload at a cell site.

Referring to FIGS. 11 and 12, in an exemplary embodiment, diagrams illustrate a cell site 10 for illustrating the UAV 50 and associated UAV systems and methods with robotic arms for performing operations associated with the cell site components 14. Specifically, FIGS. 11 and 12 is similar to FIG. 2 (and FIGS. 8 and 9), but here, the UAV 50 is equipped with one or more robotic arms 600 for carrying payload 602 and/or performing operations associated with the cell site components 14 on the cell tower 12. Since the robotic arms 600 and the payload 602 add weight and complexity when maneuvering, the systems and methods include a connection 604 between the UAV 50 and the cell tower 12 which physically supports the UAV 50 at the cell site components 14. In this manner, there are no counterbalance requirements for the UAV 50 for the robotic arms 600 and the payload 602. In another exemplary embodiment, the connection 604 can also provide power to the UAV 50 in addition to physically supporting the UAV 50. That is, the connection 604 is adapted to provide power to the UAV 50 when connected thereto. Specifically, the robotic arms 600 could require a large amount of power, which can come from a power source connected through the connection 604 to the UAV. In an exemplary embodiment, the UAV 50, once physically connected to the connection 604, can shut off the flight and local power components and operate the robotic arms 600 via power from the connection 604.

In another exemplary embodiment, the UAV 50 with the robotic arms 600 can utilize the tethered configuration where the UAV 50 is coupled at or near the cell site 10 via the connection 400. Here, the UAV 50 can use both the connection 400 for a tether and the connection 604 for physical support/stability when at the cell tower 12 where operations are needed. Here, the connection 400 can be configured to provide power to the UAV 50 as well. The UAV 50 can also fly up the connection 400 from the ground that supplies power and any other functions such as a video feed up or down. The tethered UAV 500 attaches itself to the cell tower 12 via the connection 604, shuts off rotors, engages the robotic arms 600 and then does work, but in this case the power for those robotic arms 600 as well as the rotors comes from a power feed in the connection 400 that is going down to the ground. The UAV 50 also may or may not have a battery and it may or may not be used.

The UAV 50 with the robotic arms 600 is configured to fly up the cell tower 12, with or without the payload 602. For example, with the payload 602, the UAV 50 can be used to bring components to the cell site components 14, flying up the cell tower 12. Without the payload 602, the UAV 50 is flown to the top with the robotic arms 600 for performing operations on the cell tower 12 and the cell site components 14. In both cases, the UAV 50 is configured to fly up the cell tower 12, including using all of the constraints described herein. During flight, the UAV 50 with the robotic arms 600 and with or without the payload 602 does not have a counterbalance issue because the robotic arms 600 and the payload 602 are fixed, i.e., stationary. That is, the UAV 50 flies without movement of the robotic arms 600 or the payload 603 during the flight.

Once the UAV 50 reaches a desired location on the cell tower 12, the UAV 50 is configured to physically connect via the connection 604 to the cell tower 12, the cell site components 14, or the like. Specifically, via the connection 604, the UAV 50 is configured to be physically supported without the rotors 80 or the like operating. That is, via the connection 604, the UAV 50 is physically supporting without flying, thereby eliminating the counterbalancing problems. Once the connection 604 is established and the UAV 50 flight components are disengaged, the robotic arms 600 and the payload 602 can be moved, manipulated, etc. without having balancing problems that have to be compensated by the flight components. This is because the connection 604 bears the weight of the UAV 50, allowing any movement by the robotic arms 600 and/or the payload 602.

In an exemplary embodiment, the connection 604 includes a grappling arm that extends from the UAV 50 and physically attaches to the cell tower 12, such as a grappling hook or the like. In another exemplary embodiment, the connection 604 includes an arm located on the cell tower 12 that physically connects to a connection point in the UAV 50. Of course, the systems and methods contemplate various connection techniques for the connection 604. The connection 604 has to be strong enough to support the weight of the UAV 50, the robotic arms 600, and the payload 602.

In an exemplary embodiment, the UAV 50 can carry the payload 602 up the cell tower 12. The payload 602 can include wireless components, cables, nuts/bolts, antennas, supports, braces, lighting rods, lighting, electronics, RF equipment, combinations thereof, and the like. That is, the payload 602 can be anything associated with the cell site components 14. With the robotic arms 600, the UAV 500 can be used to perform operations associated with the payload 602. The operations can include, without limitation, installing cables, installing nuts/bolts to structures or components, installing antennas, installing supports or braces, installing lighting rods, installing electronic or RF equipment, etc.

In another exemplary embodiment, the UAV 50 does not include the payload 602 and instead uses the robotic arms 600 to perform operations on existing cell site components 14. Here, the UAV 50 is flown up the cell site 12 and connected to the connection 604. Once connected and the flight components disengaged, the UAV 50 can include manipulation of the robotic arms 600 to perform operations on the cell site components 14. The operations can include, without limitation, manipulating cables, removing/tightening nuts/bolts to structures or components, adjusting antennas, adjusting lighting rods, replacing bulbs in lighting, opening/closing electronic or RF equipment, etc.

Figure 13:
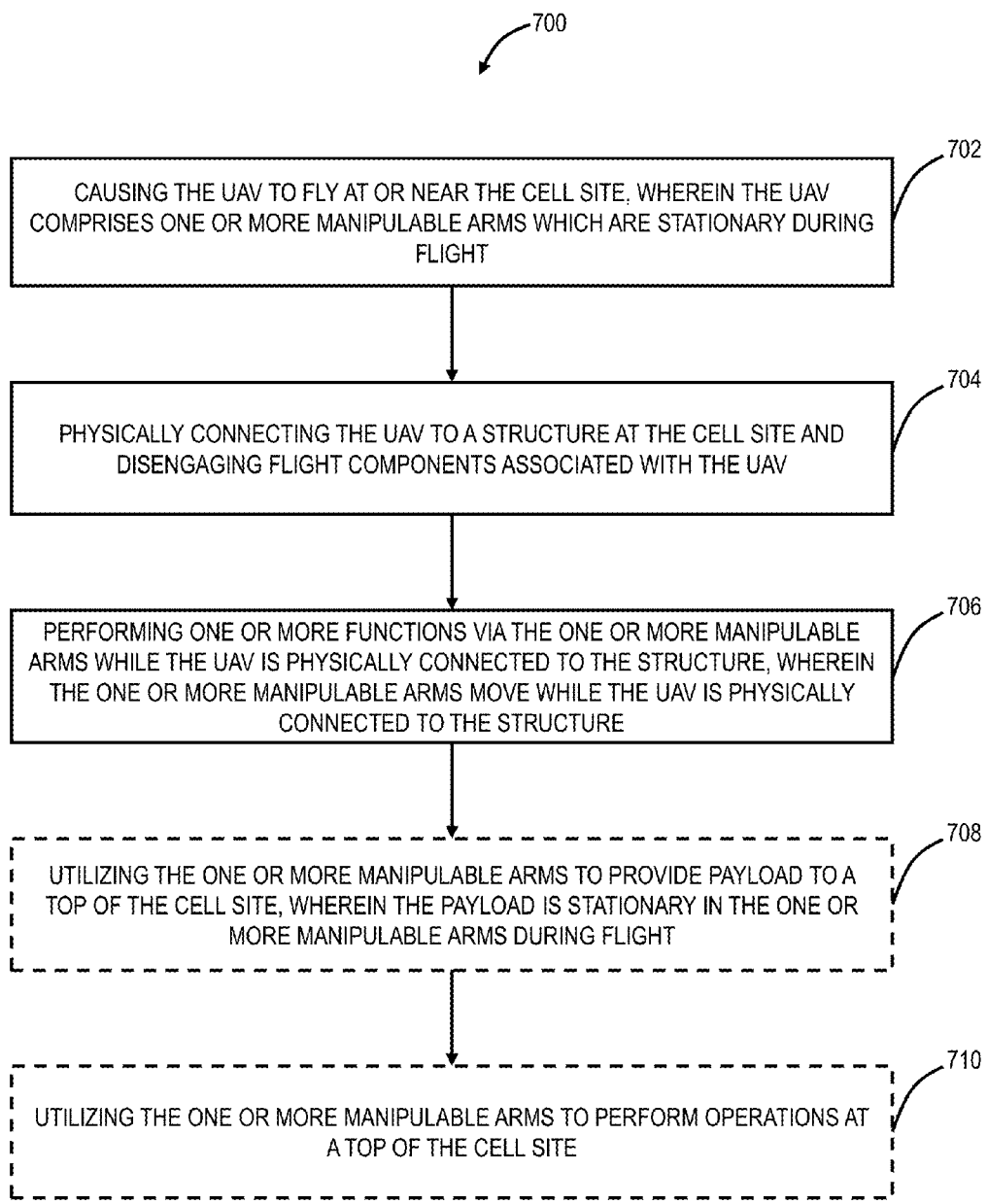
FIG. 13 is a flowchart of a method with a UAV with robotic arms at a cell site.

Referring to FIG. 13, in an exemplary embodiment, a flowchart illustrates a method 700 with a UAV with robotic arms at a cell site. The method 700 contemplates operation with the UAV 50 with the robotic arms 600 and optionally with the payload 602. The method 700 includes causing the UAV to fly at or near the cell site, wherein the UAV includes one or more manipulable arms which are stationary during flight (step 702); physically connecting the UAV to a structure at the cell site and disengaging flight components associated with the UAV (step 704); and performing one or more functions via the one or more manipulable arms while the UAV is physically connected to the structure, wherein the one or more manipulable arms move while the UAV is physically connected to the structure (step 706). The method 700 can further include utilizing the one or more manipulable arms to provide payload to a cell tower at the cell site, wherein the payload is stationary in the one or more manipulable arms during flight (step 708). The payload can include any of wireless components, cables, nuts/bolts, antennas, supports, braces, lighting rods, lighting, electronics, and combinations thereof. The method 700 can further include utilizing the one or more manipulable arms to perform operations on a cell tower at the cell site (step 710). The operations can include any of installing wireless components, installing cables, installing nuts/bolts, installing antennas, installing supports, installing braces, installing lighting rods, installing lighting, installing electronics, and combinations thereof. The physically connecting can include extending a grappling arm from the UAV to attach to the structure. The physically connecting can include connecting the UAV to an arm extending from the structure which is connectable to the UAV. The physically connecting can be via a connection which bears weight of the UAV, enabling movement of the one or more manipulable arms without requiring counterbalancing of the UAV due to the movement while the UAV is in flight.

§ 10.0 Cell Site Operations

There are generally two entities associated with cell sites—cell site owners and cell site operators. Generally, cell site owners can be viewed as real estate property owners and managers. Typical cell site owners may have a vast number of cell sites, such as tens of thousands, geographically dispersed. The cell site owners are generally responsible for the real estate, ingress and egress, structures on site, the cell tower itself, etc. Cell site operators generally include wireless service providers who generally lease space on the cell tower and in the structures for antennas and associated wireless backhaul equipment. There are other entities that may be associated with cell sites as well including engineering firms, installation contractors, and the like. All of these entities have a need for the various UAV-based systems and methods described herein. Specifically, cell site owners can use the systems and methods for real estate management functions, audit functions, etc. Cell site operators can use the systems and methods for equipment audits, troubleshooting, site engineering, etc. Of course, the systems and methods described herein can be provided by an engineering firm or the like contracted to any of the above entities or the like. The systems and methods described herein provide these entities time savings, increased safety, better accuracy, lower cost, and the like.

§ 11.0 3D Modeling Systems and Methods with UAVs

Figure 14:
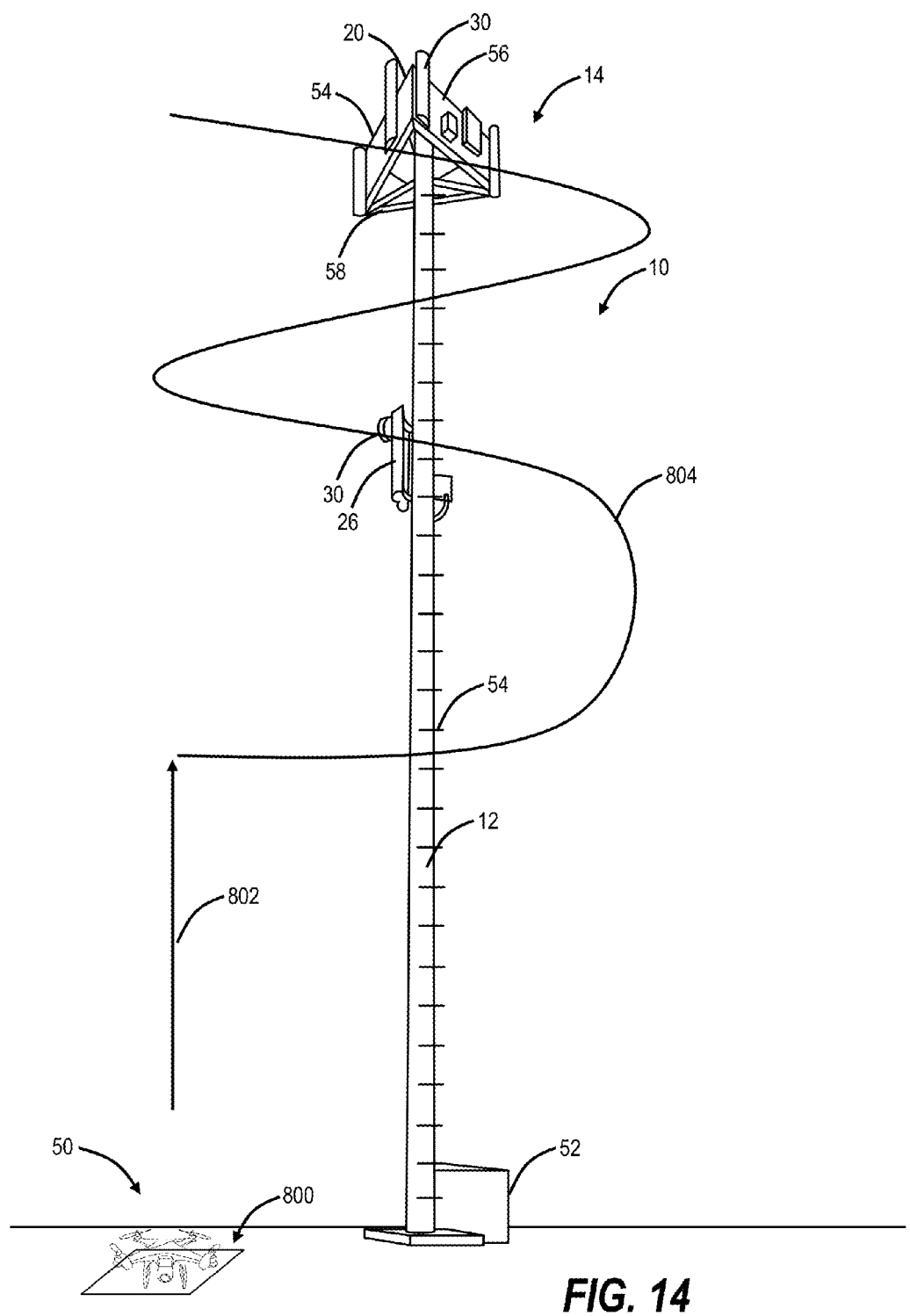
FIG. 14 is a diagram of the cell site and an associated launch configuration and flight for the UAV to obtain photos for a 3D model of the cell site.

Referring to FIG. 14, in an exemplary embodiment, a diagram illustrates the cell site 10 and an associated launch configuration and flight for the UAV 50 to obtain photos for a 3D model of the cell site 10. Again, the cell site 10, the cell tower 12, the cell site components 14, etc. are as described herein. To develop a 3D model, the UAV 50 is configured to take various photos during flight, at different angles, orientations, heights, etc. to develop a 360 degree view. For post processing, it is important to accurately differentiate between different photos. In various exemplary embodiments, the systems and methods utilize accurate location tracking for each photo taken. It is important for accurate correlation between photos to enable construction of a 3D model from a plurality of 2D photos. The photos can all include multiple location identifiers (i.e., where the photo was taken from, height and exact location). In an exemplary embodiment, the photos can each include at least two distinct location identifiers, such as from GPS or GLONASS. GLONASS is a "GLObal NAvigation Satellite System" which is a space-based satellite navigation system operating in the radio navigation-satellite service and used by the Russian Aerospace Defense Forces. It provides an alternative to GPS and is the second alternative navigational system in operation with global coverage and of comparable precision. The location identifiers are tagged or embedded to each photo and indicative of the location of the UAV 50 where and when the photo was taken. These location identifiers are used with objects of interest identified in the photo during post processing to create the 3D model.

In fact, it was determined that location identifier accuracy is very important in the post processing for creating the 3D model. One such determination was that there are slight inaccuracies in the location identifiers when the UAV 50 is launched from a different location and/or orientation. Thus, to provide further accuracy for the location identifiers, each flight of the UAV 50 is constrained to land and depart from a same location and orientation. For example, future flights of the same cell site 10 or additional flights at the same time when the UAV 50 lands and, e.g., has a battery change. To ensure the same location and/or orientation in subsequent flights at the cell site 10, a zone indicator 800 is set at the cell site 10, such as on the ground via some marking (e.g., chalk, rope, white powder, etc.). Each flight at the cell site 10 for purposes of obtaining photos for 3D modeling is done using the zone indicator 800 to land and launch the UAV 50. Based on operations, it was determined that using conventional UAVs 50, the zone indicator 800 provides significant more accuracy in location identifier readings. Accordingly, the photos are accurately identified relative to one another and able to create an extremely accurate 3D model of all physical features of the cell site 10. Thus, in an exemplary embodiment, all UAV 50 flights are from a same launch point and orientation to avoid calibration issues with any location identifier technique. The zone indicator 800 can also be marked on the 3D model for future flights at the cell site 10. Thus, the use of the zone indicator 800 for the same launch location and orientation along with the multiple location indicators provide more precision in the coordinates for the UAV 50 to correlate the photos.

Note, in other exemplary embodiments, the zone indicator 800 may be omitted or the UAV 50 can launch from additional points, such that the data used for the 3D model is only based on a single flight. The zone indicator 800 is advantageous when data is collected over time or when there are landings in a flight.

Once the zone indicator 800 is established, the UAV 50 is placed therein in a specific orientation (orientation is arbitrary so long as the same orientation is continually maintained). The orientation refers to which way the UAV 50 is facing at launch and landing. Once the UAV 50 is in the zone indicator 800, the UAV 50 can be flown up (denoted by line 802) the cell tower 12. Note, the UAV 50 can use the aforementioned flight constraints to conform to FAA regulations or exemptions. Once at a certain height and certain distance from the cell tower 12 and the cell site components 14, the UAV 50 can take a circular or 360 degree flight pattern about the cell tower 12, including flying up as well as around the cell tower 12 (denoted by line 804).

During the flight, the UAV 50 is configured to take various photos of different aspects of the cell site 10 including the cell tower 12, the cell site components 14, as well as surrounding area. These photos are each tagged or embedded with multiple location identifiers. It has also been determined that the UAV 50 should be flown at a certain distance based on its camera capabilities to obtain the optimal photos, i.e., not too close or too far from objects of interest. The UAV 50 in a given flight can take hundreds or even thousands of photos, each with the appropriate location identifiers. For an accurate 3D model, at least hundreds of photos are required. The UAV 50 can be configured to automatically take pictures are given intervals during the flight and the flight can be a preprogrammed trajectory around the cell site 10. Alternatively, the photos can be manually taken based on operator commands. Of course, a combination is also contemplated. In another exemplary embodiment, the UAV 50 can include preprocessing capabilities which monitor photos taken to determine a threshold after which enough photos have been taken to accurately construct the 3D model.

Figure 15:
FIG. 15 is a satellite view of an exemplary flight of the UAV at the cell site.

Referring to FIG. 15, in an exemplary embodiment, a satellite view illustrates an exemplary flight of the UAV 50 at the cell site 10. Note, photos are taken at locations marked with circles in the satellite view. Note, the flight of the UAV 50 can be solely to construct the 3D model or as part of the cell site audit 40 described herein. Also note, the exemplary flight allows photos at different locations, angles, orientations, etc. such that the 3D model not only includes the cell tower 12, but also the surrounding geography.

Figure 16:
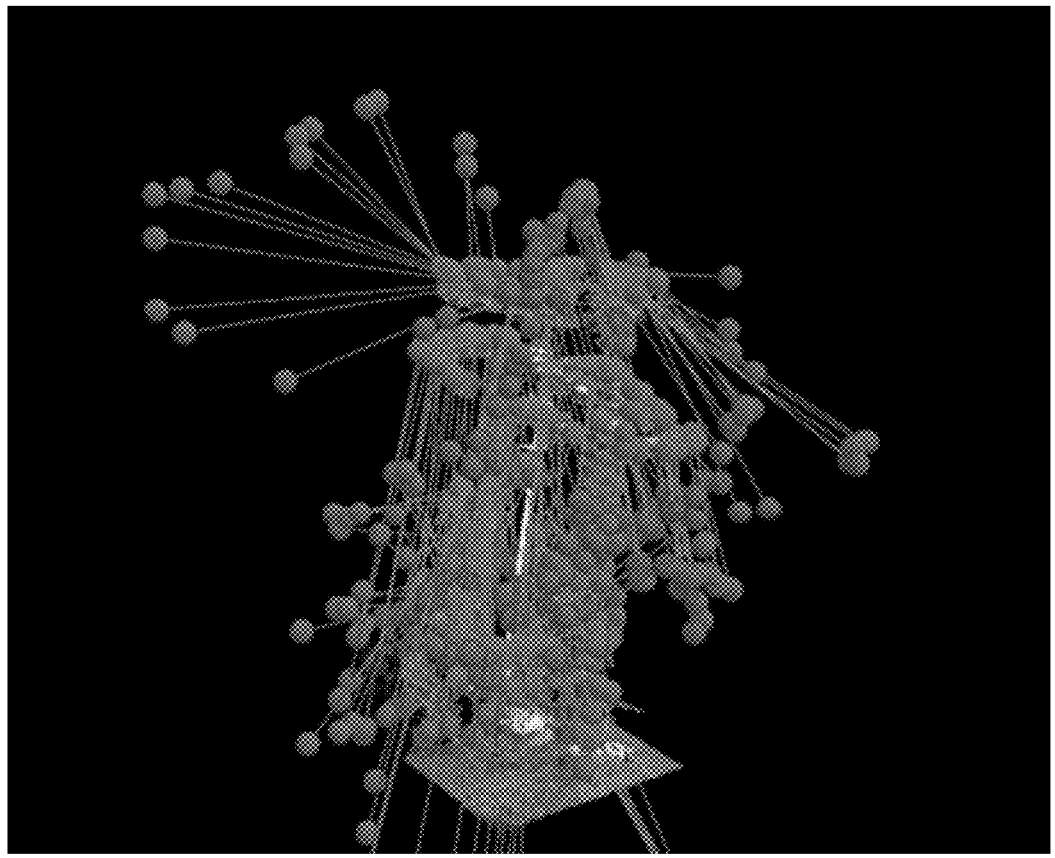
FIG. 16 is a side view of an exemplary flight of the UAV at the cell site.

Referring to FIG. 16, in an exemplary embodiment, a side view illustrates an exemplary flight of the UAV 50 at the cell site 10. Similar to FIG. 15, FIG. 16 shows circles in the side view at locations where photos were taken. Note, photos are taken at different elevations, orientations, angles, and locations.

The photos are stored locally in the UAV 50 and/or transmitted wirelessly to a mobile device, controller, server, etc. Once the flight is complete and the photos are provided to an external device from the UAV 50 (e.g., mobile device, controller, server, cloud service, or the like), post processing occurs to combine the photos or "stitch" them together to construct the 3D model. While described separately, the post processing could occur in the UAV 50 provided its computing power is capable.

Figure 17:
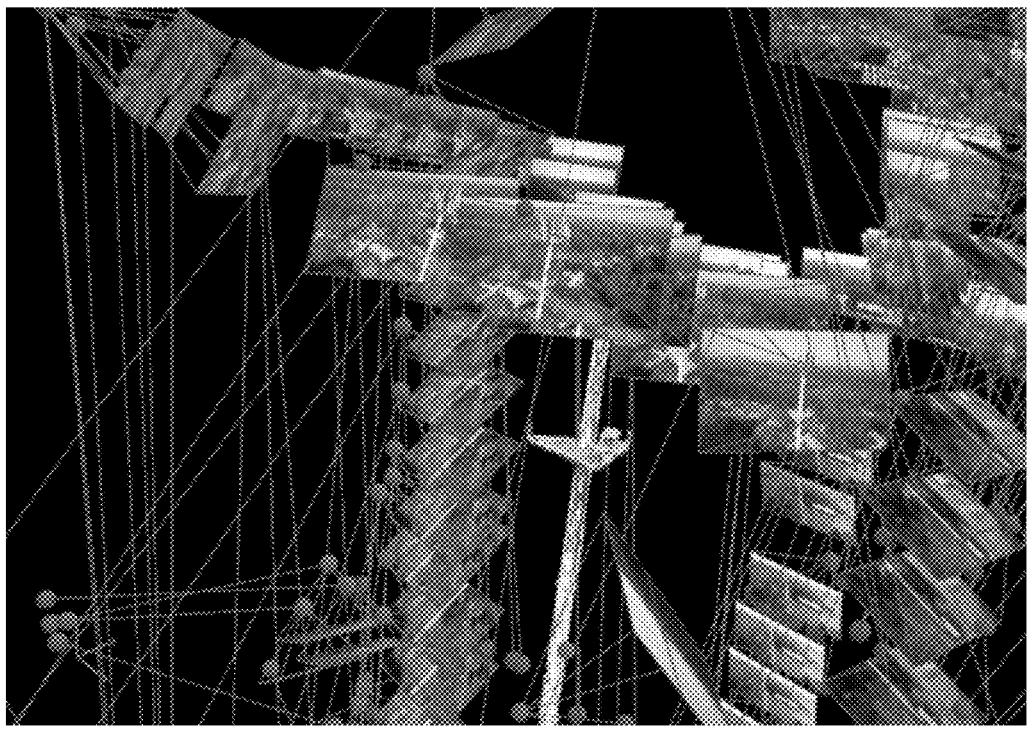
FIG. 17 is a logical diagram of a portion of a cell tower along with associated photos taken by the UAV at different points relative thereto.

Referring to FIG. 17, in an exemplary embodiment, a logical diagram illustrates a portion of a cell tower 12 along with associated photos taken by the UAV 50 at different points relative thereto. Specifically, various 2D photos are logically shown at different locations relative to the cell tower 12 to illustrate the location identifiers and the stitching together of the photos.

Figure 18:
FIG. 18 is a screen shot of a Graphic User Interface (GUI) associated with post processing photos from the UAV.

Referring to FIG. 18, in an exemplary embodiment, a screen shot illustrates a Graphic User Interface (GUI) associated with post processing photos from the UAV 50. Again, once the UAV 50 has completed taking photos of the cell site 10, the photos are post processed to form a 3D model. The systems and methods contemplate any software program capable of performing photogrammetry. In the example of FIG. 18, there are 128 total photos. The post processing includes identifying visible points across the multiple points, i.e., objects of interest. For example, the objects of interest can be any of the cell site components 14, such as antennas. The post processing identifies the same object of interest across different photos, with their corresponding location identifiers, and builds a 3D model based on multiple 2D photos.

Figure 19:
FIG. 19 is a screen shot of a 3D model constructed from a plurality of 2D photos taken from the UAV as described herein.

Referring to FIG. 19, in an exemplary embodiment, a screen shot illustrates a 3D model constructed from a plurality of 2D photos taken from the UAV 50 as described herein. Note, the 3D model can be displayed on a computer or another type of processing device, such as via an application, a Web browser, or the like. The 3D model supports zoom, pan, tilt, etc.

Figure 20:
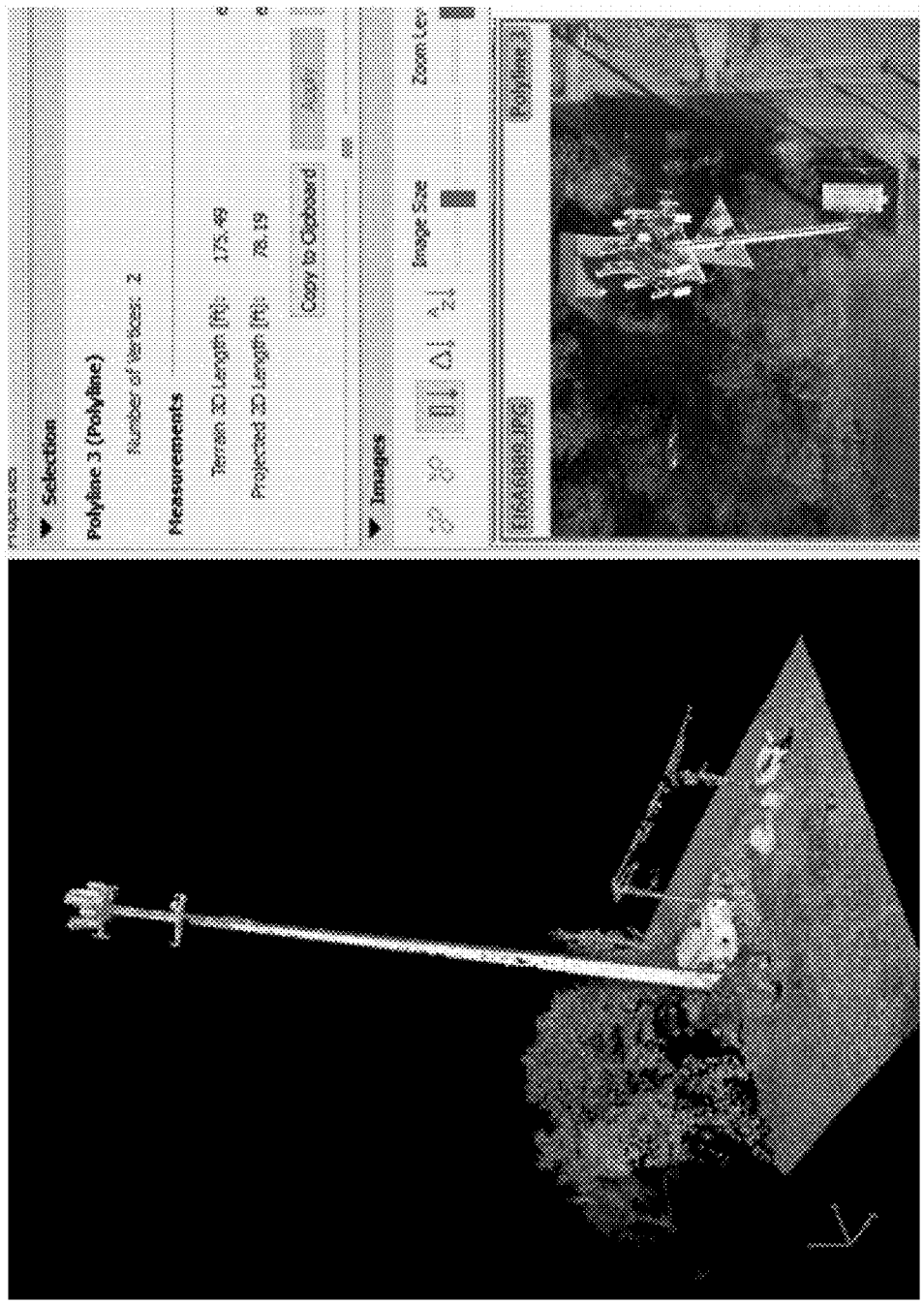
FIGS. 20-25 are various screen shots illustrate GUIs associated with a 3D model of a cell site based on photos taken from the UAV as described herein.
Figure 21:
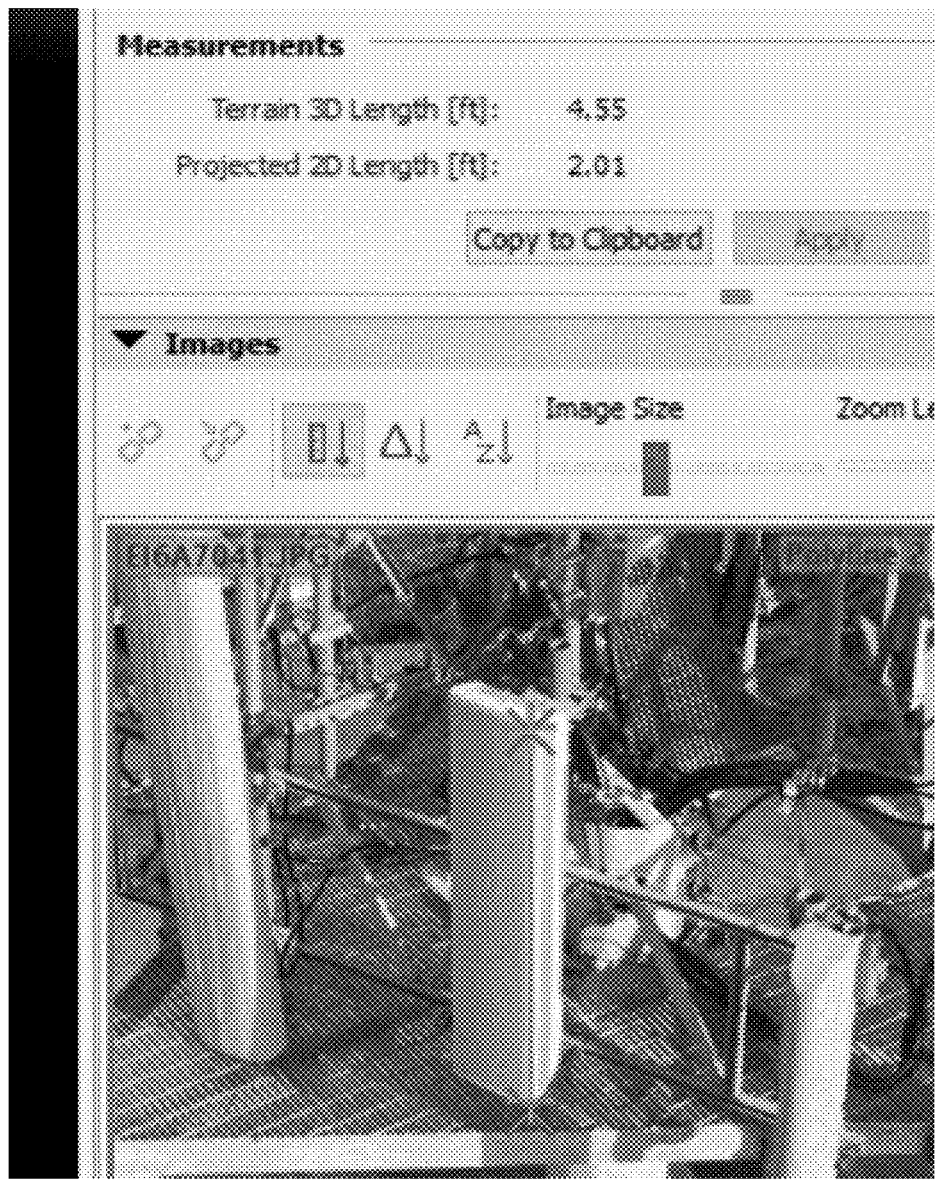
Figure 22:
Figure 23:

Referring to FIGS. 20-25, in various exemplary embodiments, various screen shots illustrate GUIs associated with a 3D model of a cell site based on photos taken from the UAV 50 as described herein. FIG. 20 is a GUI illustrating an exemplary measurement of an object, i.e., the cell tower 12, in the 3D model. Specifically, using a point and click operation, one can click on two points such as the top and bottom of the cell tower and the 3D model can provide a measurement, e.g. 175' in this example. FIG. 21 illustrates a close up view of a cell site component 14 such as an antenna and a similar measurement made thereon using point and click, e.g. 4.55' in this example. FIGS. 22 and 23 illustrate an aerial view in the 3D model showing surrounding geography around the cell site 10. From these views, the cell tower 12 is illustrated with the surrounding environment including the structures, access road, fall line, etc. Specifically, the 3D model can assist in determining a fall line which is anywhere in the surroundings of the cell site 10 where the cell tower 12 may fall. Appropriate considerations can be made based thereon.

Figure 24:
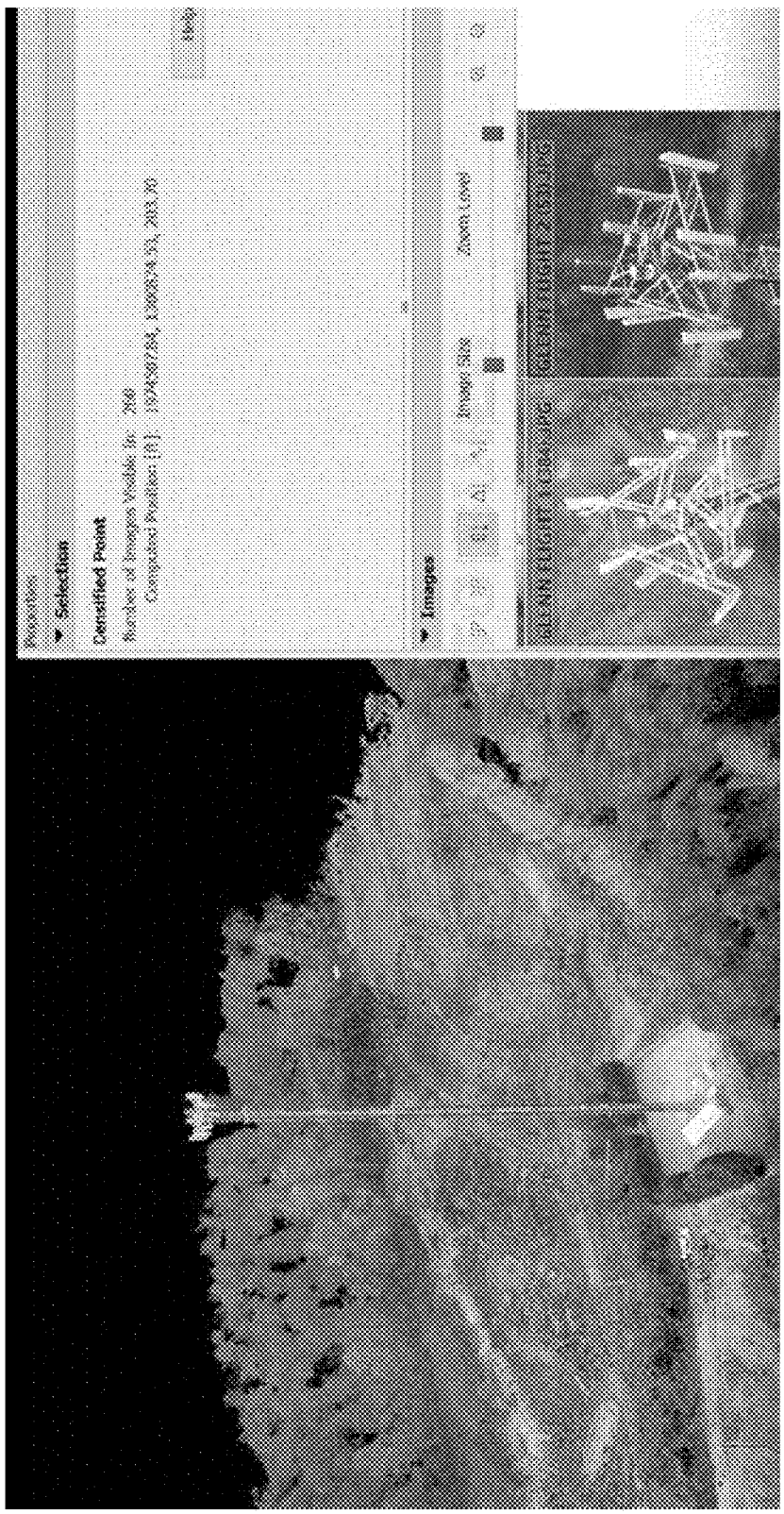
Figure 25:

FIGS. 24 and 25 illustrate the 3D model and associated photos on the right side. One useful aspect of the 3D model GUI is an ability to click anywhere on the 3D model and bring up corresponding 2D photos. Here, an operator can click anywhere and bring up full sized photos of the area. Thus, with the systems and methods described herein, the 3D model can measure and map the cell site 10 and surrounding geography along with the cell tower 12, the cell site components 14, etc. to form a comprehensive 3D model. There are various uses of the 3D model to perform cell site audits including checking tower grounding; sizing and placement of antennas, piping, and other cell site components 14; providing engineering drawings; determining characteristics such as antenna azimuths; and the like.

Figure 26:
FIG. 26 is a photo of the UAV in flight at the top of a cell tower.

Referring to FIG. 26, in an exemplary embodiment, a photo illustrates the UAV 50 in flight at the top of a cell tower 12. As described herein, it was determined that the optimum distance to photograph the cell site components 14 is about 10' to 40' distance.

Figure 27:
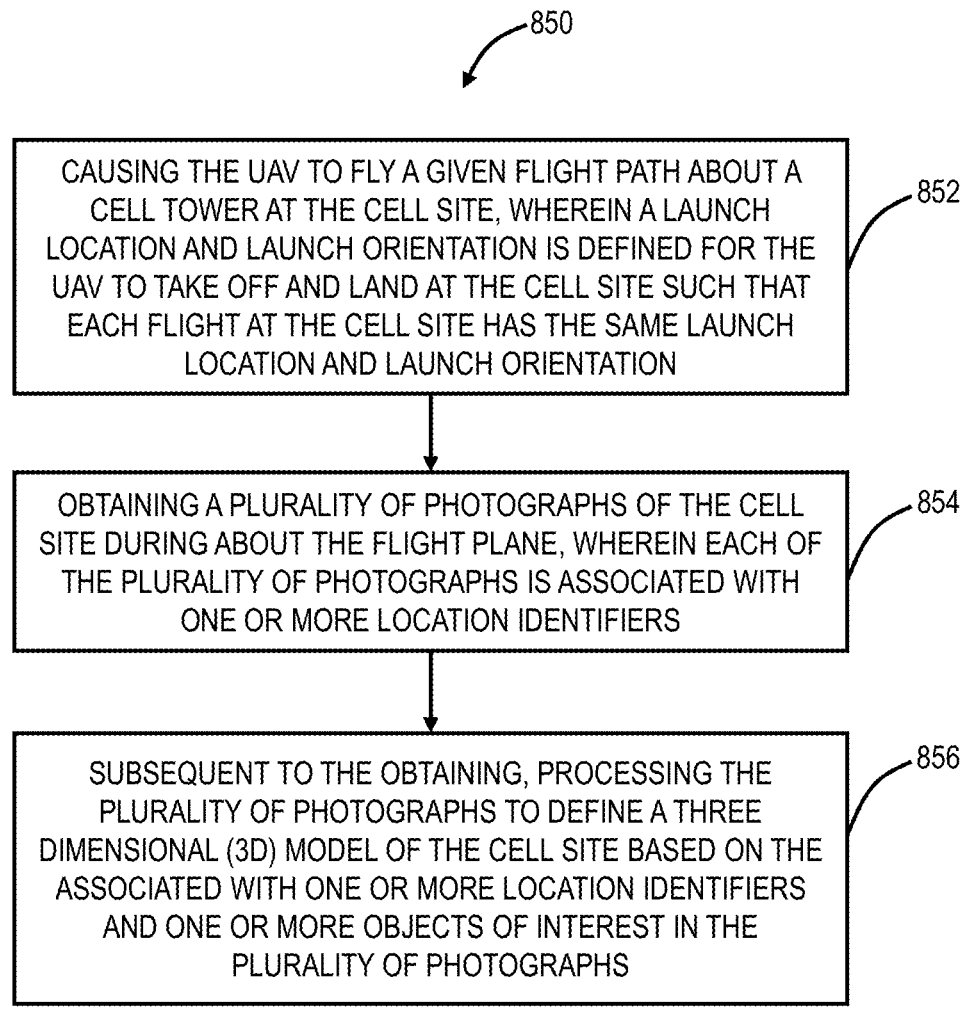
FIG. 27 is a flowchart of a process for modeling a cell site with an Unmanned Aerial Vehicle (UAV)

Referring to FIG. 27, in an exemplary embodiment, a flowchart illustrates a process 850 for modeling a cell site with an Unmanned Aerial Vehicle (UAV). The process 850 includes causing the UAV to fly a given flight path about a cell tower at the cell site, wherein a launch location and launch orientation is defined for the UAV to take off and land at the cell site such that each flight at the cell site has the same launch location and launch orientation (step 852); obtaining a plurality of photographs of the cell site during about the flight plane, wherein each of the plurality of photographs is associated with one or more location identifiers (step 854); and, subsequent to the obtaining, processing the plurality of photographs to define a three dimensional (3D) model of the cell site based on the associated with one or more location identifiers and one or more objects of interest in the plurality of photographs (step 856).

The process 850 can further include landing the UAV at the launch location in the launch orientation; performing one or more operations on the UAV, such as changing a battery; and relaunching the UAV from the launch location in the launch orientation to obtain additional photographs. The one or more location identifiers can include at least two location identifiers including Global Positioning Satellite (GPS) and GLObal NAvigation Satellite System (GLONASS). The flight plane can be constrained to an optimum distance from the cell tower. The plurality of photographs can be obtained automatically during the flight plan while concurrently performing a cell site audit of the cell site. The process 850 can further include providing a graphical user interface (GUI) of the 3D model; and using the GUI to perform a cell site audit. The process 850 can further include providing a graphical user interface (GUI) of the 3D model; and using the GUI to measure various components at the cell site. The process 850 can further include providing a graphical user interface (GUI) of the 3D model; and using the GUI to obtain photographs of the various components at the cell site.

§ 11.1 3D Modeling Systems and Methods without UAVs

Figure 28:
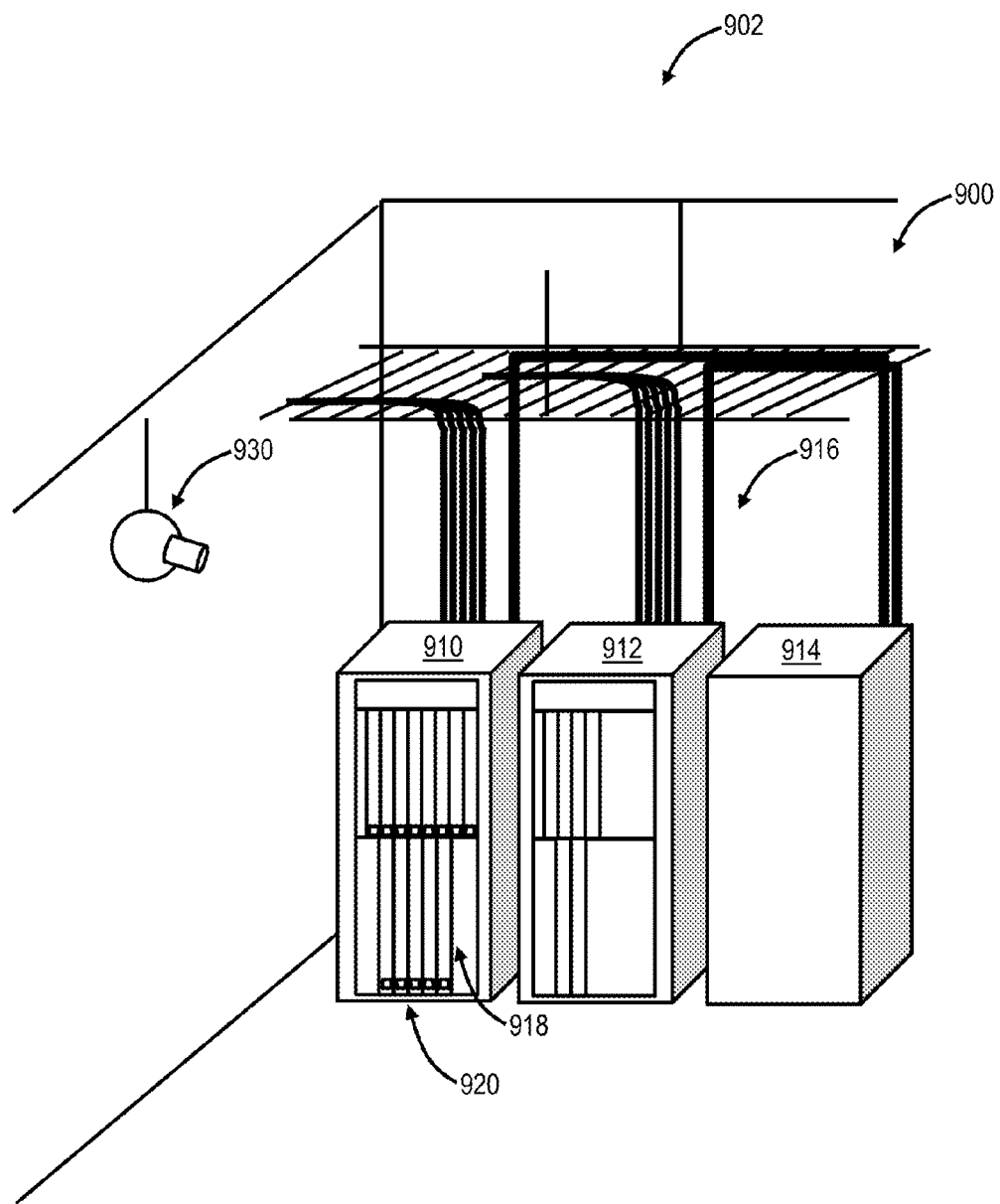
FIG. 28 is a diagram of an exemplary interior of a building, such as the shelter or cabinet, at the cell site.

The above description explains 3D modeling and photo data capture using the UAV 50. Additionally, the photo data capture can be through other means, including portable cameras, fixed cameras, heads up displays (HUD), head mounted cameras, and the like. That is, the systems and methods described herein contemplate the data capture through any available technique. The UAV 50 will be difficult to obtain photos inside the buildings, i.e., the shelter or cabinet 52. Referring to FIG. 28, in an exemplary embodiment, a diagram illustrates an exemplary interior 900 of a building 902, such as the shelter or cabinet 52, at the cell site 10. Generally, the building 902 houses equipment associated with the cell site 10 such as wireless RF terminals 910 (e.g., LTE terminals), wireless backhaul equipment 912, power distribution 914, and the like. Generally, wireless RF terminals 910 connect to the cell site components 14 for providing associated wireless service. The wireless backhaul equipment 912 includes networking equipment to bring the associated wireless service signals to a wireline network, such as via fiber optics or the like. The power distribution 914 provides power for all of the equipment such as from the grid as well as battery backup to enable operation in the event of power failures. Of course, additional equipment and functionality is contemplated in the interior 900.

The terminals 910, equipment 912, and the power distribution 914 can be realized as rack or frame mounted hardware with cabling 916 and with associated modules 918. The modules 918 can be pluggable modules which are selectively inserted in the hardware and each can include unique identifiers 920 such as barcodes, Quick Response (QR) codes, RF Identification (RFID), physical labeling, color coding, or the like. Each module 918 can be unique with a serial number, part number, and/or functional identifier. The modules 918 are configured as needed to provide the associated functionality of the cell site.

The systems and methods include, in addition to the aforementioned photo capture via the UAV 50, photo data capture in the interior 900 for 3D modeling and for virtual site surveys. The photo data capture can be performed by a fixed, rotatable camera 930 located in the interior 900. The camera 930 can be communicatively coupled to a Data Communication Network (DCN), such as through the wireless backhaul equipment 912 or the like. The camera 930 can be remotely controlled, such as by an engineer performing a site survey from his or her office. Other techniques of photo data capture can include an on-site technician taking photos with a camera and uploading them to a cloud service or the like. Again, the systems and methods contemplate any type of data capture.

Again, with a plurality of photos, e.g., hundreds, it is possible to utilize photogrammetry to create a 3D model of the interior 900 (as well as a 3D model of the exterior as described above). The 3D model is created using physical cues in the photos to identify objects of interest, such as the modules 918, the unique identifiers 920, or the like. Note, the location identifiers described relative to the UAV 50 are less effective in the interior 900 given the enclosed, interior space and the closer distances.

§ 12.0 Virtual Site Survey

Figure 29:
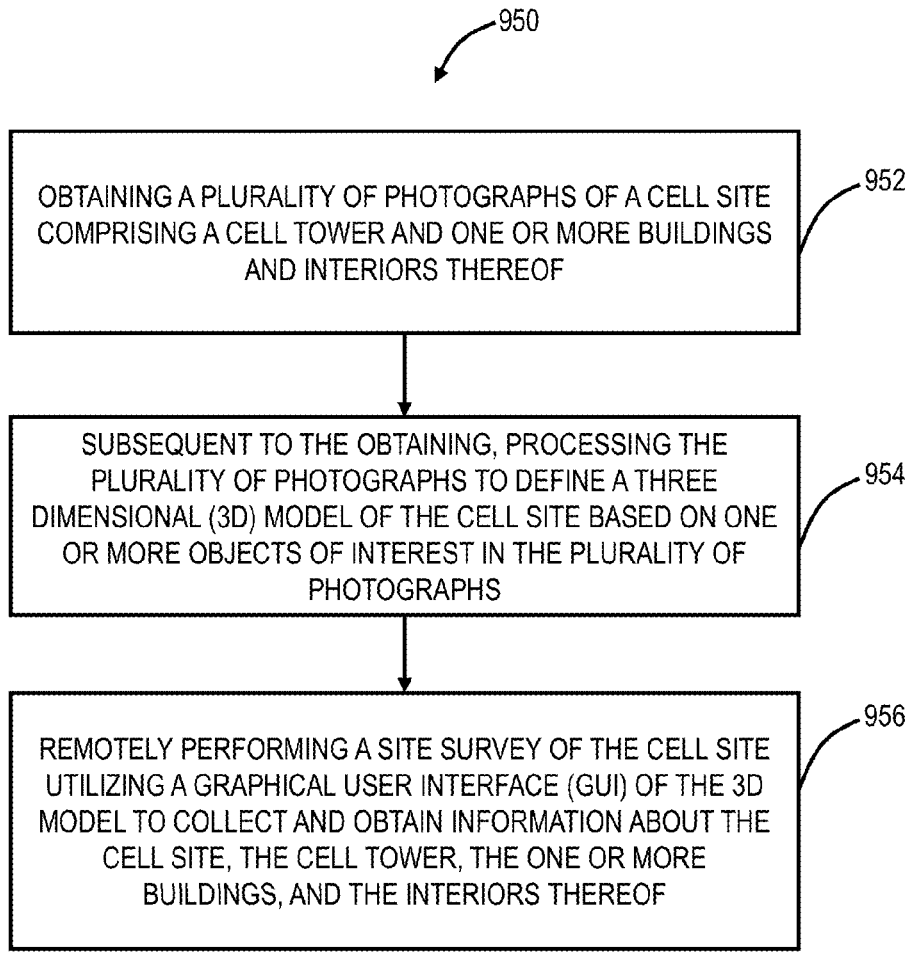
FIG. 29 is a flowchart of a virtual site survey process for the cell site.

Referring to FIG. 29, in an exemplary embodiment, a flowchart illustrates a virtual site survey process 950 for the cell site 10. The virtual site survey process 950 is associated with the cell site 10 and utilizes three-dimensional (3D) models for remote performance, i.e., at an office as opposed to in the field. The virtual site survey process 950 includes obtaining a plurality of photographs of a cell site including a cell tower and one or more buildings and interiors thereof (step 952); subsequent to the obtaining, processing the plurality of photographs to define a three dimensional (3D) model of the cell site based on one or more objects of interest in the plurality of photographs (step 954); and remotely performing a site survey of the cell site utilizing a Graphical User Interface (GUI) of the 3D model to collect and obtain information about the cell site, the cell tower, the one or more buildings, and the interiors thereof (step 956). The 3D model is a combination of an exterior of the cell site including the cell tower and associated cell site components thereon, geography local to the cell site, and the interiors of the one or more buildings at the cell site, and the 3D model can include detail at a module level in the interiors.

The remotely performing the site survey can include determining equipment location on the cell tower and in the interiors; measuring distances between the equipment and within the equipment to determine actual spatial location; and determining connectivity between the equipment based on associated cabling. The remotely performing the site survey can include planning for one or more of new equipment and changes to existing equipment at the cell site through drag and drop operations in the GUI, wherein the GUI includes a library of equipment for the drag and drop operations; and, subsequent to the planning, providing a list of the one or more of the new equipment and the changes to the existing equipment based on the library, for implementation thereof. The remotely performing the site survey can include providing one or more of the photographs of an associated area of the 3D model responsive to an operation in the GUI. The virtual site survey process 950 can include rendering a texture map of the interiors responsive to an operation in the GUI.

The virtual site survey process 950 can include performing an inventory of equipment at the cell site including cell site components on the cell tower and networking equipment in the interiors, wherein the inventory from the 3D model uniquely identifies each of the equipment based on associated unique identifiers. The remotely performing the site survey can include providing an equipment visual in the GUI of a rack and all associated modules therein. The obtaining can include the UAV 50 obtaining the photographs on the cell tower and the obtaining includes one or more of a fixed and portable camera obtaining the photographs in the interior. The obtaining can be performed by an on-site technician at the cell site and the site survey can be remotely performed.

In another exemplary embodiment, an apparatus adapted to perform a virtual site survey of a cell site utilizing three-dimensional (3D) models for remote performance includes a network interface and a processor communicatively coupled to one another; and memory storing instructions that, when executed, cause the processor to receive, via the network interface, a plurality of photographs of a cell site including a cell tower and one or more buildings and interiors thereof; process the plurality of photographs to define a three dimensional (3D) model of the cell site based on one or more objects of interest in the plurality of photographs, subsequent to receiving the photographs; and provide a Graphical User Interface of the 3D model for remote performance of a site survey of the cell site utilizing the 3D model to collect and obtain information about the cell site, the cell tower, the one or more buildings, and the interiors thereof.

In a further exemplary embodiment, a non-transitory computer readable medium includes instructions that, when executed, cause one or more processors to perform the steps of: receiving a plurality of photographs of a cell site including a cell tower and one or more buildings and interiors thereof processing the plurality of photographs to define a three dimensional (3D) model of the cell site based on one or more objects of interest in the plurality of photographs, subsequent to receiving the photographs; and rendering a Graphical User Interface of the 3D model for remote performance of a site survey of the cell site utilizing the 3D model to collect and obtain information about the cell site, the cell tower, the one or more buildings, and the interiors thereof.

The virtual site survey can perform anything remotely that traditionally would have required on-site presence, including the various aspects of the cell site audit 40 described herein. The GUI of the 3D model can be used to check plumbing of coaxial cabling, connectivity of all cabling, automatic identification of cabling endpoints such as through unique identifiers detected on the cabling, and the like. The GUI can further be used to check power plant and batteries, power panels, physical hardware, grounding, heating and air conditioning, generators, safety equipment, and the like.

The 3D model can be utilized to automatically provide engineering drawings, such as responsive to the planning for new equipment or changes to existing equipment. Here, the GUI can have a library of equipment (e.g., approved equipment and vendor information can be periodically imported into the GUI). Normal drag and drop operations in the GUI can be used for equipment placement from the library. Also, the GUI system can include error checking, e.g., a particular piece of equipment is incompatible with placement or in violation of policies, and the like.

§ 13.0 UAV Configuration for Wireless Testing

Figure 30:
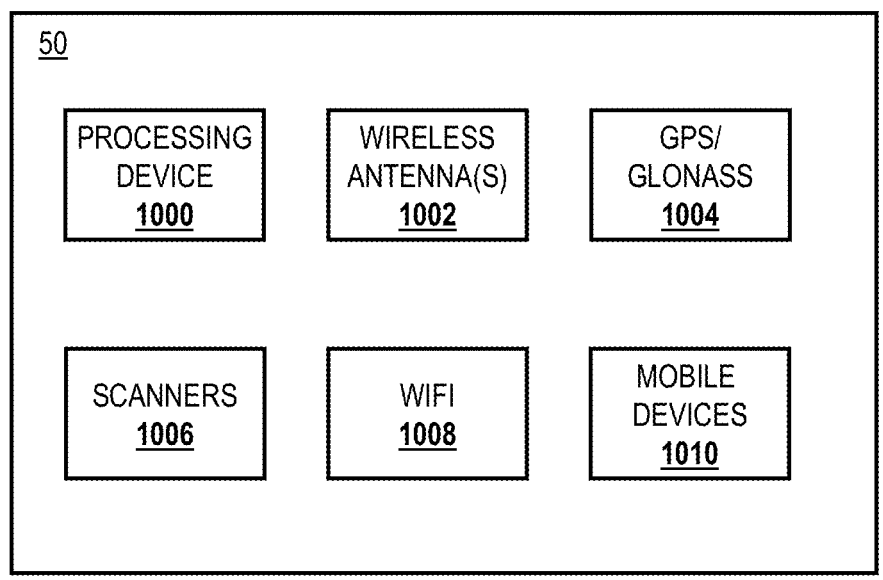
FIG. 30 is a block diagram of functional components associated with the UAV to support wireless coverage testing.

Referring to FIG. 30, in an exemplary embodiment, a block diagram illustrates functional components associated with the UAV 50 to support wireless coverage testing. Specifically, the UAV 50 can include a processing device 1000, one or more wireless antennas 1002, a GPS and/or GLONASS location device 1004, one or more scanners 1006, WIFI 1008, and one or more mobile devices 1010. The processing device 1000 can include a similar architecture as the mobile device 100 described herein and can generally be used for control of the UAV 50 as well as control of the wireless coverage testing. The one or more wireless antennas 1002 can be configured to operate at any operating band using any wireless protocol (GSM, CDMA, UMTS, LTE, etc.). The one or more wireless antennas 1002 can be communicatively coupled to the processing device 1000 for control and measurement thereof. The location device 1004 is configured to denote a specific location of the UAV 50 at a specific time and can be communicatively coupled to the processing device 1000. The location device 1004 can collect latitude and longitude of each point as well as elevation. With this location information, the processing device 1000 can correlate measurement data, time, speed, etc. with location. The location information can also be used to provide feedback for the correct route of the UAV 50, during the wireless coverage testing and during general operation.

The one or more scanners 1006 are configured to collect measurement data in a broad manner, across the wireless network. The scanners 1006 can collected data that is not seen by the mobile devices 1010. The WIFI 1008 can be used to collect wireless coverage data related to Wireless Local Area Networks (WLANs), such as based on IEEE 802.11 and variants thereof. Note, some cell sites 10 additionally provide WLAN coverage, such as for public access WIFI or for airplane WIFI access. Finally, the mobile devices 1010 are physical mobile phones or emulation thereof, and can be used to collect measurement data based on what a mobile device 1010 would see.

Thus, the processing device 1000 provides centralized control and management. The location device 1004 collects a specific data point—location at a specific time. Finally, the antennas 1002, the one or more scanners 1006, the WIFI 1008, and the one or more mobile devices 1010 are measurement collection devices. Note, in various exemplary embodiments, the UAV 50 can include a combination of one or more of the antennas 1002, the one or more scanners 1006, the WIFI 1008, i.e., a practical embodiment does not require all of these devices.

The UAV 50 body can be configured with the antennas 1002, the one or more scanners 1006, the WIFI 1008, and the one or more mobile devices 1010 such that there is distance between these devices to avoid electromagnetic interference or distortion of the radiation pattern of each that can affect measurements. In an exemplary embodiment, the antennas 1002, the one or more scanners 1006, the WIFI 1008, and the one or more mobile devices 1010 are positioned on the UAV 50 with a minimum spacing between each, such as about a foot. In an exemplary embodiment, the UAV 50 is specifically designed to perform wireless coverage testing. For example, the UAV 50 can include a long bar underneath with the associated devices, the antennas 1002, the one or more scanners 1006, the WIFI 1008, and the one or more mobile devices 1010, disposed thereon with the minimum spacing.

§ 13.1 Conventional Drive Testing

Figure 31:
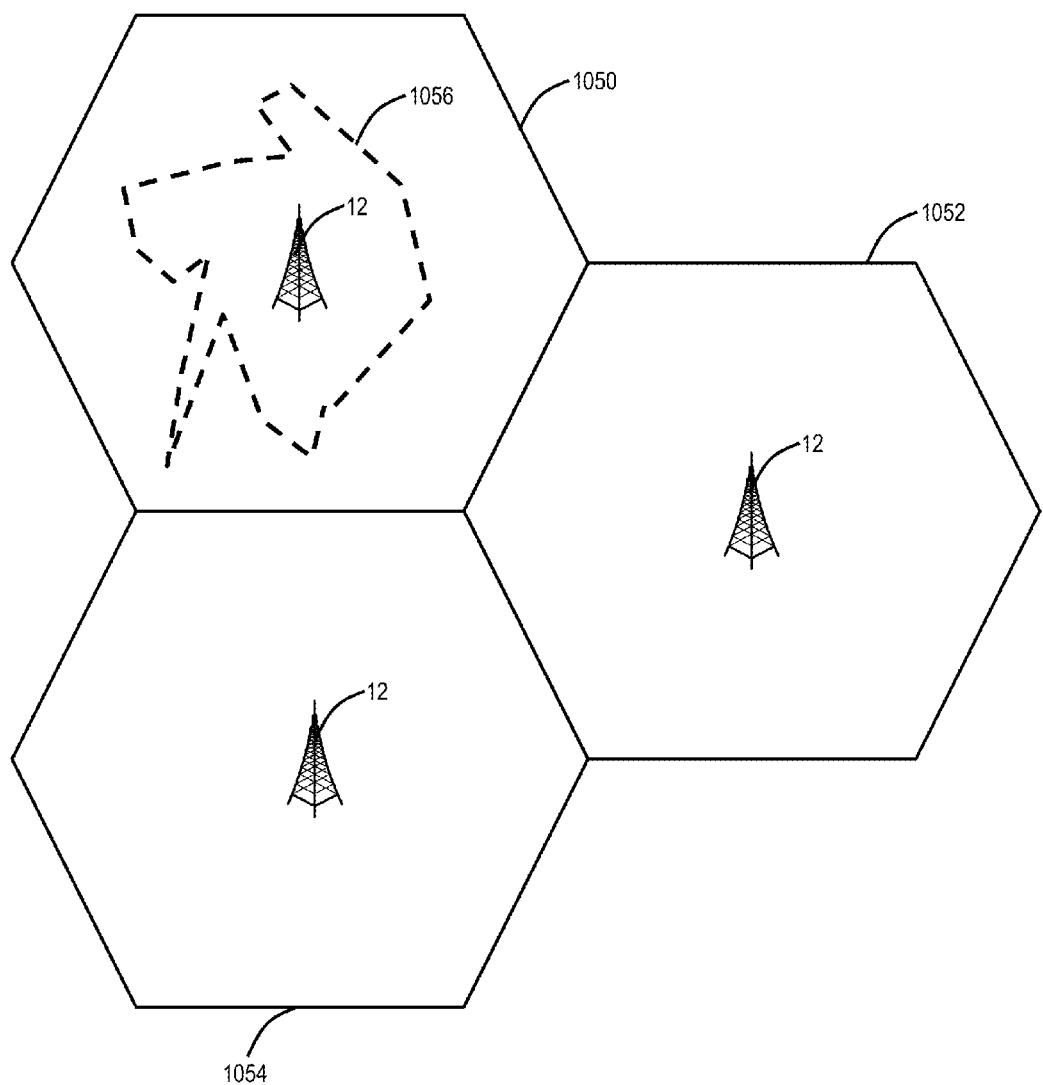
FIG. 31 is a map of three cell sites and associated coverage areas for describing conventional drive testing.

Referring to FIG. 31, in an exemplary embodiment, a map illustrates three cell towers 12 and associated coverage areas 1050, 1052, 1054 for describing conventional drive testing. Typically, for a cell site 10, in rural locations, the coverage areas 1050, 1052, 1054 can be about 5 miles in radius whereas, in urban locations, the coverage areas 1050, 1052, 1054 can be about 0.5 to 2 miles in radius. For a conventional drive test, a vehicle drives a specific route 1056. Of course, the route 1056 requires physical access, i.e., roads. Alternatively, the drive test can be walked. Of course, this conventional approach is inefficient and only provides measurements on the ground.

§ 13.2 UAV-Based Wireless Coverage Testing

Figure 32:
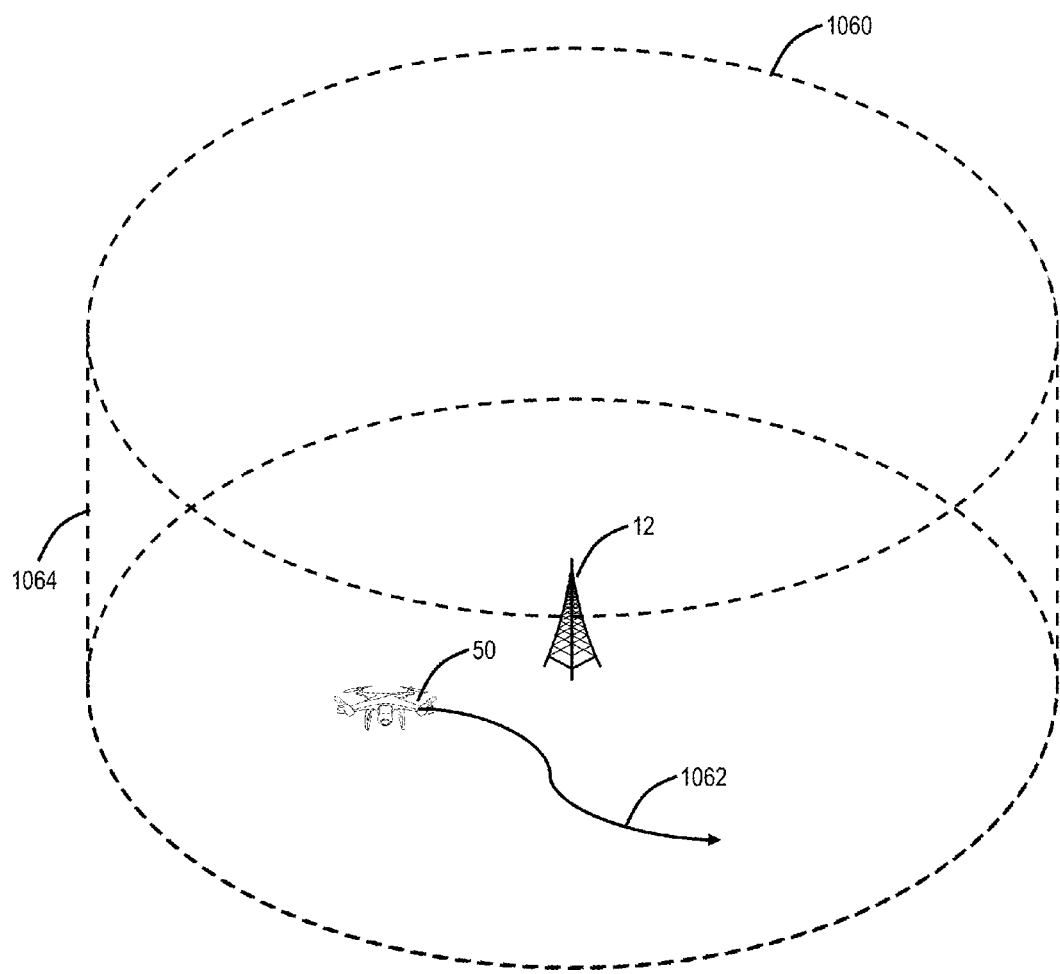
FIG. 32 is a 3D view of a cell tower with an associated coverage area in three dimensions—x, y, and z for illustrating UAV-based wireless coverage testing.

Referring to FIG. 32, in an exemplary embodiment, a 3D view illustrates a cell tower 12 with an associated coverage area 1060 in three dimensions—x, y, and z for illustrating UAV-based wireless coverage testing. The UAV 50, with the configuration described in FIG. 30, can be flown about the coverage area 1060 taking measurements along the way on a route 1062. Specifically, the coverage area 1060 also includes an elevation 1064, i.e., the z-axis. The UAV 50 has the advantage over the conventional drive test in that it is not constrained to a specific route on the ground, but can fly anywhere about the coverage area 1060. Also, the UAV 50 can obtain measurements much quicker as a UAV flight is significantly faster than driving. Further, the UAV 50 can also perform testing of adjacent cell towers 12 in a same flight, flying to different coverage areas. For example, the UAV 50 can also measure overlapping regions between cell sites 12 for handoffs, etc. Thus, the UAV 50 has significant advantages over the conventional drive testing.

In an exemplary embodiment, the elevation 1064 can be up to 1000' or up to 500', providing coverage of areas at elevations the UAVs 50 intend to fly. In an exemplary embodiment, the route 1062 can include a circle about the cell tower 12. In another exemplary embodiment, the route 1062 can include circles of varying elevations about the cell tower 12. In a further exemplary embodiment, the route 1062 can include a path to cover the majority of the area within the coverage area 1060, using an optimal flight path therein. The UAV 50 can perform the wireless coverage testing at any time of day—at night, for example, to measure activities related to system design or during the day to measure performance and maintenance with an active network.

The wireless coverage testing with the UAV 50 configuration in FIG. 30 can perform various functions to measure: Signal intensity, Signal quality, Interference, Dropped calls, Blocked calls, Anomalous events, Call statistics, Service level statistics, Quality of Service (QoS) information, Handover information, Neighboring cell information, and the like. The wireless coverage testing can be used for network benchmarking, optimization and troubleshooting, and quality monitoring.

For benchmarking, sophisticated multi-channel tools can be used to measure several network technologies and service types simultaneously to very high accuracy, to provide directly comparable information regarding competitive strengths and weaknesses. Results from benchmarking activities, such a comparative coverage analysis or comparative data network speed analysis, are frequently used in marketing campaigns. Optimization and troubleshooting information is more typically used to aid in finding specific problems during the rollout phases of new networks or to observe specific problems reported by users during the operational phase of the network lifecycle. In this mode, the wireless testing data is used to diagnose the root cause of specific, typically localized, network issues such as dropped calls or missing neighbor cell assignments.

Service quality monitoring typically involves making test calls across the network to a fixed test unit to assess the relative quality of various services using Mean opinion score (MOS). Quality monitoring focuses on the end user experience of the service, and allows mobile network operators to react to what effectively subjective quality degradations by investigating the technical cause of the problem in time-correlated data collected during the drive test. Service quality monitoring is typically carried out in an automated fashion by the UAV 50.

Once the UAV 50 starts the route 1062 and acquires location information, the wireless coverage testing process begins. Again, the UAV 50 can use two different location identifiers, e.g., GPS and GLONASS, to provide improved accuracy for the location. Also, the UAV 50 can perform subsequent tests from a same launch point and orientation as described herein. During the flight on the route 1062, the UAV 50 obtains measurements from the various wireless measurement devices, i.e., the antennas 1002, the one or more scanners 1006, the WIFI 1008, and the one or more mobile devices 1010, and denotes such measurements with time and location identifiers.

The UAV 50 is configured based on the associated protocols and operating bands of the cell tower 12. In an exemplary embodiment, the UAV 50 can be configured with two of the mobile devices 1010. One mobile device 1010 can be configured with a test call during the duration of the flight, collecting measurements associated with the call during flight on the route 1062. The other mobile device 1010 can be in a free or IDLE mode, collecting associated measurements during flight on the route 1062. The mobile device 1010 making the call can perform short calls, such as 180 seconds to check if calls are established and successfully completed as well as long calls to check handovers between cell towers 12.

Subsequent to the wireless coverage testing process, the collected measurement data can be analyzed and processed by various software tools. The software tools are configured to process the collected measurement data to provide reports and output files. Each post-processing software has its specific analysis, and as the collected measurement data is large, they can be of great help to solve very specific problems. These tools present the data in tables, maps and comparison charts that help in making decisions.

§ 13.3 UAV-Based Wireless Coverage Testing—Aerial Results

The wireless coverage testing with the UAV 50 enables a new measurement—wireless coverage above the ground. As described herein, cell towers 12 can be used for control of UAVs 50, using the wireless network. Accordingly, the wireless coverage testing is useful in identifying coverage gaps not only on the ground where users typically access the wireless network, but also in the sky, such as up to 500 or 1000' where UAVs 50 will fly and need wireless coverage.

§ 13.4 UAV-Based Wireless Coverage Testing Process

Figure 33:
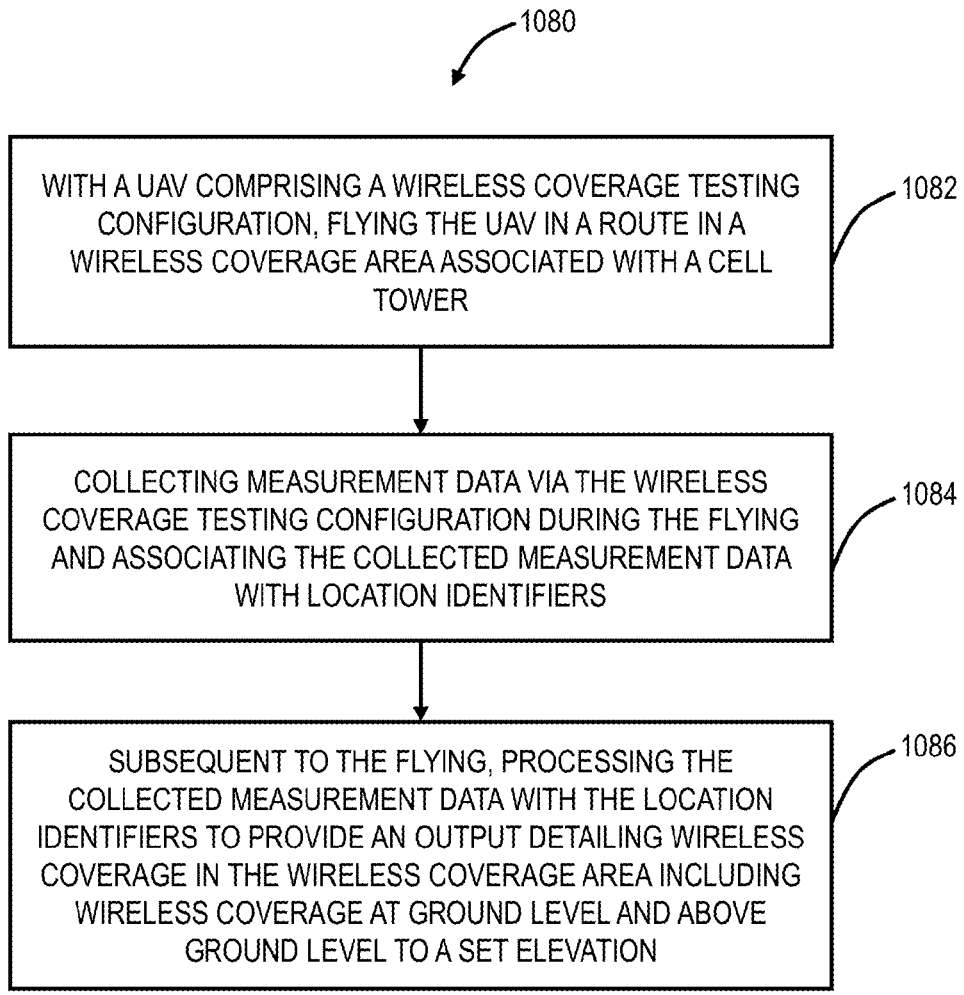
FIG. 33 is a flowchart of a UAV-based wireless coverage testing process.

Referring to FIG. 33, in an exemplary embodiment, a flowchart illustrates a UAV-based wireless coverage testing process 1080. The UAV-based wireless coverage testing process 1080 includes, with a UAV including a wireless coverage testing configuration, flying the UAV in a route in a wireless coverage area associated with a cell tower (step 1082); collecting measurement data via the wireless coverage testing configuration during the flying and associating the collected measurement data with location identifiers (step 1084); and, subsequent to the flying, processing the collected measurement data with the location identifiers to provide an output detailing wireless coverage in the wireless coverage area including wireless coverage at ground level and above ground level to a set elevation (step 1086). The wireless coverage testing configuration can include one or more devices including any of wireless antennas, wireless scanners, Wireless Local Area Network (WLAN) antennas, and one or more mobile devices, communicatively coupled to a processing device, and each of the one or more devices disposed in or on the UAV. Each of the one or more devices can be positioned a minimum distance from one another to prevent interference, such as one foot. The UAV 50 can include a frame disposed thereto with the one or more devices attached thereto with a minimum distance from one another to prevent interference. The location identifiers can include at least two independent location identification techniques thereby improving accuracy thereof, such as GPS and GLONASS. Each subsequent of the flying steps for additional wireless coverage testing can be performed with the UAV taking off and landing at a same location and orientation at a cell site associated with the cell tower. The route can include a substantially circular pattern at a fixed elevation about the cell tower or a substantially circular pattern at a varying elevations about the cell tower.

The wireless coverage testing configuration can be configured to measure a plurality of Signal intensity, Signal quality, Interference, Dropped calls, Blocked calls, Anomalous events, Call statistics, Service level statistics, Quality of Service (QoS) information, Handover information, and Neighboring cell information. The route can include locations between handoffs with adjacent cell towers. The UAV-based process 1080 can further include, subsequent to the flying and prior to the processing, flying the UAV in a second route in a second wireless coverage area associated with a second cell tower; and collecting second measurement data via the wireless coverage testing configuration during the flying the second route and associating the collected second measurement data with second location identifiers.

In another exemplary embodiment, an Unmanned Aerial Vehicle (UAV) adapted for wireless coverage testing includes one or more rotors disposed to a body; wireless interfaces; a wireless coverage testing configuration; a processor coupled to the wireless interfaces, the one or more rotors, and the wireless coverage testing configuration; and memory storing instructions that, when executed, cause the processor to: cause the UAV to fly in a route in a wireless coverage area associated with a cell tower; collect measurement data via the wireless coverage testing configuration during the flight and associate the collected measurement data with location identifiers; and, subsequent to the flight, provide the collected measurement data with the location identifiers for processing to provide an output detailing wireless coverage in the wireless coverage area including wireless coverage at ground level and above ground level to a set elevation.

§ 14.0 Installation of Equipment with UAVs

Figure 34:
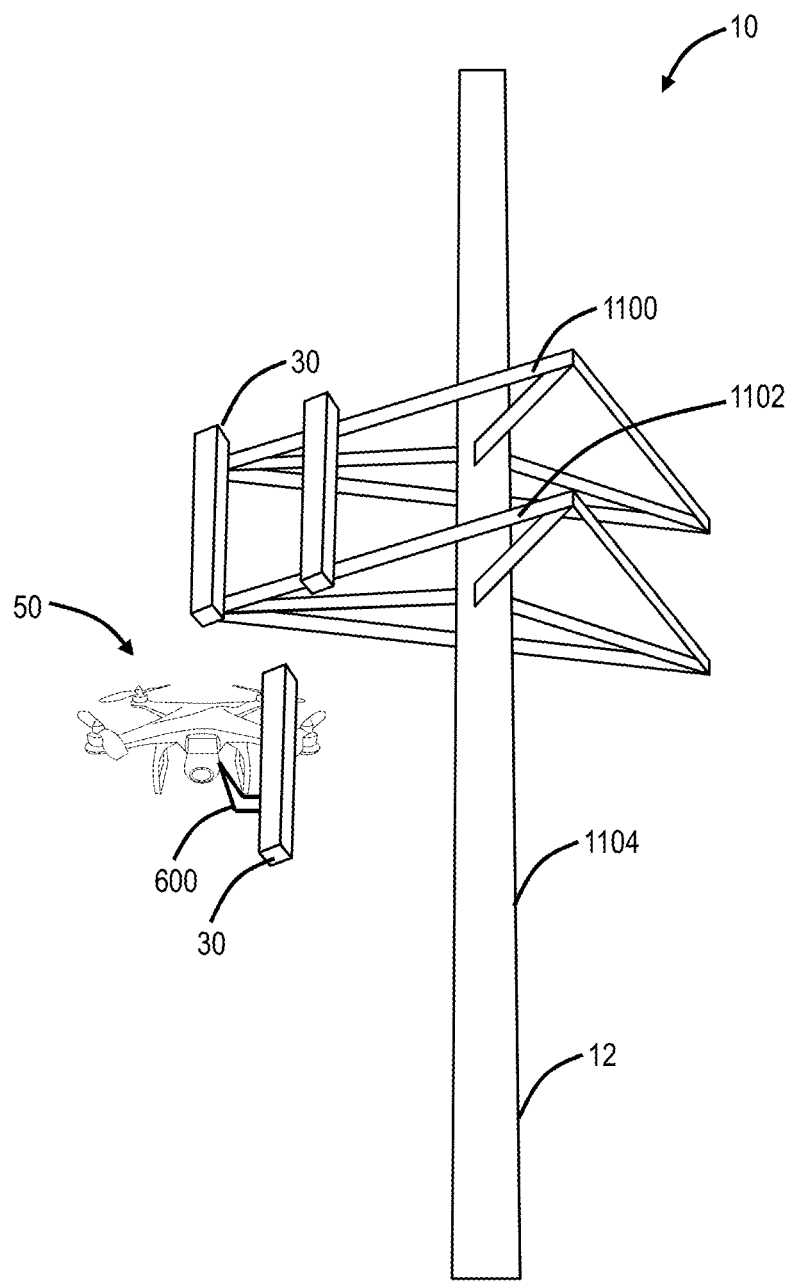
FIG. 34 is a diagram of a partial view of the exemplary cell site for describing installation of equipment with the UAV.

Referring to FIG. 34, in an exemplary embodiment, a diagram illustrates a partial view of the exemplary cell site 10 for describing installation of equipment with the UAV 50. Again, the cell site 10 includes the cell tower 12. The cell tower 12 includes horizontal support structures 1100, 1102 which are attached to a pole 1104 at varying heights. The antennas 30 are attached/supported by the horizontal support structures 1100, 1102. Techniques are described herein for installing the antennas 30 via the UAV 50. Those of ordinary skill in the art will recognize that other types of equipment could also be installed using these techniques, such as lighting rods, lights, radios, and the like. For example, conventionally, radios were located in the shelter or cabinet 52. However, which use of different spectrum, e.g., 1.9 GHz, some radios are being located closer to the antennas 30. Additionally, some configurations support integration of the radios in the antennas 30.

The UAV 50 is configured to provide the equipment, such as the antenna 30, up the cell tower 12 to the appropriate location, i.e., the horizontal support structures 1100, 1102. Note, the horizontal support structures 1100, 1102 can be located in the middle or the top of the cell tower 12. The UAV 50 can include additional rotors 80 and the rotors 80 can be larger. Also, the body 82 can be larger as well. Generally, for the systems and methods described herein, the UAV 50 is configured to support equipment weighing a couple hundred pounds, such as, for example, 150-250 lbs. The UAV 50 can support the equipment through the robotic arms 600. Also, the arms 60 can be fixed. In an exemplary embodiment, the UAV 50 does not require the arms 60 to move the equipment, but rather the entire UAV 50 moves the equipment and places it appropriately. However, the arms 600 are configured to hold the equipment during the flight and to release once positioned and connected to the horizontal support structures 1100, 1102.

The arms 600 are configured based on the type of equipment they support. For example, the antennas 30 are typically rectangular and the arms 600 can be configured to clasp a center portion of the antenna 30. The UAV 50 generally flies vertically from the base of the cell tower 12 with the antenna 30 secured in the arms 600. For example, the antenna 30 can be secured to the arms 600 on the ground at the base of the cell tower 12 by one or more installers.

Once secured, the UAV 50 can be manually, automatically, or a combination of both flown to the appropriate location on the cell tower 12, i.e., the horizontal support structures 1100, 1102. Note, the systems and methods contemplate an operator flying the UAV 50 as described herein. In another embodiment, the UAV 50 can operate autonomously or semi-autonomously, such as based on directional aids, location identifiers, objects of interest, or the like. For example, the UAV 50, via a processor 102 or the like, can be programmed with the location on the horizontal support structures 1100, 1102 for placement. The UAV 50 can use the directional aids, location identifiers, objects of interest, or the like to direct the flight based on the location.

Figure 35:
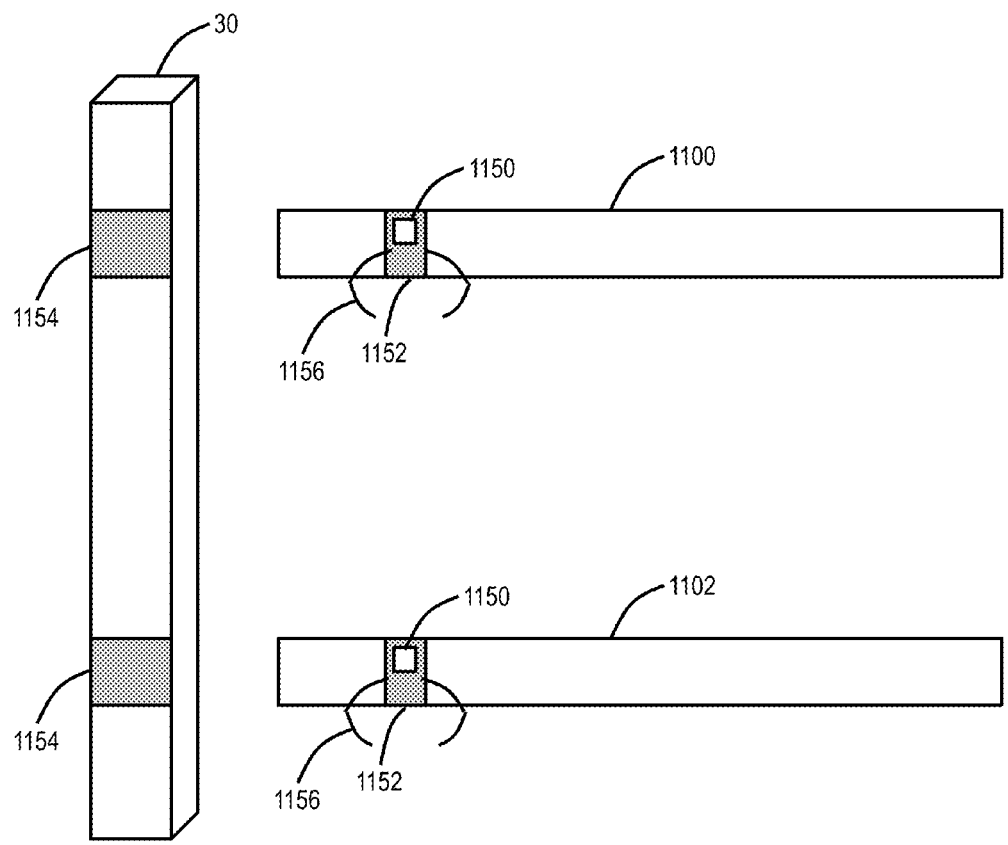
FIG. 35 is a diagram of a view of the horizontal support structures on the cell tower and the antenna for describing installation of equipment with the UAV.

Referring to FIG. 35, in an exemplary embodiment, a diagram illustrates a view of the horizontal support structures 1100, 1102 and the antenna 30. The horizontal support structures 1100, 1102 can include directional aids 1150 indicative of a location where the antenna 30 or other equipment is to be placed. The directional aids 1150 can be barcodes, Quick Response (QR) codes, a number, a symbol, a picture, a color, a phrase such as "drop here," or combinations thereof. The directional aids 1150 can be detected and monitored by the camera 86 in the UAV 50 which can maintain a visual connection to determine proper flight, such as a feedback loop to automatically fly to the horizontal support structures 1100, 1102 to place the antenna 30. Those of ordinary skill in the art will recognize the UAV 50 can use any autonomous flight algorithm with the directional aids 1150 providing the location to arrive at.

The horizontal support structures 1100, 1102 can include magnets 1152 and the antenna 30 can also include magnets 1154. In an exemplary embodiment, only one of the horizontal support structures 1100, 1102 and the antenna 30 include the magnets 1152, 1154. In another exemplary embodiment, both the horizontal support structures 1100, 1102 and the antenna 30 include the magnets 1152, 1154. Generally, the magnets 1152, 1154 can be used to hold the antenna 30 on the horizontal support structures 1100, 1102, i.e., the UAV 50 can place the antenna 30 on the horizontal support structures 1100, 1102 with the magnets 1100, 1102. The magnets 1152, 1154 can be permanent magnets or electrically energized magnets. For example, the magnets 1152, 1154 can be selectively magnetic using the electrically energized magnets.

This selective magnetic embodiment can be used to have the magnets 1152, 1154 for temporary use, i.e., the UAV 50 places the antenna 30 on the horizontal support structures 1100, 1102 with the magnets 1152, 1154 used to temporary hold the antenna 30 in place while the antenna is physically attached to the horizontal support structures 1100, 1102. Once the antenna 30 is fixedly attached to the horizontal support structures 1100, 1102, the magnets 1152, 1154 can be turned off. Note, the magnets 1152, 1154, when energized or magnetic, may interfere with the antennas 30. Thus, the selective magnetic embodiment allows for the magnets 1152, 1154 to become non-magnetic after they are fixed to the horizontal support structures 1100, 1102.

The horizontal support structures 1100, 1102 are generally not drilled into and the attachment between the horizontal support structures 1100, 1102 and the antennas 30 can be a clamp 1156. In an exemplary embodiment, the clamp 1156 is attached to the antenna 30 after the UAV 50 delivers the antenna 30 and has it held in place by the magnets 1152, 1154 by an installer on the cell tower. Here, the installer can perform normal installation with the systems and methods providing a convenient and efficient mechanism to deliver the antenna 30.

In another exemplary embodiment, the clamps 1156 have an automatic mechanical grabbing feature where no installer is required. Here, the UAV 50 can fly the antenna 30 to the clamps 1156 and the clamps 1156 can automatically attach to the antenna 30. This automatic mechanical feature may or may not use the magnets 1152, 1154. For example, the clamps 1156 can have a mechanical locking mechanism similar to handcuffs where the UAV 50 pushes the antenna 30 in and the clamps automatically lock.

In a further exemplary embodiment, the automatic mechanical feature can include other techniques such as a vacuum on the horizontal support structures 1100, 1102 or the antenna 30 which can selectively grab and connect.

In a further exemplary embodiment, the magnets 1152, 1154 can be used to hold the antenna 30 in place and the robotic arms 600 can be used to fixedly attach the antenna 30, such as via the clamps 1156. All of the techniques described herein are also contemplate for operations during the installation.

§ 14.1 UAV-Based Installation Method

Figure 36:
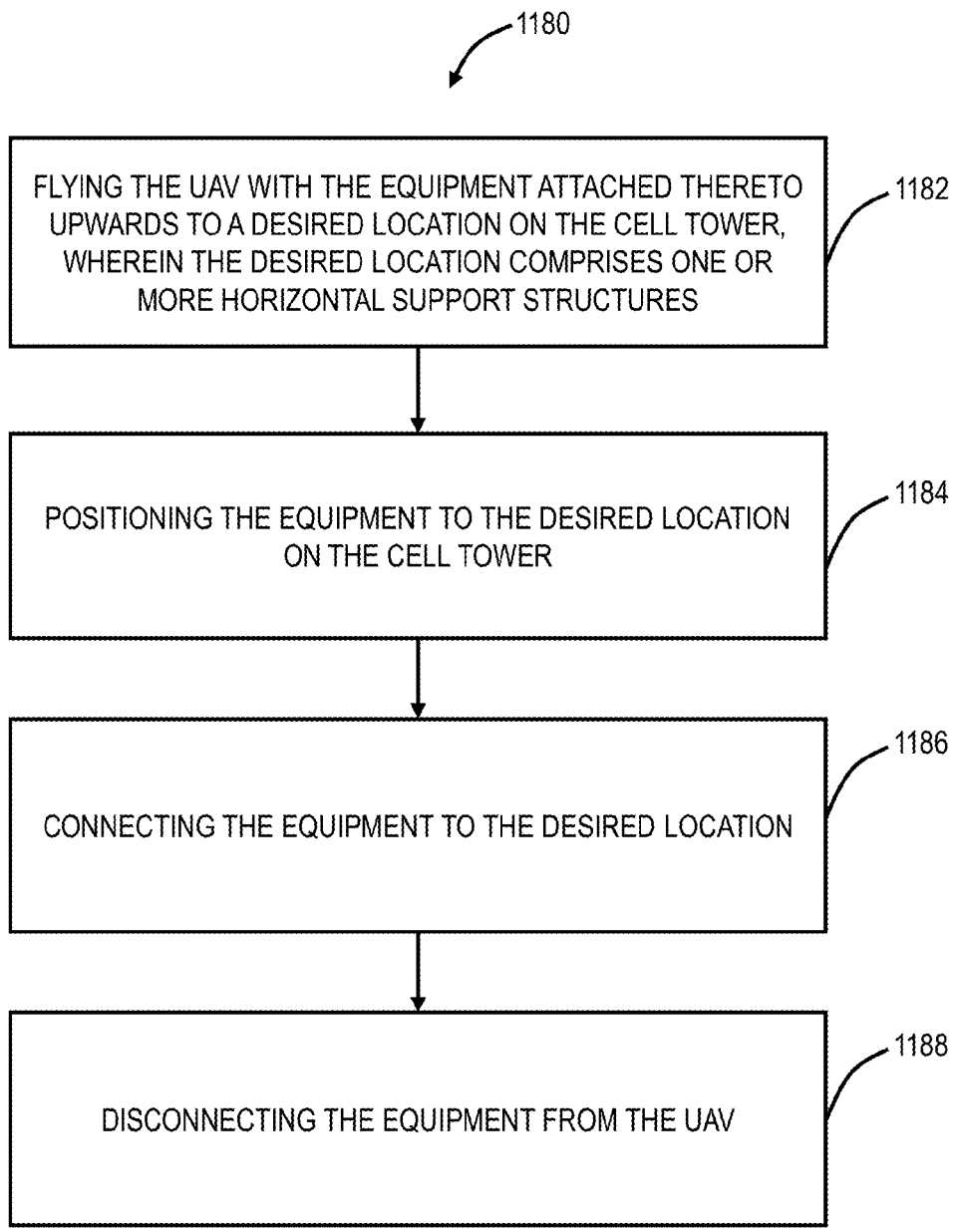
FIG. 36 is a flowchart of an Unmanned Aerial Vehicle (UAV)-based installation method for equipment on cell towers.

Referring to FIG. 36, in an exemplary embodiment, a flowchart illustrates an Unmanned Aerial Vehicle (UAV)-based installation method 1180 for equipment on cell towers. The UAV-based installation method 1180 includes flying the UAV with the equipment attached thereto upwards to a desired location on the cell tower, wherein the desired location includes one or more horizontal support structures (step 1182); positioning the equipment to the desired location on the cell tower (step 1184); connecting the equipment to the desired location (step 1186); and disconnecting the equipment from the UAV (step 1188). The UAV-based installation method 1180 can further include attaching the equipment to the UAV via one or more robotic arms prior to the flying. The equipment can include one or more of an antenna and a radio. The positioning can be via one or more directional aids located on the one or more horizontal support structures, wherein the directional aids are monitored via a camera associated with the UAV. The one or more directional aids can include one or more of barcodes, Quick Response (QR) codes, numbers, symbols, pictures, a color, a phrase, and a combination thereof.

The positioning can include temporarily fixing the equipment to the desired location for the connecting. The positioning can include attaching the equipment to the desired location via one or more magnets. The one or more magnets can be selectively energized for the positioning and the connecting and turned off subsequent to the connecting. The connecting can include attaching one or more clamps between the equipment and the one or more horizontal support structures. The one or more clamps can automatically connect to the equipment. The flying can be performed by an operator with assistance from one or more directional aids located on the one or more horizontal support structures. The flying can be performed by autonomously by the UAV based on one or more directional aids located on the one or more horizontal support structures. The UAV-based installation method 1180 can further include performing the disconnecting subsequent to the positioning; and using one or more robotic arms on the UAV to perform the connecting.

In another exemplary embodiment, an Unmanned Aerial Vehicle (UAV) used in installation of equipment on cell towers includes one or more rotors disposed to a body; wireless interfaces; one or more arms adapted to connect and disconnect from the equipment; a processor coupled to the wireless interfaces, the one or more rotors, and the one or more arms; and memory storing instructions that, when executed, cause the processor to: fly with the equipment attached to the one or more arms upwards to a desired location on the cell tower, wherein the desired location includes one or more horizontal support structures; position the equipment to the desired location on the cell tower; connect the equipment to the desired location; and disconnect the equipment from the UAV.

Figure 37C:
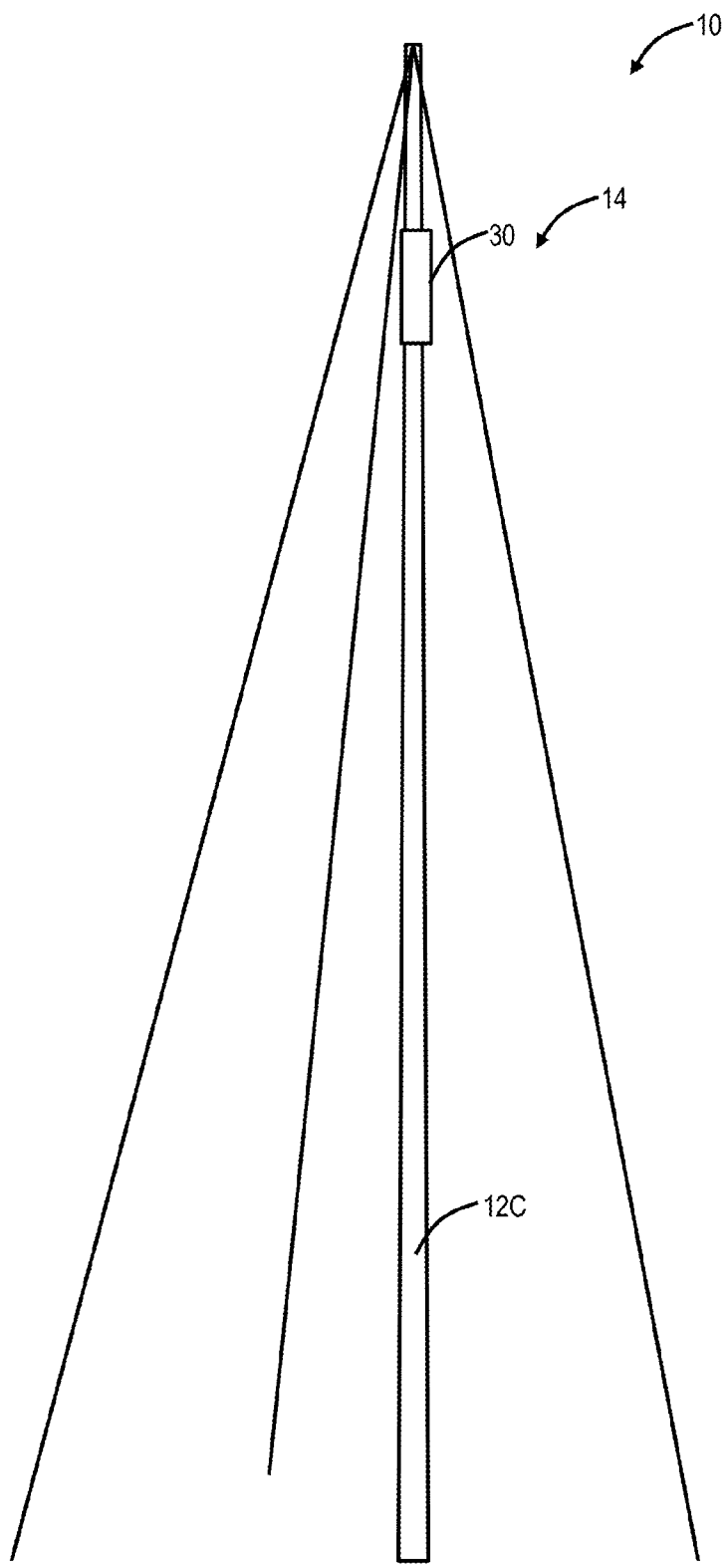

§ 15.0 Installation and Maintenance of Equipment on Cell Towers with Robotic Devices Referring to FIGS. 37A-37C, in various exemplary embodiments, diagrams illustrate different types of cell towers 12, namely a self-support tower 12A (FIG. 37A), a monopole tower 12B (FIG. 37B), and a guyed tower 12C (FIG. 37C). These three types of towers 12A, 12B, 12C have different support mechanisms. The self-support tower 10A can also be referred to as a lattice tower and it is free standing, with a triangular base with three or four sides. The monopole tower 12B is a single tube tower and it is also free standing, but typically at a lower height than the self-support tower 12A. The guyed tower 12C is a straight rod supported by wires attached to the ground.

Figure 38:
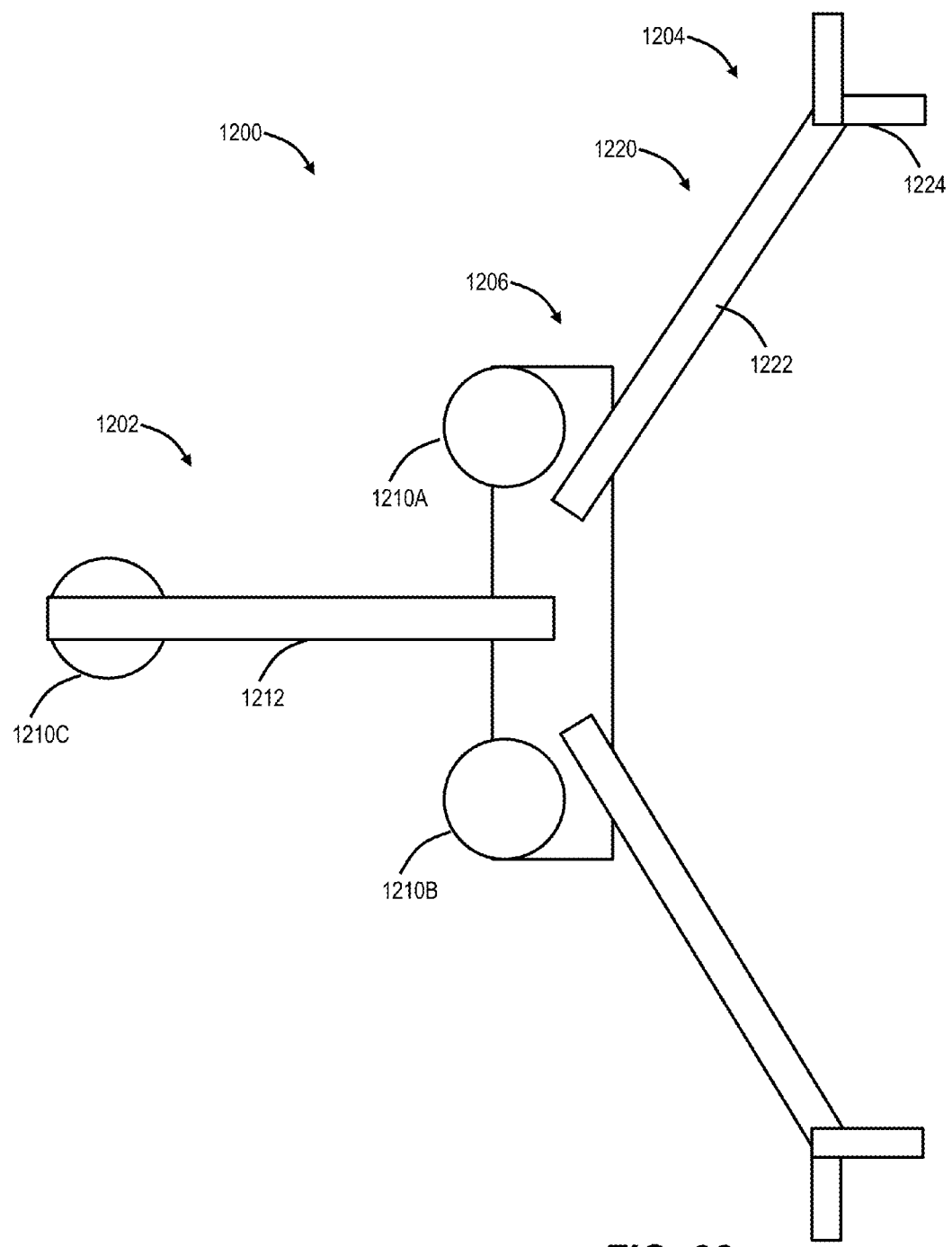
FIG. 38 is a block diagram illustrates a robotic device configured for use with the cell towers for installation and/or maintenance of cell site components on the cell towers.

Referring to FIG. 38, in an exemplary embodiment, a block diagram illustrates a robotic device 1200 configured for use with the cell towers 12A, 12B, 12C for installation and/or maintenance of cell site components 14 on the cell towers 12A, 12B, 12C. The robotic device 1200 is configured to traverse up and down the cell tower 12 with climbing components 1202 and to perform physical manipulation of equipment, cabling, etc. with manipulation components 1204. In addition to the climbing components 1202 and the manipulation components 1204, the robotic device 1200 includes a body 1206 which may include power, physical support for the climbing components 1202 and the manipulation components 1204, processing (e.g., the robotic device 1200 can include the mobile device 100 or equivalent disposed or associated with the body 1206).

Thus, the robotic device 1200 reduces or avoids tower climbs for installation and maintenance on equipment on the cell towers 12. The robotic device 1200 can crawl to the top of the cell tower 12, can be delivered by Unmanned Aerial Vehicles (UAV) 50, can be delivered by guide wire, can be delivered by a crane, pulley, etc. or the like. While on the cell tower 12, the robotic devices 1200 can be used, either manually, autonomously, or a combination of both, to perform various tasks on cell tower components 14 such as antennas or the like. In an exemplary embodiment, the robotic device 1200 can be used to bring cabling up the cell tower 12 in conjunction with UAV-based systems and methods which install equipment such as antennas.

The climbing components 1202 are configured to allow the robotic device 1200 to traverse up and down the cell tower 12. Those of ordinary skill in the art will recognize the robotic device 1200 can include any mechanism for climbing, but in an exemplary embodiment, the climbing components 1202 can include various wheels 1210. For example, to traverse the self-support tower 12A, the monopole tower 12B, the guyed tower 12C, etc., wheels 1210A, 1210B are on the body 1206 to roll up or down the tower 12 while a wheel 1210C is spaced apart from the body 1206 via a member 1212 to keep the robotic device 1200 affixed to the tower 12 during transit. Also, this arrangement of the climbing components 1202 could be used with a guide wire to traverse up and down the cell tower 12.

The manipulation components 1204 can include one or more robotic arms 1220 which can include a member 1222 which is rotatable or moveable relative to the body 1206 and a grasping device 1224 which can physically interact and/or manipulate with the cell site components 14. The robotic device 1200 can include multiple arms 1220 in some embodiments and a single arm 1220 in another embodiment.

In another exemplary embodiment, the climbing components 1202 can be the same as the manipulation components 120, such as when there is more than one robotic arm 1220. Here, the robotic arms 1220 can be used to both install/manipulate the cell site components 14 as well as to climb the cell tower 12. For example, the robotic arms 1220 can grasp stairs on the cell tower 12, supports on a lattice tower, safety climb wires, or the like.

The climbing components 1202 may also include magnets including selectively enabled magnets. Note, the cell towers 12 include metal and the magnets could be used to traverse up and down the cell tower 12.

Thus, in operation, the climbing components 1202 are used to traverse up and down the cell tower as well as to maintain the robotic device 1200 in a stable position at a desired location on the cell tower 12. Once at the desired location, the manipulation components 1204 are used to perform installation and/or maintenance. For example, the manipulation components 1204 can be controlled with a mobile device 100 or controller which is wirelessly connected to the robotic device 1200, through a Heads Up Display (HUD) or Virtual Reality (VR) controller which is wirelessly connected to the robotic device 1200, or the like. With the HUD or VR controller, an operator can remotely operate the robotic device 1200, from the ground, thereby having arms in the sky without the tower climb.

The manipulation components 1204 can be used to perform similar functionality as the robotic arms 600, including bringing the payload 602 up the cell tower 12. In an exemplary embodiment, the manipulation components 1204 can be used to bring cabling up the cell tower 12, such as in conjunction with the UAV-based installation method 1180.

In an exemplary embodiment, a plurality of robotic devices 1200 can be used in combination. For example, the plurality of mobile devices 1200 can combine with one another at a desired location to form an aggregate robotic device.

Figure 39:
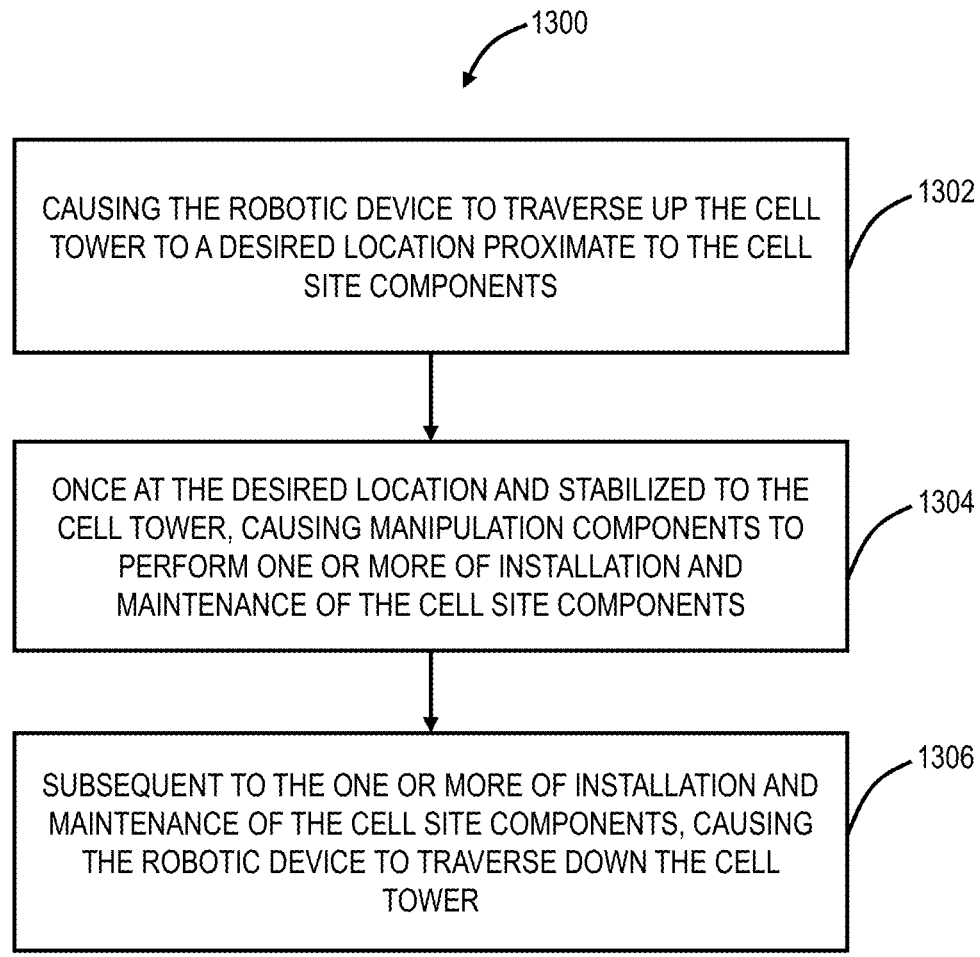
FIG. 39 is a flowchart of a method for installation and maintenance of cell site components with the robotic device.

Referring to FIG. 39, in an exemplary embodiment, a flowchart illustrates a method 1300 for installation and maintenance of cell site components with the robotic device 1200. The method 1300 includes causing the robotic device to traverse up the cell tower to a desired location proximate to the cell site components (step 1302); once at the desired location and stabilized to the cell tower, causing manipulation components to perform one or more of installation and maintenance of the cell site components (step 1304); and, subsequent to the one or more of installation and maintenance of the cell site components, causing the robotic device to traverse down the cell tower (step 1306).

The robotic device traverses up and down the cell tower via climbing components associated with the robotic device. The climbing components can include a plurality of wheels configured to traverse the cell tower and stabilize the robotic device to the cell tower; a plurality of magnets; and a pulley system. The cell tower can include one of a self-support tower, a monopole tower, and a guyed tower, and climbing components for the robotic device are configured based on a type of the cell tower.

The manipulation components can include one or more members with robotic arms coupled thereto. The robotic device can include a body comprising a processor and wireless components; climbing components disposed to the body; and the manipulation components moveably disposed to the body.

The causing can be performed by one of a mobile device and a controller wirelessly coupled to the robotic device. The causing can be performed by one of a Heads Up Display and a Virtual Reality controller wirelessly coupled to the robotic device. The robotic device can be utilized to bring a cable up the cell tower and to connect the cable to the cell site components. The cell site components can be installed by an Unmanned Aerial Vehicle (UAV).

In another exemplary embodiment, an apparatus for installation and maintenance of cell site components on a cell tower with a robotic device includes a wireless interface; a processor communicatively coupled to the wireless interface; and memory storing instructions that, when executed, cause the processor to cause the robotic device to traverse up the cell tower to a desired location proximate to the cell site components; once at the desired location and stabilized to the cell tower, cause manipulation components to perform one or more of installation and maintenance of the cell site components; and, subsequent to the one or more of installation and maintenance of the cell site components, cause the robotic device to traverse down the cell tower.

§ 16.0 Close-Out Audit Systems and Methods

Again, a close-out audit is done to document and verify the work performed at the cell site 10. The systems and methods eliminate the separate third-party inspection firm for the close-out audit. The systems and methods include the installers (i.e., from the third-party installation firm, the owner, the operator, etc.) performing video capture subsequent to the installation and maintenance and using various techniques to obtain data from the video capture for the close-out audit. The close-out audit can be performed offsite with the data from the video capture thereby eliminating unnecessary tower climbs, site visits, and the like.

Figure 40:
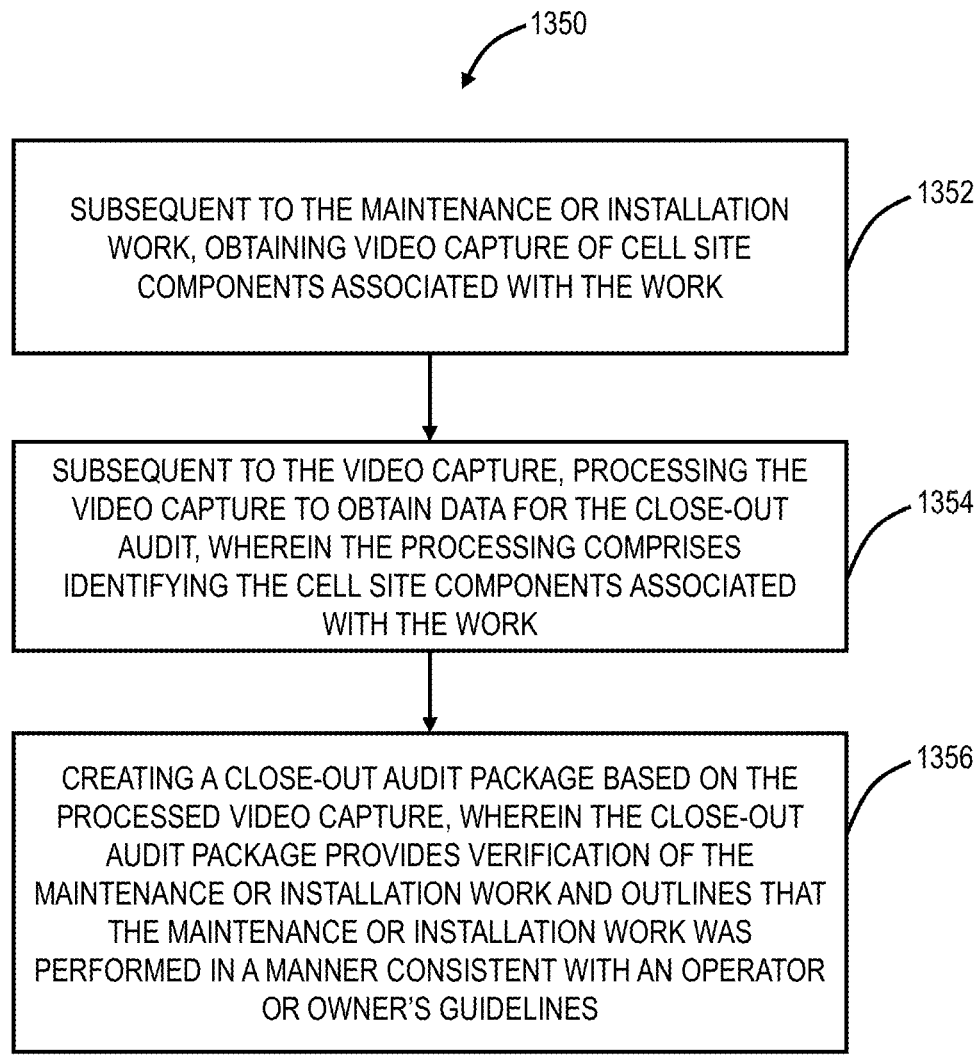
FIG. 40 is a flowchart illustrates a close-out audit method performed at a cell site subsequent to maintenance or installation work.

Referring to FIG. 40, in an exemplary embodiment, a flowchart illustrates a close-out audit method 1350 performed at a cell site subsequent to maintenance or installation work. The close-out audit method 1350 includes, subsequent to the maintenance or installation work, obtaining video capture of cell site components associated with the work (step 1352); subsequent to the video capture, processing the video capture to obtain data for the close-out audit, wherein the processing comprises identifying the cell site components associated with the work (step 1354); and creating a close-out audit package based on the processed video capture, wherein the close-out audit package provides verification of the maintenance or installation work and outlines that the maintenance or installation work was performed in a manner consistent with an operator or owner's guidelines (step 1356).

The video capture can be performed by a mobile device and one or more of locally stored thereon and transmitted from the mobile device. The video capture can also be performed by a mobile device which wirelessly transmits a live video feed and the video capture is remotely stored from the cell site. The video capture can also performed by an Unmanned Aerial Vehicle (UAV) flown at the cell site. Further, the video capture can be a live video feed with two-way communication between an installer associated with the maintenance or installation work and personnel associated with the operator or owner to verify the maintenance or installation work. For example, the installer and the personnel can communicate to go through various items in the maintenance or installation work to check/audit the work.

The close-out audit method 1350 can also include creating a three-dimensional (3D) model from the video capture; determining equipment location from the 3D model; measuring distances between the equipment and within the equipment to determine actual spatial location; and determining connectivity between the equipment based on associated cabling from the 3D model. The close-out audit method 1350 can also include uniquely identifying the cell site components from the video capture and distinguishing in the close-out audit package. The close-out audit method 1350 can also include determining antenna height, azimuth, and down tilt angles for antennas in the cell site components from the video capture; and checking the antenna height, azimuth, and down tilt angles against predetermined specifications.

The close-out audit method 1350 can also include identifying cabling and connectivity between the cell site components from the video capture and distinguishing in the close-out audit package. The close-out audit method 1350 can also include checking a plurality of factors in the close-out audit from the video capture compared to the operator or owner's guidelines. The close-out audit method 1350 can also include checking grounding of the cell site components from the video capture, comparing the checked grounding to the operator or owner's guidelines and distinguishing in the close-out audit package. The close-out audit method 1350 can also include checking mechanical connectivity of the cell site components to a cell tower based on the video capture and distinguishing in the close-out audit package.

In another exemplary embodiment, a system adapted for a close-out audit of a cell site subsequent to maintenance or installation work includes a network interface and a processor communicatively coupled to one another; and memory storing instructions that, when executed, cause the processor to, subsequent to the maintenance or installation work, obtain video capture of cell site components associated with the work; subsequent to the video capture, process the video capture to obtain data for the close-out audit, wherein the processing comprises identifying the cell site components associated with the work; and create a close-out audit package based on the processed video capture, wherein the close-out audit package provides verification of the maintenance or installation work and outlines that the maintenance or installation work was performed in a manner consistent with an operator or owner's guidelines.

In a further exemplary embodiment, a non-transitory computer readable medium includes instructions that, when executed, cause one or more processors to perform the steps of, subsequent to the maintenance or installation work, obtaining video capture of cell site components associated with the work; subsequent to the video capture, processing the video capture to obtain data for the close-out audit, wherein the processing comprises identifying the cell site components associated with the work; and creating a close-out audit package based on the processed video capture, wherein the close-out audit package provides verification of the maintenance or installation work and outlines that the maintenance or installation work was performed in a manner consistent with an operator or owner's guidelines.

The close-out audit package can include, without limitation, drawings, cell site component settings, test results, equipment lists, pictures, commissioning data, GPS data, Antenna height, azimuth and down tilt data, equipment data, serial numbers, cabling, etc.

§ 17.0 3D Modeling Systems and Methods

Figure 41:
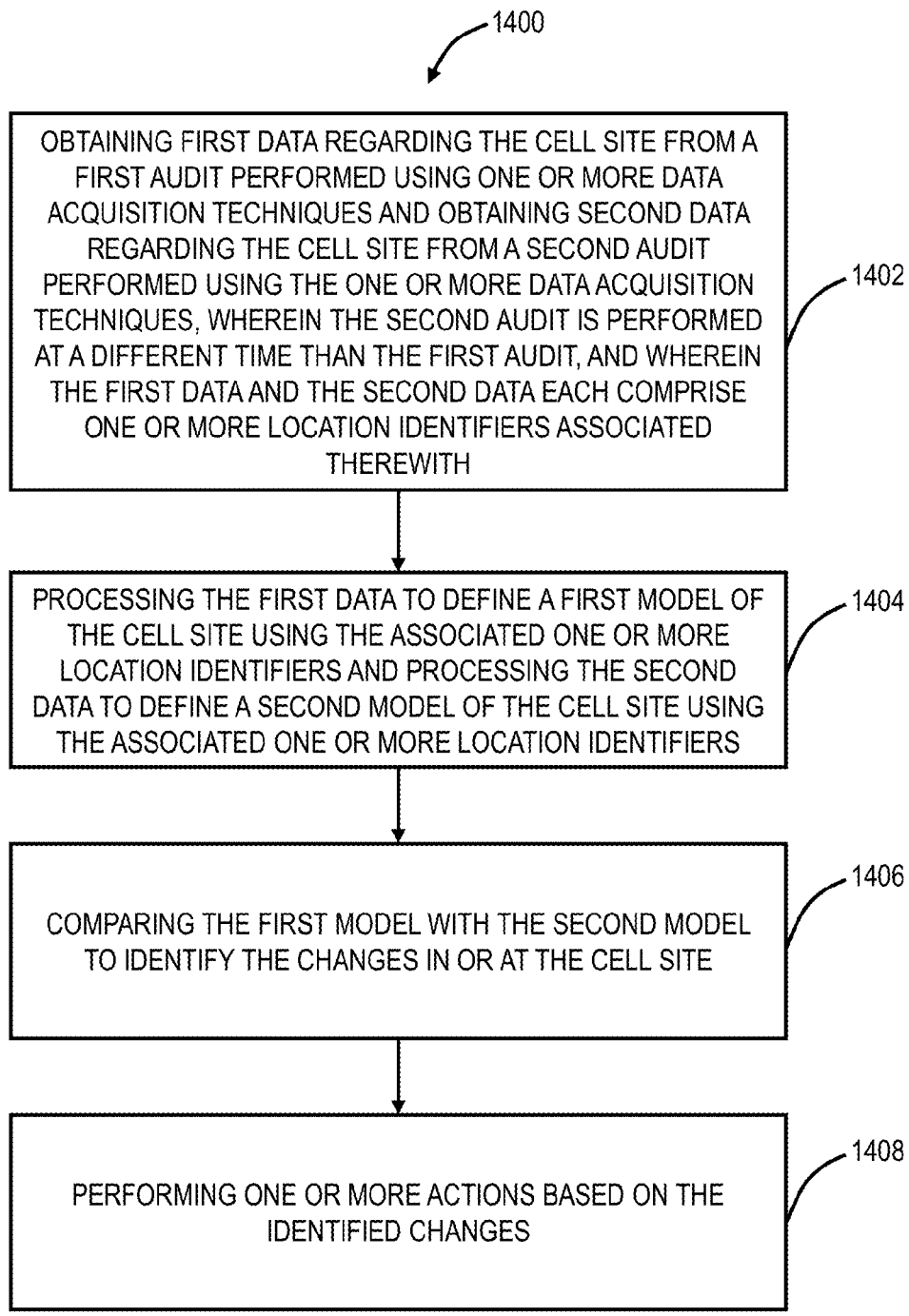
FIG. 41 is a flowchart of a 3D modeling method to detect configuration and site changes.

Referring to FIG. 41, in an exemplary embodiment, a flowchart illustrates a 3D modeling method 1400 to detect configuration and site changes. The 3D modeling method 1400 utilizes various techniques to obtain data, to create 3D models, and to detect changes in configurations and surroundings. The 3D models can be created at two or more different points in time, and with the different 3D models, a comparison can be made to detect the changes. Advantageously, the 3D modeling systems and methods allow cell site operators to efficiently manage the cell sites without repeated physical site surveys.

The modeling method 1400 includes obtaining first data regarding the cell site from a first audit performed using one or more data acquisition techniques and obtaining second data regarding the cell site from a second audit performed using the one or more data acquisition techniques, wherein the second audit is performed at a different time than the first audit, and wherein the first data and the second data each comprise one or more location identifiers associated therewith (step 1402); processing the first data to define a first model of the cell site using the associated one or more location identifiers and processing the second data to define a second model of the cell site using the associated one or more location identifiers (step 1404); comparing the first model with the second model to identify the changes in or at the cell site (step 1406); and performing one or more actions based on the identified changes (step 1408).

The one or more actions can include any remedial or corrective actions including maintenance, landscaping, mechanical repair, licensing from operators who install more cell site components 14 than agreed upon, and the like. The identified changes can be associated with cell site components installed on a cell tower at the cell site, and wherein the one or more actions comprises any of maintenance, licensing with operators, and removal. The identified changes can be associated with physical surroundings of the cell site, and wherein the one or more actions comprise maintenance to correct the identified changes. The identified changes can include any of degradation of gravel roads, trees obstructing a cell tower, physical hazards at the cell site, and mechanical issues with the cell tower or a shelter at the cell site.

The first data and the second data can be obtained remotely, without a tower climb. The first model and the second model each can include a three-dimensional model of the cell site, displayed in a Graphical User Interface (GUI). The one or more data acquisition techniques can include using an Unmanned Aerial Vehicle (UAV) to capture the first data and the second data. The one or more data acquisition techniques can include using a fixed or portable camera to capture the first data and the second data. The one or more location identifiers can include at least two location identifiers comprising Global Positioning Satellite (GPS) and GLObal NAvigation Satellite System (GLONASS). The second model can be created using the first model as a template for expect objects at the cell site.

In another exemplary embodiment, a modeling system adapted for detecting changes in or at a cell site includes a network interface and a processor communicatively coupled to one another; and memory storing instructions that, when executed, cause the processor to obtain first data regarding the cell site from a first audit performed using one or more data acquisition techniques and obtain second data regarding the cell site from a second audit performed using the one or more data acquisition techniques, wherein the second audit is performed at a different time than the first audit, and wherein the first data and the second data each comprise one or more location identifiers associated therewith; process the first data to define a first model of the cell site using the associated one or more location identifiers and process the second data to define a second model of the cell site using the associated one or more location identifiers; compare the first model with the second model to identify the changes in or at the cell site; and cause performance of one or more actions based on the identified changes.

In a further exemplary embodiment, a non-transitory computer readable medium includes instructions that, when executed, cause one or more processors to perform the steps of: obtaining first data regarding the cell site from a first audit performed using one or more data acquisition techniques and obtaining second data regarding the cell site from a second audit performed using the one or more data acquisition techniques, wherein the second audit is performed at a different time than the first audit, and wherein the first data and the second data each comprise one or more location identifiers associated therewith; processing the first data to define a first model of the cell site using the associated one or more location identifiers and processing the second data to define a second model of the cell site using the associated one or more location identifiers; comparing the first model with the second model to identify the changes in or at the cell site; and performing one or more actions based on the identified changes.

§ 18.0 Using Drones to Transport Maintenance Personnel to a Cell Tower

Figure 42:
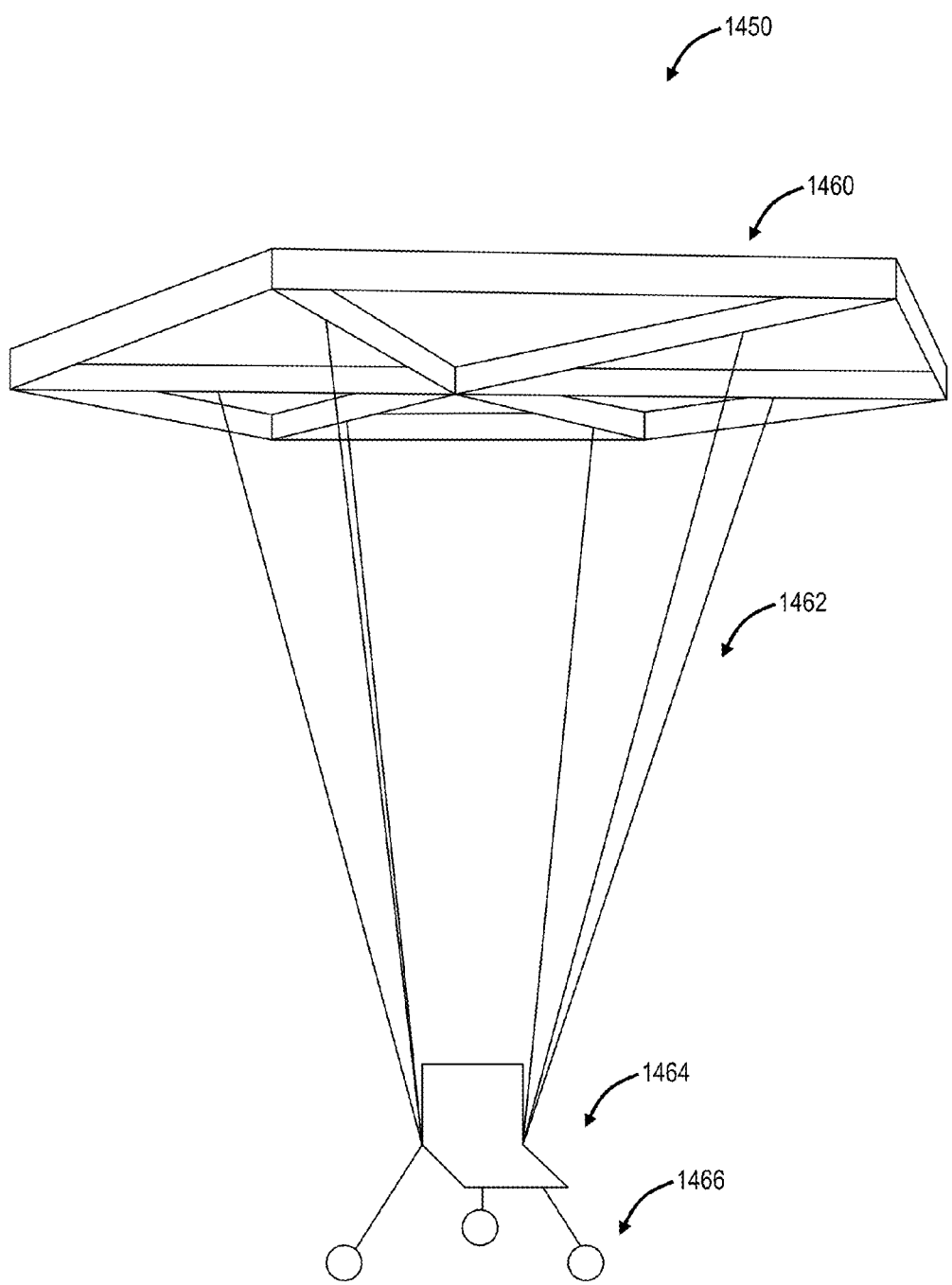
FIG. 42 is a diagram of a drone adapted to transport a person up a cell tower.
Figure 43:
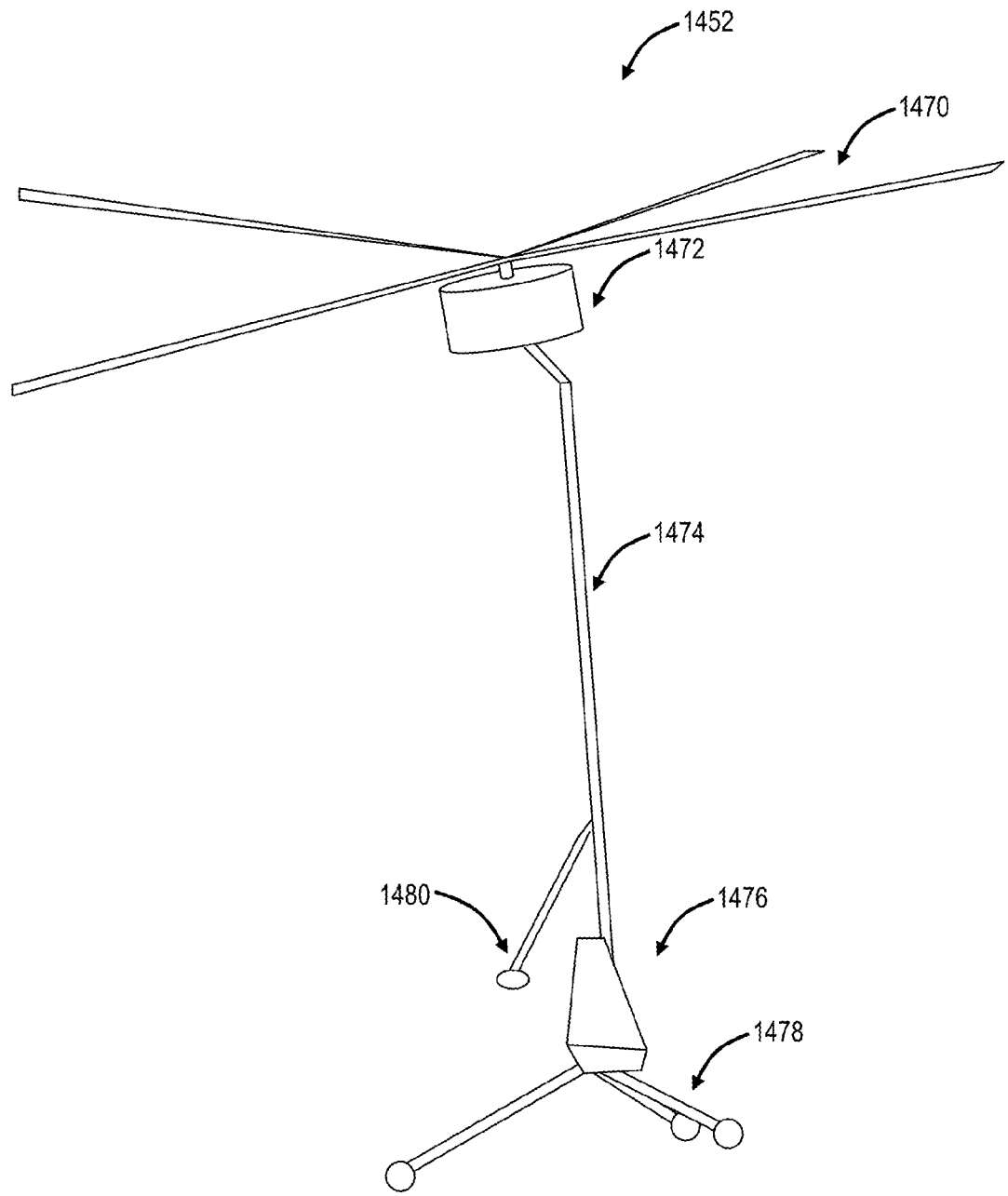
FIG. 43 is a diagram of another drone adapted to transport a person up the cell tower.
Figure 44:
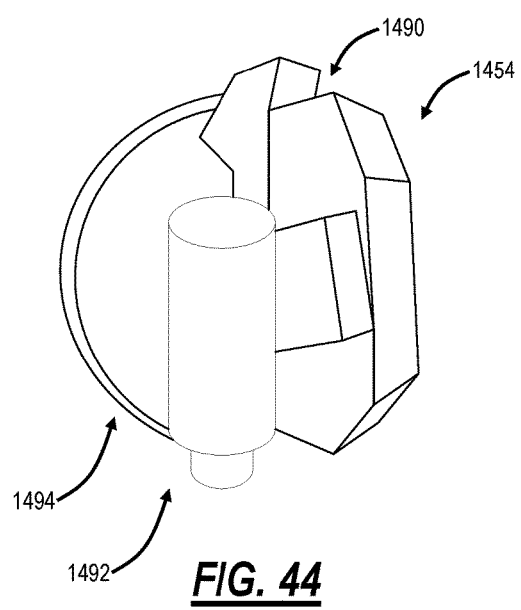
FIG. 44 is a diagram of a single person propulsion system adapted to transport a person up the cell tower.

Referring to FIGS. 42-44, in various exemplary embodiments, diagrams illustrate drones 1450, 1452 and a single person propulsion system 1454 each adapted to transport a person up the cell tower 12. Specifically, FIG. 42 is a diagram of a drone adapted to transport a person up a cell tower; FIG. 43 is a diagram of another drone adapted to transport a person up the cell tower; and FIG. 44 is a diagram of a single person propulsion system adapted to transport a person up the cell tower. Those of ordinary skill in the art that any type of drone or propulsion system is contemplated herein.

The drones 1450, 1452 or the system 1454 are adapted to quickly and safely bring maintenance personnel up to the cell tower 12 in lieu of a tower climb. After performing numerous tower climbs for cell site audits, maintenance, installation, etc., a time study was performed which showed the process of a tower climb takes well over an hour, including suiting up with gear, climbing the cell tower 12, clicking in and out of safety harnesses along the way, etc. Also, maintenance personnel are exhausted at the end of the tower climb.

The drone 1450 includes a support structure 1460 with a plurality of rotors thereon. A person (or multiple persons) are connected to the support structure 1460 via support wires or members 1462. The person can sit in a seat 1464 or connect to the members 1462 via harnesses, a vest, etc. (not shown). The seat 1464 can include landing members 1466. If the support wires or members 1462 are rigid members, the landing members 1466 can support the drone 1450 on the ground. If the support wires or members 1462 are wires, the support structure 1460 can land apart from the person, take off and lift the person.

The drone 1452 includes a single set of rotors 1470 connected to a motor 1472 which connects to a support member 1474 which extends for a distance and connects to a base 1476. The base 1476 can support maintenance personnel through harnesses, a vest, or a seat. The base 1476 can connect to landing members 1478 which support the drone 1452 on the ground. A control system 1480 extends from the support member 1474 for control of the drone 1452.

Both of the drones 1450, 1452 are specifically adapted to the task of raising and lowering people along the cell tower 12. Specifically, the support wires or members 1462 and the support member 1474 have significant length allowing the support structure 1460 or the rotors 1470 to clear the top of the cell tower 12. In this manner, the drones 1450, 1452 can position a person directly adjacent to the cell tower 12 such as to a platform thereon without interfering, i.e., touching, causing damage, etc., to the cell tower 12 or the cell site components 14.

In FIG. 44, the single person propulsion system 1454 is shown which includes a base 1490 which connects to one or more jet propulsion systems 1492 and a harness 1494. Here, a person connects to the harness 1494 and uses the jet propulsion systems 1492 to go up the cell tower 12.

Again, the present disclosure contemplates any other means of aerial propulsion such as helicopters, quadcopters, or the like. In an exemplary embodiment, a key aspect is any system should include enough length, i.e., a substantial length, between the aerial flying components and any maintenance personnel such that the aerial flying components can extend over the height of the cell tower 12 such that the cell tower 12 and the cell site components 14 are protected and such that the maintenance personnel can be placed directly adjacent to a desired location on the cell tower 12. The substantial length can be 20-40 feet or the like. Note, the drones 1450, 1452 only require substantially vertical flight to go up and down. Thus, having the flying components significantly higher than the person is not an issue.

Figure 45:
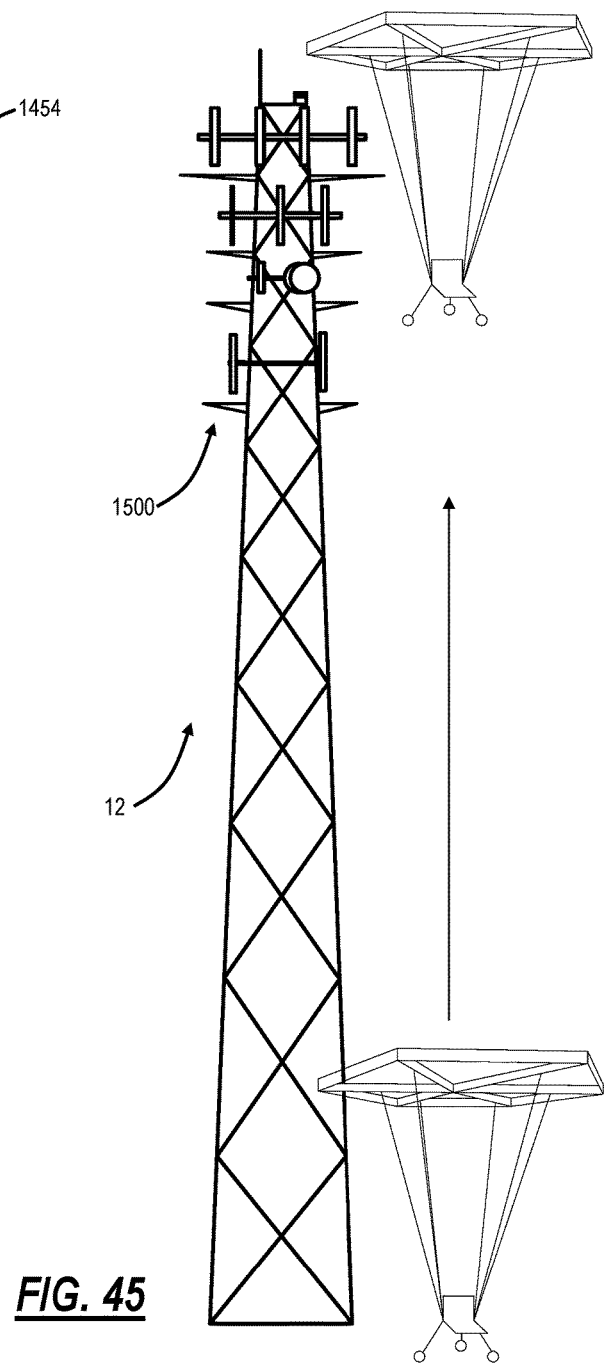

Referring to FIG. 45, in an exemplary embodiment, a diagram illustrates a cell tower with various platforms 1500 for receiving a person from a drone or the like. Using drones, it is necessary to have a place to locate maintenance personnel on the cell tower 12. In an exemplary embodiment, the cell tower 12 can include fixed or removable platforms 1500 for the drones 1450, 1452 or the like to place the personnel and for the personnel to get back in the drones 1450, 1452 to fly back to the ground. The drones 1450, 1452 can include a connection to safely connect to the platforms 1500 for stability during ingress and egress.

In an exemplary embodiment, the platforms 1500 are fixed, i.e., built into the cell tower 12. In another exemplary embodiment, the platforms 1500 are selectively removable and can be added by the maintenance personnel on an as needed basis. For example, the platform 1500 can also be connected to the drones 1450, 1452 and be locked into place on the cell tower 12 during maintenance. After maintenance and after the personnel are back in the drones 1450, 1452, the platforms 1500 can be removed and brought back to the ground with the personnel.

The present disclosure can be used for site audits, site surveys, maintenance, and installation to avoid slow, inefficient tower climbs. In an exemplary embodiment, at least two drones 1450, 1452 can be on site—one for operation and one for backup.

The drones 1450, 1452 can operate autonomously based on location identification information since the flight plan here is constrained to a small area, i.e., just at the cell tower 12. For example, using a GUI or the like, an exact position can be specified such as on a map, 3D model, photograph or the like, and the drones 1450, 1452 can automatically fly to this location, avoiding the cell tower 12 or cell site components 14. In another exemplary embodiment, the drones 1450, 1452 can fly under control of the person therein or via remote control from an operator.

In an exemplary embodiment, the drones 1450, 1452 are configured to bring the person to the top of the cell tower 12, and if there is a need to access lower cell site components 14, the person can perform a tower climb down, using safety harnesses, etc. Climbing down slightly is quick and does not exhaust the same amount of physical resources.

Figure 46:
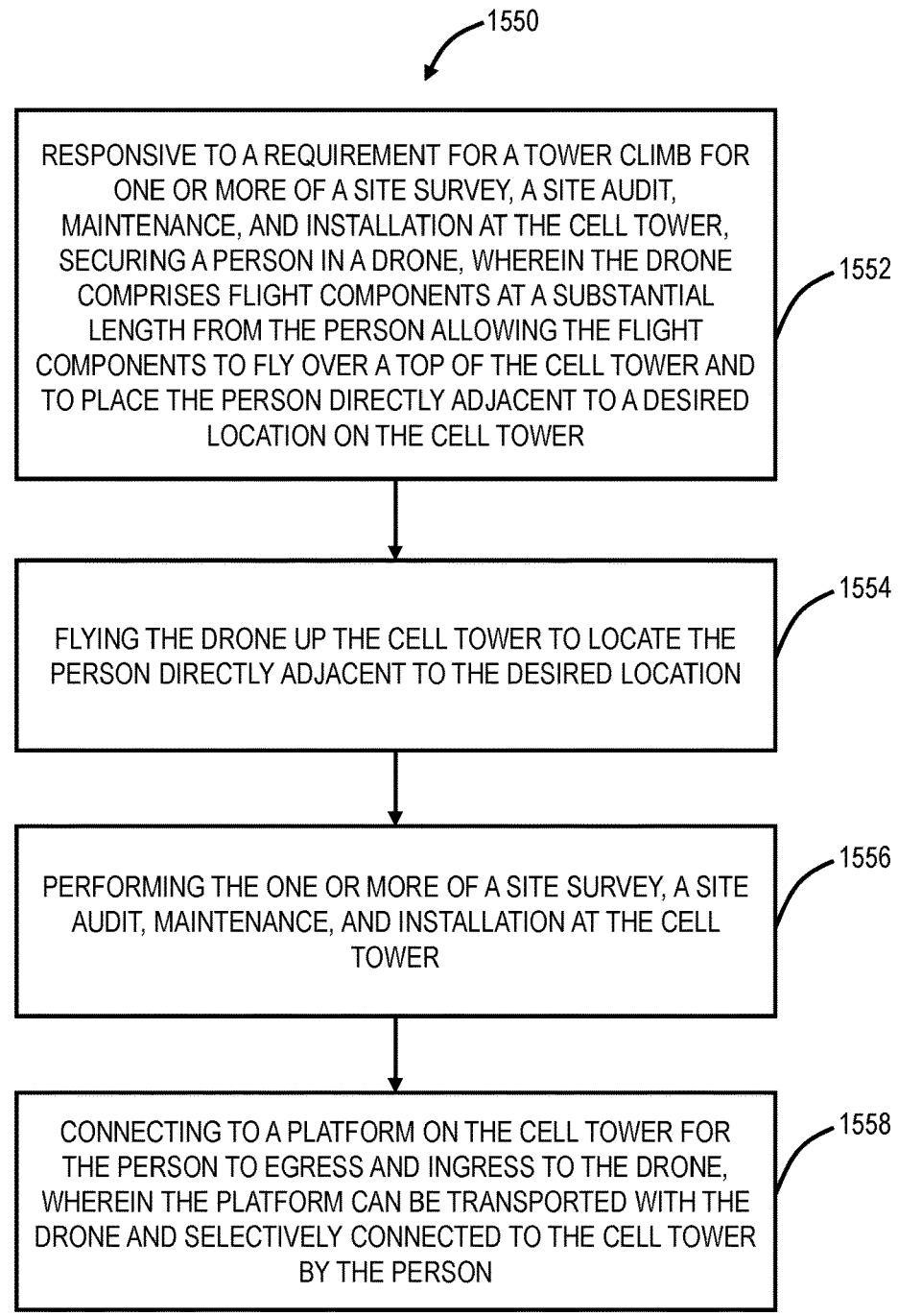
FIG. 46 is a flowchart of a method for transporting maintenance personnel to a cell tower.

Referring to FIG. 46, in an exemplary embodiment, a flowchart illustrates a method 1550 for transporting maintenance personnel to a cell tower 12. The method 1550 includes, responsive to a requirement for a tower climb for one or more of a site survey, a site audit, maintenance, and installation at the cell tower, securing a person in a drone, wherein the drone comprises flight components at a substantial length from the person allowing the flight components to fly over a top of the cell tower and to place the person directly adjacent to a desired location on the cell tower (step 1552); flying the drone up the cell tower to locate the person directly adjacent to the desired location (step 1554); and performing the one or more of a site survey, a site audit, maintenance, and installation at the cell tower (step 1556).

The method 1550 can further include connecting to a platform on the cell tower for the person to egress and ingress to the drone (step 1558). The platform can be transported with the drone and selectively connected to the cell tower by the person. The drone can include a support structure with a plurality of rotors and support wires or members for the securing, wherein the support wires or members comprise the substantial length. The drone can include a single set of rotors connected to a motor connected to a base via a support member, wherein the person is secured to the base, and wherein the support member comprises the substantial length. The drone can include a single person propulsion system. The drone can be automatically guided to the desired location based on location identifiers and wherein the desired location is set via a Graphical User Interface or three-dimensional model of the cell tower. The drone can be one of manually operated by the person and by remote control via an operator. The method 1550 can further include maintaining a second drone for backup. The substantial length can be at least 20 feet.

In another exemplary embodiment, a drone for transporting maintenance personnel at a cell tower includes one or more rotors connected to a structure; one or more support members connected to the structure, wherein a person is selectively secured to the one or more support members, wherein the one or more support members comprise a substantial length from the person to the one or more rotors allowing the one or more rotors to fly over a top of the cell tower and to place the person directly adjacent to a desired location on the cell tower; wherein, responsive to a requirement for a tower climb for one or more of a site survey, a site audit, maintenance, and installation at the cell tower, the drone is adapted to fly the person up the cell tower for performance thereof. The drone can further include a connector adapted to connect to a platform on the cell tower for the person to egress and ingress to the drone. The platform can be transported with the drone and selectively connected to the cell tower by the person.

The drone can include a plurality of rotors and the one or more support members comprise support wires or members connected to the structure for the securing, wherein the support wires or members comprise the substantial length. The one or more rotors can include a single set of rotors connected to a motor on the structure and the one or more support members comprise a single support member, wherein the person is secured to a base connected to the single support member, and wherein the single support member comprises the substantial length. The drone can include a single person propulsion system. The drone can be automatically guided to the desired location based on location identifiers and wherein the desired location is set via a Graphical User Interface or three-dimensional model of the cell tower. The drone can be one of manually operated by the person and by remote control via an operator. A second drone can be maintained at the cell tower for backup. The substantial length can be at least 20 feet.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for transporting maintenance personnel at a cell tower, the method comprising:
    responsive to a requirement for a tower climb for one or more of a site survey, a site audit, maintenance, and installation at the cell tower, securing a person in a drone, wherein the drone comprises flight components at a length from the person allowing the flight components to fly over a top of the cell tower and to place the person directly adjacent to a desired location on the cell tower;
    flying the drone up the cell tower to locate the person directly adjacent to the desired location;
    performing the one or more of a site survey, a site audit, maintenance, and installation at the cell tower; and
    connecting to a platform on the cell tower for the person to egress and ingress to the drone, wherein the platform is transported as payload carried by the drone and selectively connected and locked to the cell tower by the person, the platform is for supporting one or more persons for operations on the cell tower.

2. The method of claim 1, wherein the drone comprises a support structure with a plurality of rotors and support wires or members for the securing, wherein the support wires or members comprise the length.

3. The method of claim 1, wherein the drone comprises a single set of rotors connected to a motor connected to a base via a support member, wherein the person is secured to the base, and wherein the support member comprises the length.

4. The method of claim 1, wherein the drone comprises a single person propulsion system.

5. The method of claim 1, wherein the drone is automatically guided to the desired location based on location identifiers and wherein the desired location is set via a Graphical User Interface or three-dimensional model of the cell tower.

6. The method of claim 1, wherein the drone is one of manually operated by the person and by remote control via an operator.

7. The method of claim 1, further comprising:
    maintaining a second drone for backup.

8. The method of claim 1, wherein the length comprises at least 20 feet.

9. A drone for transporting maintenance personnel at a cell tower, the drone comprising:
    one or more rotors connected to a structure;
    one or more support members connected to the structure, wherein a person is selectively secured to the one or more support members, wherein the one or more support members comprise a length from the person to the one or more rotors allowing the one or more rotors to fly over a top of the cell tower and to place the person directly adjacent to a desired location on the cell tower; and
    a connector adapted to connect to a platform on the cell tower for the person to egress and ingress to the drone, wherein the platform is transported as payload carried by the drone and selectively connected and locked to the cell tower by the person, the platform is for supporting one or more persons for operations on the cell tower;
    wherein, responsive to a requirement for a tower climb for one or more of a site survey, a site audit, maintenance, and installation at the cell tower, the drone is adapted to fly the person up the cell tower for performance thereof.

10. The drone of claim 9, wherein the one or more support members comprise support wires or members connected to the structure for the securing, wherein the support wires or members comprise the length.

11. The drone of claim 9, wherein the one or more rotors comprise a single set of rotors connected to a motor on the structure and the one or more support members comprise a single support member, wherein the person is secured to a base connected to the single support member, and wherein the single support member comprises the length.

12. The drone of claim 9, wherein the drone comprises a single person propulsion system.

13. The drone of claim 9, wherein the drone is automatically guided to the desired location based on location identifiers and wherein the desired location is set via a Graphical User Interface or three-dimensional model of the cell tower.

14. The drone of claim 9, wherein the drone is one of manually operated by the person and by remote control via an operator.

15. The drone of claim 9, wherein the length comprises at least 20 feet.

* * * * *